United States Patent
Howe

(10) Patent No.: US 6,611,519 B1
(45) Date of Patent: Aug. 26, 2003

(54) LAYER ONE SWITCHING IN A PACKET, CELL, OR FRAME-BASED NETWORK

(75) Inventor: Wayne R. Howe, Dublin, OH (US)

(73) Assignee: SwXtch the Rules, LLC, Dublin, OH (US)

(*) Notice: Subject to any disclaimer, the term of this patent is extended or adjusted under 35 U.S.C. 154(b) by 0 days.

(21) Appl. No.: 09/375,135

(22) Filed: Aug. 16, 1999

Related U.S. Application Data
(60) Provisional application No. 60/097,138, filed on Aug. 19, 1998.

(51) Int. Cl.⁷ ............................................... H04L 12/28
(52) U.S. Cl. ..................... 370/386; 370/395.4; 370/413; 370/428
(58) Field of Search ................................ 370/428, 230, 370/231, 235, 360, 386, 395.4, 395.62, 395.21, 465, 468, 413

(56) References Cited

U.S. PATENT DOCUMENTS

| | | | |
|---|---|---|---|
| 5,398,236 A | | 3/1995 | Hemmady et al. |
| 5,613,069 A | | 3/1997 | Walker |
| 5,805,589 A | * | 9/1998 | Hochschild et al. ........ 370/389 |
| 6,104,729 A | * | 8/2000 | Hellum et al. ............... 370/389 |
| 6,330,236 B1 | * | 12/2001 | Ofek et al. .................. 370/376 |

OTHER PUBLICATIONS

Application Note #7, "Affordable Cesium Accuracy–Anytime, Anywhere, Navstar Global Positioning System (GPS) Power Utility Applications", Truetime, Santa Rosa, CA.
Application Note #11, "Video Time and Message Insertion", Truetime, Santa Rosa, CA.
Application Note #12, "Multi User Computer Time Synchronization", Truetime, Santa Rosa, CA.
Application Note #14, "Model GPS–DC MK III Oscillator Selection Guide", Truetime, Santa Rosa, CA.
Application Note #19, "Simplified Frequency Measurement System Truetime Model GPS–DC MK III with Frequency Measurement Option",Truetime, Santa Rosa, CA.
Application Note #20, "Achieving Optimal Results with High Performance GPS Time and Frequency Receivers", Truetime, Santa Rosa, CA.
Application Note #21, "Model XL–DC in Frequency Control Applications with Customer Provided Frequency Standards", Truetime, Santa Rosa, CA.
Application Note #22, "Truetime's GPS Disciplined Cesium Oscillator Option", Truetime, Santa Rosa, CA.
Application Note #23, "Precise Synchronization of Computer Networks: Network Time Protocol (NTP) for TCP/IP", Truetime, Santa Rosa, CA.
Application Note #24, "Precision Time and Frequency Using GPS: A Tutorial", Truetime, Santa Rosa, CA.
Application Note #25, "Precise Synchronization of Telecommunication Networks", Truetime, Santa Rosa, CA.
Application Note #26, "Real Time Modeling of Oscillator Aging and Environmental Effects", Truetime, Santa Rosa, CA.
Logsdon, Tom, Understanding the Navstar GPS, CIS and IVHS, "Precise Time Synchronization", pp. 158–174, Van Nostrand Reinhold (1995).
DeYoung, James, "Two–Way Satellite Time Transfer", publication by Time Service Dept., U.S. Naval Observatory, Washington, D.C. at http://tycho.usno.navy.mil/two-way.html.

* cited by examiner

Primary Examiner—Dang Ton
Assistant Examiner—Frank Duong
(74) Attorney, Agent, or Firm—Mueller and Smith, LPA

(57) ABSTRACT

A system and method are described for synchronizing store-and-forward networks and for scheduling and transmitting continuous, periodic, predictable, time-sensitive, or urgent information such as real-time and high-priority messages over those networks. This enables packet-, cell-, and/or frame-based networks to thereby efficiently switch voice, video, streaming, and other real-time or high-priority data at the layer one or physical level, thus ensuring that the delivery of selected information can be made fast, on-time, immediate, non-blocked, non-congested, loss-less, jitter-free, and have guaranteed delivery, and guaranteed quality of service.

31 Claims, 51 Drawing Sheets

Linear Version of Drawing
Showing Preferred Integrated Embodiment

Linear Version of Drawing Showing Source and/or Destination Embodiment

FIG.8 Network with L1 Switches as Originating Edge Nodes, Middle Nodes, and Terminating Edge Nodes

Input Means Operational Process

For Edge Input Circuitry:
If this Input circuitry is an "Edge buffer", i.e., it serves an incoming line that is not fed by the output of a Layer 1 Switch, then this "Edge input buffer" serves as the incoming buffer for that input line into the entire Layer 1 Network.

As an Edge Input Buffer, the associated $IS1_n$ Switch is always kept switched to feed the $InBuffer_n$ and is never "bypassed" by throwing that buffer's $IS1_n$ Switch to the Buffer Bypass Line. All incoming packets for an Edge Buffer must be sent to the $InBuffer_n$ as in a normal store and forward Packet, Cell, or Frame Switch.

Packets for normal Packet, Cell, or Frame Switching are held in the $InBuffer_n$ and routed through the $IS2_n$ Switch to the Packet, Cell, or Frame Switch under the control of the Master Controller.

Packets for Layer 1 Switching in an Edge line are held in the Edge $InBuffer_n$ until it is time for them to be Layer 1 Switched. At the correct time for the L1 Event, the Master Controller, working from the Event Scheduler, simultaneously:
switches $Inbuffer_n$ through $IS2_n$ to the L1 Switch,
switches the correct non-blocking, non-delaying route through the L1 Switch, and
switches $OS1_n$ and $OS2_n$ to the Output Buffer Bypass Line.
The Master controller then starts $Inbuffer_n$ so that it "fires" the L1 packet out of $Inbuffer_n$, through $IS2_n$ to the L1 Switch, through the L1 Switch, through $OS1_n$, through the Buffer Bypass Line, and through $OS2_n$, out to the output port and on to the next L1 Switch, all in one simultaneous, continuous sweep.

When an L1 Event is finished, the Master Controller, acting from the Event Scheduler, reverts all of the previous actions back to normal packet mode.

*FIG. 14*

Input Means Operational Process

For Non-Edge or Internal L1 Network Input Circuitry (i.e., Layer 1 Network Fed Input Circuitry):

If this Input circuitry is fed from another L1 Switch, then it is a Non-Edge Input Buffer. Consequently, it acts as a normal Packet, Cell, or Frame Switch Input Buffer for normal store-and-forward packets, but routes L1 packets directly through at the previously scheduled L1 Event time.

In normal Packet-Switch Mode, packets are routed from the previous Node through input line $In_n$. The associated $IS1_n$ Switch is normally kept switched to feed the $InBuffer_n$ with normal store-and-forward packets. The associated $IS2_n$ Switch is normally kept switched to feed packets out of the $InBuffer_n$ and into the Packet, Cell, or Frame Switch, as controlled by the Master Controller.

However, just before each packet is sent from the $InBuffer_n$ to the Packet, Cell, or Frame Switch, the Master Controller looks at the packet's size (in it's header or by physically calculating it), and determines how long it will take to ship the packet out of the $InBuffer_n$ to the Packet, Cell, or Frame Switch. The Master Controller then looks at the L1 Event Schedule to see if an L1 event is scheduled for $InBuffer_n$ that would conflict with shipping the waiting next packet out of $InBuffer_n$ to the Packet, Cell, or Frame Switch. If not enough time remains before the L1 Event is scheduled to come through the $InBuffer_n$, the Master Controller delays shipping the waiting packet to the Packet, Cell, or Frame Switch until after the L1 event. The Master Controller then repeats this process.

When an L1 Event is scheduled to occur through a Non-Edge or Internal Buffer, at the correct time for the L1 Event, the Master Controller, working from the Event Scheduler, simultaneously:

switches $IS1_n$ to the Input Buffer Bypass Line
switches the Input Buffer Bypass Line through $IS2_n$ to the L1 Switch,
switches the correct non-blocking, non-delaying route through the L1 Switch, and
switches $OS1_n$ and $OS2_n$ to the Output Buffer Bypass Line positions.

In this way, at the correct L1 Event time, the Master controller directly connects the input line $In_n$ through $IS1_n$, through the Input Buffer Bypass Line, through $IS2_n$ to the L1 Switch, through the L1 Switch, through $OS1_n$, through the Buffer Bypass Line, and through $OS2_n$, out to the output port and on to the next L1 Switch, all in one simultaneous event.

When an L1 Event is finished, the Master Controller, acting from the Event Scheduler, reverts all of the previous actions back to normal packet mode.

*FIG. 15*

Input Queue Manager Process

When incoming packet, do:
1) Strip off MAC Layer and Flags
2) Fill Active Buffer with Incoming Packet
3) Look at Layer 2 (IP, ATM Layer, etc.) and/or Layer 3 Address (TCP, ATM AAL, etc.) in Packet Header, along with priority, and type of packet If this is a originating edge node, based on the Source and Destination Addresses, determine if this is a Layer 1 packet which needs to be buffered and/or if this is a "Headerless" packet.

If this is a Layer 1 packet which needs to be buffered and sent as a Layer 1 packet at a designated time, notify controller and queue it up for Layer 1 switching.

If this is to be a "headerless" packet, delete the layer 2 and layer 3 source and destination addresses and prepare to ship as a Layer 1 packet.

Else - if this is a normal store and forward packet, do
4) Query Local Routing Table with Destination Address
5) Get back next Link (IP Address, ATM Layer, or Frame Address) and Internal Output Port ID
6) If the Packet is a Call Setup Message destined for this Packet, Cell, or Frame Switch, route it to the Controller
7) May use Internal Port ID to label Packet
8) May add Layer 2 Source and Destination Address at this time
9) Request Master Controller or Packet, Cell, or Frame Switch to Load Packet into Switch
10) Load Packet to Packet, Cell, or Frame Switch for Routing to Next Link Repeat;

*FIG.17*

Output Means Operational Process

For Edge Output Circuitry:
If the Output circuitry is an "Edge buffer", then it feeds an outgoing line that does not go to the input of a Layer 1 Switch, but rather feeds a non-Layer 1 device.

For Edge Output Buffers, the associated $OS1_n$ Switch is normally kept switched to feed the $OutBuffer_n$ from the Packet, Cell, or Frame Switch in normal store-and-forward fashion. The associated $OS2_n$ Switch is also normally kept switched to feed from the $OutBuffer_n$ to the output line in normal store-and-forward fashion. Packets for normal Packet, Cell, or Frame Switching are held in the $OutBuffer_n$ and routed through the $OS2_n$ Switch to the output line $Out_n$ under the control of the Master Controller.

However, just before each packet is sent from the $OutBuffer_n$ to the output line $Out_n$, the Master Controller looks at the packet's size (in it's header or by physically calculating it), and determines how long it will take to ship the packet out of the $OutBuffer_n$ to the output line $Out_n$. The Master Controller then looks at the L1 Event Schedule to see if an L1 event is scheduled through $OutBuffer_n$ that would conflict with shipping the waiting next packet out of $OutBuffer_n$ to the output line $Out_n$. If not enough time remains before the L1 Event is scheduled to route through the $OutBuffer_n$, the Master Controller delays shipping the waiting packet to the output line $Out_n$ until after the L1 event is completed. The Master Controller then repeats this process.

When an L1 Event is scheduled to occur through an Edge or Internal Output Buffer, at the correct time for the L1 Event, the Master Controller, working from the Event Scheduler, simultaneously:

If it's a Non-Edge Input Buffer, it switches $IS1_n$ to the Input Buffer Bypass Line and switches the Input Buffer Bypass Line through $IS2_n$ to the L1 Switch,
Or, if it's an Edge Input Buffer, it switches $Inbuffer_n$ through $IS2_n$ to the L1 Switch,
It also switches the correct non-blocking, non-delaying route through the L1 Switch, and
Switches $OS1_n$ and $OS2_n$ to the Output Buffer Bypass Line positions.
In this way, at the correct L1 Event time, the Master controller "directly" connects the L1 packet through the Input stage, through $IS2_n$ to the L1 Switch, through the L1 Switch, through $OS1_n$, through the Buffer Bypass Line, and through $OS2_n$, out to the output port and on to the next device, all in one simultaneous event.

*FIG. 19*

Output Means Operational Process

For Edge Output Circuitry (cont.)

When an L1 Event is finished, the Master Controller, acting from the Event Scheduler, reverts all of the previous actions back to normal packet mode.

Note that packets for Layer 1 Switching are never held in an Edge Output buffer unless implementing "Headerless" Packets. Layer 1 packets are routed on through to the output line, even though the next device may not be a Layer 1 device. This is true because the Edge Output Buffer can then deliver the Layer 1 packet directly to the non-Layer 1 device's input buffer as quickly as possible, so that it can be processed by that device. The exception to this is "Headerless" packets, which must be stored in the Edge Output Buffer so that the Layer 2 Source and Destination Header Addresses get added back in.

*FIG.20*

Output Means Operational Process

For Non-Edge Output Circuitry:

If this Output circuitry is a "Non-Edge buffer" then it feeds an outgoing line that goes to the input of a Layer 1 Switch, rather than feeding a non-Layer 1 device. However, a Non-Edge Output Buffer works exactly the same as an Edge Output Buffer.

As an Non-Edge Output Buffer, the associated $OS1_n$ Switch is normally kept switched to feed the $OutBuffer_n$ from the Packet, Cell, or Frame Switch in normal store-and-forward fashion. The associated $OS2_n$ Switch is also normally kept switched to feed from the $OutBuffer_n$ to the output line in normal store-and-forward fashion. Packets for normal Packet, Cell, or Frame Switching are held in the $OutBuffer_n$ and routed through the $OS2_n$ Switch to the output line $Out_n$ under the control of the Master Controller.

However, just before each packet is sent from the $OutBuffer_n$ to the output line $Out_n$, the Master Controller looks at the packet's size (in it's header or by physically calculating it), and determines how long it will take to ship the packet out of the $OutBuffer_n$ to the output line $Out_n$. The Master Controller then looks at the L1 Event Schedule to see if an L1 event is scheduled through $OutBuffer_n$ that would conflict with shipping the waiting next packet out of $OutBuffer_n$ to the output line $Out_n$. If not enough time remains before the L1 Event is scheduled to route through the $OutBuffer_n$, the Master Controller delays shipping the waiting packet to the output line $Out_n$ until after the L1 event is completed. The Master Controller then repeats this process.

When an L1 Event is scheduled to occur through an Edge or Internal Output Buffer, at the correct time for the L1 Event, the Master Controller, working from the Event Scheduler, simultaneously:

If it's a Non-Edge Input Buffer, it switches $IS1_n$ to the Input Buffer Bypass Line and switches the Input Buffer Bypass Line through $IS2_n$ to the L1 Switch,
Or, if it's an Edge Input Buffer, it switches $Inbuffer_n$ through $IS2_n$ to the L1 Switch,
It also switches the correct non-blocking, non-delaying route through the L1 Switch, and
Switches $OS1_n$ and $OS2_n$ to the Output Buffer Bypass Line positions.

In this way, at the correct L1 Event time, the Master controller "directly" connects the L1 packet through the Input stage, through $IS2_n$ to the L1 Switch, through the L1 Switch, through $OS1_n$, through the Buffer Bypass Line, and through $OS2_n$, out to the output port and on to the next device, all in one simultaneous event.

When an L1 Event is finished, the Master Controller, acting from the Event Scheduler, reverts all of the previous actions back to normal packet mode.

*FIG.21*

Output Means Operational Process

For Non-Edge Output Circuitry (cont.)

Note that packets for Layer 1 Switching are never held in a Non-Edge (Internal) Output buffer. They are always routed on through to the next Layer 1 device. This is true even for "Headerless" packets, since the Layer 2 Source and Destination Header Addresses are not added back in at a Non-Edge Output Buffer.

*FIG.22*

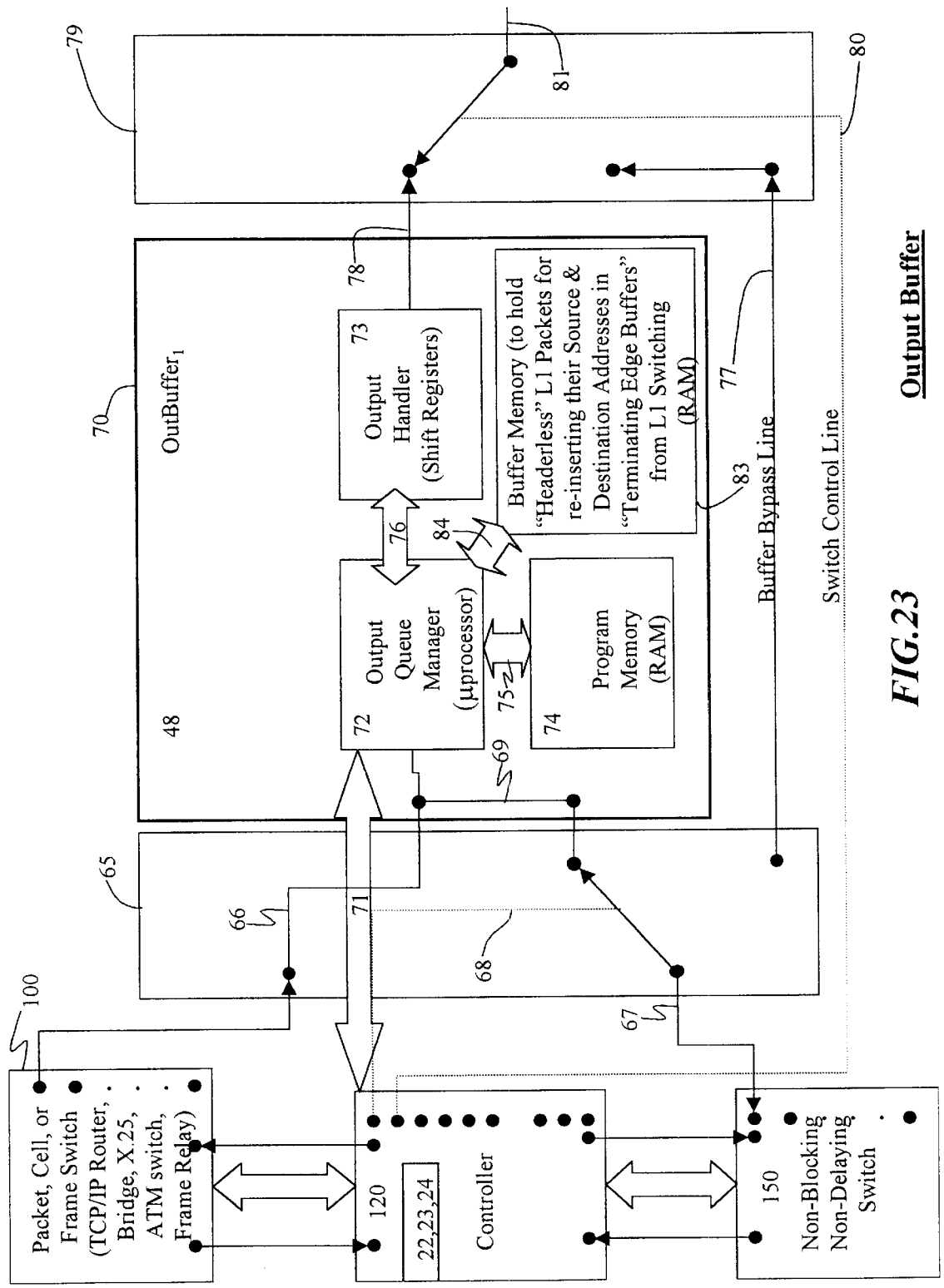
FIG. 23 Output Buffer

Output Queue Manager Process

When outgoing packet, do:
1) Load Packet into Active Buffer from Packet, Cell, or Frame Switch for Routing to Next Link
2) May add Layer 2 Source and Destination Address at this time if not done previously
3) Ready Layer 2 Packet (IP, ATM Layer, or Frame Layer) for Output Port
4) When ready, load Output Buffer with Outgoing Packet
5) Generate MAC Layer and Flags
6) Send
Repeat;

If this is a "headerless" packet in a terminating edge node, put packet into buffer, get layer 2 and layer 3 source and destination addresses from controller, insert the layer 2 and layer 3 source and destination addresses into the packet. Transmit the packet out of the node.

*FIG.24*

*FIG.26*   Layer 1 Switch Detailed Block Diagram

FIG.29 Packet, Cell, or Frame Switch

FIG.30 Controller

Block Diagram of Controller

Master Controller Process

At Startup, Master Controller synchronizes its Master Clock using standard off-the-shelf GPS clock synchronization mechanisms. It then tightens and maintains this synchronization through the processes described in Fig.40 and/or Fig.41.

↓

The Master Controller uses well-known packet protocols to build and maintain a Network Routing Table.

↓

The Input Queue Manager gets packets addressed to it coming in from the Packet Switch and the L1 Switch. It takes off the Flags, and routes the packet to the Routing Manager.

↓

The Routing Manager looks at the packet and determines if it is updated routing information, packets that need to be responded to, or L1 Call Setup or other L1 Reservation Request Messages. If it's updated routing information, it uses it to update the Network Routing Table. If it's an L1 Reservation Request, Reject, or Accept message it routes it to the L1 Reservation Scheduler. If it's a message that requires a response, it formulates the response and routes it to the Message Generator for outgoing message formulation.

↓

The Layer 1 Reservation Scheduler identifies the type of L1 Request, e.g., Call Setup, TearDown, Reject, or Accept Messages. It then looks at the Layer 1 Event Schedule as shown in Fig.37 and takes the appropriate action. These actions are all described in detail as part of the Layer 1 Event Scheduling Process shown in Fig.35 and Fig.36.

↓

The Mode Selection setting is a way of modifying the sophistication of the Layer 1 Switch. The Mode is selected by the System Administrator through the Node Manager. The Modes are described in detail in Fig.36.

↓

The Message Generator takes input from the L1Reservation Scheduler and the Routing Manager. It then generates the appropriate outgoing message to the appropriate destination and sends it to the Output Queue Manager.

*FIG.33*

Layer 1 Event Schedule

| Time dd hh mm ss mmm μμμ n | Input(s)/ Source | Output(s)/ Destination | Status | Time to Kill? | Time Offset to Next Node | Propagation Delay to Next Node |
|---|---|---|---|---|---|---|
| 01 12 00 00 000 000 0 | In$_1$ Edge | Out$_1$ Edge | Scheduled | xxx | -150 nsec. | 10 μsec. |
| 01 12 00 00 000 000 0 | In$_1$ Edge | Out$_2$ | Tentative | yyy | +0.9 μsec | 50 μsec. |
| 01 12 00 00 000 000 0 | In$_1$ Edge | Out$_3$ | Available | zzz | . | . |
| 01 12 00 00 000 000 0 | In$_1$ Edge | Out$_n$ | Available | zzz | . | . |
| 01 12 00 00 000 000 0 | In$_2$ | Out$_1$ Edge | Available | zzz | | |
| 01 12 00 00 000 000 0 | In$_2$ | Out$_2$ | Available | zzz | | |
| 01 12 00 00 000 000 0 | In$_2$ | Out$_3$ | Available | zzz | | |
| 01 12 00 00 000 000 0 | In$_2$ | Out$_n$ | Available | zzz | | |
| 01 12 00 00 000 000 0 | In$_3$ | Out$_1$ Edge | Available | zzz | | |
| 01 12 00 00 000 000 0 | In$_3$ | Out$_2$ | Available | zzz | | |
| 01 12 00 00 000 000 0 | In$_3$ | Out$_3$ | Available | zzz | | |
| 01 12 00 00 000 000 0 | In$_3$ | Out$_n$ | Available | zzz | | |
| 01 12 00 00 000 000 0 | In$_n$ | Out$_1$ Edge | Available | zzz | | |
| 01 12 00 00 000 000 0 | In$_n$ | Out$_2$ | Available | zzz | | |
| 01 12 00 00 000 000 0 | In$_n$ | Out$_3$ | Available | zzz | | |
| 01 12 00 00 000 000 0 | In$_n$ | Out$_n$ | Available | zzz | | |
| 01 12 00 00 000 000 1 | In$_1$ Edge | Out$_1$ Edge | Scheduled | zzz | | |
| 01 12 00 00 000 000 1 | In$_1$ Edge | Out$_2$ | Tentative | zzz | | |
| . | | | | | | |
| 01 12 30 00 000 000 0 | In$_1$ Edge | Out$_1$ Edge | Reserved | zzz | A certain amount of time may be Reserved for Non-L1 Higher Layer Normal Packet Switching | |
| . | | | | | | |
| 01 12 59 59 999 999 9 | In$_n$ | Out$_n$ | Reserved | zzz | | |

*FIG.37*

FIG.40 Calculating Inter-Switch Timing Difference and Propagation Delay for Loosely Synchronized Nodes

Layer 1 Call Setup Request Message Parameters

Caller/Initiator Provides (In Call Setup Message)
Type of Call : High Priority Scheduled L1 Reservation
Layer 2 Destination Address(es): _____
Layer 2 Source Address(es): _____
Layer 3 Destination Address(es): _____
Layer 3 Source Address(es): _____
Other Layer or application identifiers: _____
Maximum Acceptable Point to Point Delay = _____
Maximum Bits per Packet = _____
Desired Number of Packets Per Second = _____
Periodic Interval (How Frequently the messages will be sent) = _____
Desired Bit Rate : _____
Acceptable Jitter Range : _____
Desired Start Time : _____
Tentatively Scheduled Times : _____
Expected Duration of Session : _____
Time until Kill Setup Request : _____

All other packets are the same as other standard protocols (TCP/IP, ATM, X.25, Frame Relay, etc.
- Ack
- Reject (No session setup)
- TearDown Session
- ...

*FIG.42*

LAYER ONE SWITCHING IN A PACKET, CELL, OR FRAME-BASED NETWORK

CROSS-REFERENCE TO RELATED APPLICATIONS

This application claims the benefit of U.S. Provisional Patent application No. 60/097,138, filed Aug. 19, 1998.

FIELD OF THE INVENTION

The present invention relates in general to network communications switching, and more particularly to synchronizing store-and-forward networks and scheduling real-time or high-priority network transmissions for immediate and direct layer one or physical level switching.

BACKGROUND OF THE INVENTION

Current applications are consuming network bandwidth at exponentially increasing rates Current packet-switching, cell-switching, frame-switching, and other store-and-forward communication networks were designed to provide high-efficiency routing and switching capability for bursty, non-periodic, non-predictable, non-time-sensitive data traffic. However, when attempting to deliver continuous, periodic, predictable, time-sensitive, or urgent information, the store-and-forward style architectures are by their nature, ill-suited to efficiently perform the task. This is because store-and-forward style architectures, by their innate design, first store data, then examine it for addressing and priority, then switch and route it based on priority, then store the data again in various priority queues, and then transmit it to the next switch to repeat the process. These steps are subject to varying slowdowns and delays based on continuously varying, unpredictable network congestion. On the other hand, by its very different nature, continuous, periodic, predictable, time-sensitive, and high-priority information requires immediate switch-through with no delays. Thus, the characteristics which make store-and-forward switching so efficient for bursty, non-periodic, non-predictable, non-time-sensitive data, are the exact opposite of what is needed for continuous, periodic, predictable, time-sensitive, or high-priority information.

As a result of this dilemma, various complicated schemes have been devised in an attempt to compensate for and circumvent these underlying store-and-forward network characteristics. Examples of these schemes include, but are not limited to prioritization schemes, priority queuing mechanisms, constant and variable bit rates, guaranteed and peak bit rates, layer three switching, guaranteed throughput, faster routing, Gigabit routing, switch routing, etc. Yet each of these attempts to circumvent the store-and-forward dilemma still remains built upon the fundamental store-and-forward architecture and switching. The result of these attempts to resolve the problem is a combination of solutions with complicated protocols, complex implementation schemes, and/or inefficient use of network resources.

The explosion of bursty, non-periodic, non-predictable, non-time-sensitive data traffic coupled with converging high-bandwidth, real-time applications over these store-and-forward style packet-, cell-, and frame-based networks inevitably results in network congestion, delays, inconsistent delivery, jitter, packet loss, quality of service degradation, and/or inefficient networks. The applications most noticeably affected will be real-time applications and high-priority information.

Real-time applications are defined as applications where the end user experiences the information in real-time as it flows over the network. Examples of real-time applications are telephony, Internet phone, packet phone video conferencing, video streaming, audio streaming, broadcast, multicast, and any other multimedia streaming applications. Real-time applications may be periodic, predictable, or time-sensitive.

High-priority information is defined as information that must be delivered more quickly, more reliably, more accurately, and ahead of other lower-priority information in the network. Examples of high-priority information include, but are not limited to emergency messages, time-sensitive or time-dependent information, network control messages, guaranteed delivery messages, or any other information deemed more important or more urgent for various reasons.

Real-time applications and high-priority information are dependent upon the rapid, consistent, on-time, non-blocked, non-delayed, non-congested, loss-less, jitter-free, reliable flow of data in real-time. With real-time applications and high-priority information, poor network performance resulting in time delays and quality loss can drastically degrade the quality of the end user experience and the value of the service. At the same time, network operators and administrators would like to avoid network complexities and inefficiencies in delivering real-time applications and high-priority information. These delays, degradation, inefficiencies, and complexities are what this invention seeks to overcome.

Several factors can cause real-time applications such as Internet phone, Internet Video phone, Internet Video Conferencing, Internet Streaming Audio, Internet Streaming Video, and other real-time multimedia applications to suffer in both quality and time delays over packet, cell, or frame-oriented store-and-forward networks. Among them are:

Packet, cell, and frame discard due to a congested switch, which in turn results in dropout glitches (poor quality) and/or increased delay time to retransmit missing packets, cells, or frames.

Packet loss due to alternate routing, which in turn results in dropout glitches (poor quality) and increased processing time to recover from and reconstruct missing packets.

Waiting for alternate path packets to arrive, resulting in time delays.

Reordering of packets that arrive out-of-order, resulting in time delays.

Higher layer processing (layers 2–4) of packets at each router before routing the packets on to the next destination, resulting in time delays.

Loaded/congested networks which slow down packet, cell, or frame delivery, resulting in random, non-predictable time delays. This includes loading, congestion, and/or contention in shared-media networks such as CSMA/CD, Ethernet, Token-Ring, Aloha, shared wireless, or any other shared media contention which may cause congestion or delays. This also includes loading, congestion, and/or contention for resources inside a switch, router, or any other communications device, including but not limited to: input lines, input queues, priority queues, address lookup mechanisms, priority lookup mechanisms, switching fabrics, output queues, output lines, or any other resource sharing mechanisms in data switching or routing.

Some combination or all of these problems are innate in packet, cell, and frame-oriented networks, their architectures, switches, and protocols. This includes older systems as well as the newer standards like TCP/IP version 6, Frame Relay, and ATM. Newer protocols and systems such as Resource Reservation Protocol (RSVP), Bit Stream Reservation Techniques, layer two Switching, layer three Switching, Cut-though switching, Flow Switching and other techniques have been designed in an attempt to reduce these problems for real-time or high-priority information. However, none of these efforts have been able to completely eliminate a fundamental architectural tenet of packet, cell, and frame-based switching in store-and-forward networks— i.e., when network buffers get overloaded, these systems must drop packets and slow down to "decongest." This can affect and slow down real-time applications and high-priority information. For example, in some of these efforts, once a real-time packet is in the input buffer, it can be routed through even a congested switch with a higher priority. However, if the input buffers are fill, the real-time application may not be able to get its packet in to be recognized as a high-priority packet. On the other hand, efforts to overcome this problem by reserving capacity on the switch means the switch will, in effect, limit its input or throughput to reserve capacity for guaranteed applications, thus resulting in inefficiencies in the switch.

Streaming broadcast or multicast audio and video applications deal with these store-and-forward effects by having large buffers and error correction at the receiving end (client) to compensate for the uncontrollable delays and losses. However, the large buffers result in long start-time delays for both audio and video "broadcast-style" streaming applications. The end user must wait while the buffers fill with the initial incoming packets before he/she can see or hear the program.

Internet Phone, Internet Video Phone, and Internet Video Conferencing applications must reduce the size of these buffers to minimize the awkward delay time between end-users. They also use compression algorithms to reduce network congestion. Unfortunately, neither of these techniques is sufficient, since network overload and congestion will still cause packet discarding, slowdown, and jitter, enough to cause awkward pauses between end-users. The resulting conversation is similar to the delayed satellite conversations that are sometimes encountered in overseas calls. As mentioned previously, techniques to solve these problems, such as guaranteed constant bit rate or guaranteed peak bit rate, either introduce their own inefficiencies or don't really guarantee the results one hundred percent of the time.

Newer networks are proposing to switch at very high gigabit speeds to minimize the delay times for real-time applications such as telephony. Nevertheless, as more high-bandwidth applications like telephony, web graphics, and streaming video get dumped into these gigabit networks, they too, will either be designed to be inefficient, or will get congested and slow down with the resulting degradation of speed and quality.

Clearly, there is a need for a way to:
- guarantee delivery of selected packets, such as real-time and high-priority packets, like Internet phone, audio and video streaming, video conferencing, and urgent messages.
- assure that selected packets, such as real-time and high-priority packets, arrive on time so that large buffers, long start delays, and awkward pauses are reduced or eliminated.
- assure that selected packets with higher priority will be delivered more rapidly through the network than lower-priority packets.
- overcome or bypass the packet networks' innate characteristic of slowing down the delivery of specific packets when the network gets loaded or congested.
- do the above tasks with a high degree of network efficiency.

SUMMARY OF THE INVENTION

The foregoing problems are solved and a technical advance is achieved in accordance with the principles of this invention as disclosed in several structural embodiments of switching devices, methods, and network architectures. These device embodiments, methods, and network architectures utilize means for a master clock, means for synchronization of clocks in distributed network elements; means for switching within each network element in a non-blocking, non-delaying manner at a layer one level; means for scheduling and executing high-priority, real-time, or other layer one calls or sessions in each network element; means for controlling said synchronization means, said switching means, and said scheduling and execution means in each network element; and the resulting system or network architecture wherein all layer one network element inputs and outputs on a given path switch their packets, cells, or frames in a cut-through manner bypassing the entire network at a layer one or physical level at the correct scheduled time with minimal or no store-and-forward delays.

More simply put, all of the store-and-forward device embodiments in the network are synchronized. Then a source or destination sets up a reservation schedule with all of the network devices for transmitting real-time or high-priority packets. At the specific predetermined scheduled time, all of the devices on the scheduled path through the network switch the appropriate input and output lines to bypass their standard store-and-forward switches and switch open a direct non-blocking, non-delaying layer one physical connection from one end of the network to the other. The specific scheduled packets are then transmitted into one end of the network where they propagate directly through all of the layer one switches on the path to the other end of the network, with no delays other than transmission line and layer one switch propagation delays. In this way, they completely bypass the store-and-forward network with all of its inherent disadvantages for continuous, periodic, predictable, time-sensitive, or high-priority information. Once the packets have been sent all the way through the network and the scheduled layer one event is over, the devices switch back to standard store-and-forward switching for bursty, non-periodic, non-predictable, non-time-sensitive, and non-high-priority information. In this way, the system works to optimum advantage and efficiency for each of the two types of data and switching methods.

The network architecture itself consists of means for a master clock, time synchronization receiver means for synchronizing a clock on each network element; a source, which is a network element, also variously termed an originator or a caller; a departure router, which is a network element, also variously termed a departure switch, a departure node, or an originating edge node; mid-destination routers, which are network elements, also variously termed mid-destination switches, internal nodes, or middle nodes; a final destination router, which is a network element, also variously termed a final-destination switch, or terminating edge node; a receiver which is a network element, also termed a called party; and transmission paths connecting the network elements.

The architecture is such that a master clock synchronizes the device embodiments using receiving synchronization means. In the preferred embodiment, the master clock comprises the combined master clocks on the satellite Global Positioning System (GPS) commonly used today for timing and positioning measurements. GPS enables synchronization of device embodiment clocks down to the microsecond and nanosecond range. Descriptions of GPS timing techniques and the accuracies obtainable are covered in "Tom Logsdon's "Understanding the Navstar: GPS, GIS, and IVHS"; $2^{nd}$ edition; 1995; Van Nostrand Reinhold; Ch. 11; pp.158–174 which is hereby incorporated by reference.

Detailed descriptions of GPS, synchronization techniques, time codes, clock measurements, accuracies, stabilities, and other useful applications of GPS technology are covered in literature from the company TrueTime, Inc, 2835 Duke Court, Santa Rosa, Calif. 95407, including Application Note #7, "Affordable Cesium Accuracy"; Application Note #11, "Video Time and Message Insertion"; Application Note #12, "Multi User Computer Time Synchronization"; Application Note #14, "Model GPS-DC Mk III Oscillator Selection Guide"; Application Note #19, "Simplified Frequency Measurement System"; Application Note #20, "Achieving Optimal Results with High Performance GPS"; Application Note #21, "Model XL-DC in Frequency Control Applications"; Application Note #22, "TrueTime's GPS Disciplined Cesium Oscillator Option"; Application Note #23, "Precise Synchronization of Computer Networks: Network Time Protocol (NTP) for TCP/IP"; Application Note #24, "Precision Time and Frequency using GPS: A Tutorial"; Application Note #25, "Precise Synchronization of Telecommunication Networks"; and Application Note #26, "Real Time Modeling of Oscillator Aging and Environmental Effects". These application notes are available from TrueTime and are hereby incorporated by reference.

In addition, two-way transfer time synchronization methods may be used, including techniques similar to those described in "Two-way Satellite Time Transfer".

Nevertheless, the present invention is not limited to GPS for either the master clock means nor for the device embodiment synchronization means. Any reasonably accurate clock may serve as the master clock including, but not limited to atomic clocks, cesium, rubidium, hydrogen maser clocks, or even quartz clocks, also any satellite-based clock, for example, GPS, transit navigational satellites, GOES satellites; any wireless clock, for example LORAN, TV, WWVB radio, radio phone, local radio; any land-based clock using physical interconnections such as copper wire, cable, microwave, or fiber, such as the central office clocks used currently by the telecommunications providers for synchronizing their synchronous networks; or even sea-based clocks will work as a master clock for the purposes of the present invention.

In the same way, any time synchronization techniques for synchronizing the device embodiments with a master clock and with each other may be used, such as those explained in the Logsdon reference, for example absolute time synchronization, clock fly-overs, common-view mode, and multi-satellite common view mode; those explained in the TrueTime reference, such as Network Transfer Protocol (NTP); those explained in the U.S. Naval Observatory web publication reference, such as two-way time transfer; and various other techniques in use today such as the telecommunications synchronous network system used in central offices and other higher level switching centers today.

Once a reasonably accurate time synchronization has been established in the device embodiments, well known techniques such as two-way time synchronization, common-view mode, or multi-satellite common view mode can then be used between the device embodiments in the network to measure and correct, to a high degree of accuracy, slight timing disparities and propagation delays between themselves and adjoining device embodiments. This serves to maintaining and further tighten timing synchronization.

As the device embodiments are synchronized in the network, each device initiates its own layer one event scheduling process. This process includes building a layer one event schedule which thus enables the establishment of reservations for specific times or for periodic (repeating) times for each input and output line on each network element device embodiment. In this way, packets may be scheduled to be sent from specific input lines through the non-blocking, non-delaying layer one switch to specific output lines in each network element device embodiment.

At this point, a real-time source, a real-time destination, or another network element device embodiment can initiate a layer one call setup process for any purpose, such as a real-time application or high-priority message. This process establishes a specific time or periodic (repeating) time schedule in each of the synchronized layer one network device element embodiments along a specific path from the source through the synchronized network to the destination. At the scheduled time, each synchronized layer one network element device node embodiment along that path switches their appropriate input and output lines to bypass the normal store-and-forward buffering and switching, and route directly from the input lines through a non-blocking, non-delaying layer one switch and directly on through the output lines to the next synchronized network element device node which is synchronized and scheduled to do the same thing. In this way, at any scheduled instant, a packet may be sent in a cut-through manner directly from the source through the network to the destination with only the propagation delay of the transmission lines, the input and output bypass circuitry, and the layer one circuitry. This obtains the goal of a rapid, consistent, immediate, on-time, non-blocked, non-delayed, non-congested, loss-less, jitter-free, reliable flow of data in real-time, with guaranteed delivery and guaranteed quality of service.

The network element device embodiments comprise input and output switching means; input and output buffer means controlling means; non-blocking, non-delaying layer one switching means; and optionally, a packet-oriented, cell-oriented, frame-oriented, or other store-and-forward switching means.

The first network element device embodiment is the preferred embodiment in which a standard packet, cell, or frame oriented switching means is both included and integrated into the device embodiment, such that these device embodiments are deployed in standard packet, cell, or frame-oriented networks. In this scenario, the device embodiments normally operate in packet, cell, or frame-oriented mode using the packet, cell, or frame-oriented switch. However the device embodiments are then used to schedule and switch real-time and high-priority packets to cut-through and bypass the packet, cell, or frame-oriented switched network at the scheduled times. The control circuitry in these preferred device embodiments enables complete integration into existing packet, cell, or frame-oriented networks, including the capability to store and hold non-real-time and non-high-priority in-transit packets in buffers while the layer one switching occurs, and then resume sending the non-real-time and non-high-priority in-transit packets once the layer one switching is terminated. The control circuitry in these preferred device embodiments enables scheduled layer one switching from specific input lines to specific output lines through the non-blocking, non-delaying switch, while at the same time routing in normal packet, cell, or frame mode through the packet, cell, or frame switch for input and output lines that are not scheduled for layer one switching.

The second network element device embodiment is similar to the first network device embodiment, except that the standard packet, cell, or frame-oriented switching means is not integrated into the device embodiment as one complete integrated unit. Instead, the packet, cell, or frame-oriented switch is physically distinct, and the layer one network element device embodiment is "overlaid" or placed around the existing packet, cell, or frame-oriented switch. In this way, all external input and output lines going to and from the network route first through the second network element device embodiment and then are connected to the physically separate store-and-forward switch. The primary purpose of the second device embodiment is to enable the installation of layer one switching on top of existing store-and-forward switches in an existing network, to eliminate the costs of replacing the existing packet, cell, or frame-based switches.

As in the first device embodiment, the second device embodiment operates normally by switching standard store-and-forward packets through to the separate and distinct packet, cell, or frame-oriented switch. Like the first device embodiment, the second device embodiment also uses its layer one switch and control circuitry to schedule and switch real-time and high-priority packets to cut-through and bypass the store-and-forward network at the scheduled times. However, in this device embodiment, the control circuitry is not integrated into the packet, cell, or frame-oriented switch. Consequently, there is the capability to stop, store, and hold standard packets in the input buffers when there is a layer one switching conflict. However, because of the physically separate store-and-forward switch, there is no control capability to force the store-and-forward switch to stop, store, and hold standard packets while the layer one switching occurs through the output stage, and then resume sending the standard packets when the layer one switching is terminated. Instead, the layer one circuitry in the second device embodiment is modified so that the output from the store-and-forward switch automatically routes to an output buffer which it can control, such that no layer one collisions will occur in the output circuitry as well.

In a third device embodiment of the invention (not shown in the drawings as it merely deletes functionality from the second device embodiment), the costs and functionality of the second device embodiment of the invention are reduced even further, by "dummying it down," such that the input buffers are eliminated entirely from the third device embodiment. The primary purpose of the third device embodiment is to lower the layer one switching costs such that installation of layer one switching on top of existing store-and-forward switches in an existing network is very cost-compelling.

As in the second device embodiment, the third device embodiment operates normally by switching standard store-and-forward packets through to the separate and distinct packet, cell, or frame-oriented switch. Like the second device embodiment, the third device embodiment also uses its layer one switch and control circuitry to schedule and switch real-time and high-priority packets to cut-through and bypass the store-and-forward network at the scheduled times. However, as in the second device embodiment, there is no control circuitry integrated into the packet, cell, or frame-oriented switch and there are no input buffers. Consequently, there is no capability to stop, store, and hold standard packets in the input stage when there is a layer one switching conflict. Instead, the layer one control circuitry in this third device embodiment theoretically may interrupt standard incoming store-and-forward packets in order to execute scheduled layer one switching from specific input lines to specific output lines. Should this theoretical interruption occur, a standard packet may be lost. If loss of the packet would occur, it would likely be re-sent through its normal protocol flow control. In actual practice, however, if the clock timing of the third device embodiment is closely synchronized to the layer one device that is transmitting the layer one packets, the likely event is that very few bits would be lost on the preceding, incoming standard packet. In fact, if any bits were lost on the incoming line, they would most likely be the trailing flag bits, frame delimiter bits, or synchronization bits, from the preceding standard packet. As long as the end of frame, packet, or cell is recognized by the input circuitry of the separate store-and-forward switch, the devices will function normally. As stated previously, should any loss of standard packets, cells, or frames occur, in most cases the protocols would re-transmit the missing data.

In a fourth device embodiment of the invention (not shown in the drawings as it merely deletes functionality from the second device embodiment), the costs and functionality of the third device embodiment of the invention are reduced even further, by "dummying it way down", such that the input and output buffers are eliminated entirely from the fourth device embodiment. The primary purpose of the fourth device embodiment is to significantly lower the layer one switching costs such that installation of layer one switching on top of existing store-and-forward switches in an existing network is extremely cost-compelling.

As in the third device embodiment, the fourth device embodiment operates normally by switching standard store-and-forward packets through to the separate and distinct packet, cell, or frame-oriented switch. Like the third device embodiment, the fourth device embodiment also uses its layer one switch and control circuitry to schedule and switch real-time and high-priority packets to cut-through and bypass the store-and-forward network at the scheduled times. However, as in the third device embodiment, there is no control circuitry integrated into the packet, cell, or frame-oriented switch and there are no input or output buffers. Consequently, there is no capability to stop, store, and hold standard packets in the input or output stages when there is a layer one switching conflict. Instead, the layer one control circuitry in this fourth device embodiment in practice will possibly interrupt standard incoming store-and-forward packets and will likely interrupt standard outgoing store-and-forward packets in order to execute scheduled layer one switching from specific input lines to specific output lines. When this practical interruption occurs, a standard packet will likely be lost. If loss of the packet occurs, it would also likely be re-sent through its normal protocol flow control. The fourth embodiment is not recommended, but could be used to implement very inexpensive layer one devices on top of existing store-and-forward networks, where highly cost-effective real-time or high-priority switching is desired at the understood expense of retransmitting the standard bursty, non-periodic, non-time-sensitive, lower priority store-and-forward traffic.

The fifth device embodiment consists of placing the same device elements in the Source and/or Destination device, such that the Source and/or Destination device outside of the network edge node is also outfitted with a master clock synchronization means, controlling means, input and output bypass switching and buffering means, normal packet, cell, or frame input and output circuitry means, and real-time (layer one) input and output circuitry means.

The sixth device embodiment is an extension of the fifth device embodiment, in that the layer one end-user functionality may be adapted to a Local Area Network (LAN) such as Ethernet or Token Ring by using the fifth device embodiment or "end-user" embodiment as the LAN controller, LAN bridge and/or LAN router, and either using the master clock and timing synchronization means to synchronize each LAN-attached device directly or having each LAN-attached device synchronize off of the synchronized clock on the LAN controller, bridge, and/or router. Modifying the software such that (a) all the LAN-attached devices have synchronized clocks, (b) each LAN-attached device keeps track of the other LAN-attached devices' scheduled times, and (c) all LAN-attached devices do not attempt normal LAN operation when a layer one event is scheduled for another LAN-attached device, thus enables each device on the LAN to send and receive layer one packets directly and still keep normal LAN operation when layer one events are not scheduled. Each LAN-attached device can then send a layer one call setup message requesting a layer one scheduled time. Each network element on the layer one path would attempt to set up the call or session as with any other layer one setup. This would not require a need to modify the basic protocol. In effect, the basic protocol would be suspended for the layer one scheduled time. In this way, applications like Internet phone could send and receive scheduled layer one packets through the bridge or router, and out into any layer one network to any layer one connected destination. This approach would also work on intranets so that calls could be made within the LAN or intranet itself.

The seventh device embodiment does not include a standard packet, cell, or frame-oriented switching means, such that these device embodiments only switch packets in an entirely and exclusively layer one scheduled network.

The layer one Event Scheduling process comprises a layer one Call Setup Process, a layer one Switching Process, a layer one Inter-Node Call Setup Process, and a layer one Call TearDown Process. The layer one Call Setup Process schedules a layer one Event along a path of layer one device embodiments through a layer one network. The layer one Switching process switches the layer one packets through the layer one network at the scheduled times. The layer one Inter-Node Call Setup Process establishes calls between layer one device embodiments in the network for purposes of time synchronization, rapid call setups, emergencies, administration, etc. The layer one TearDown Process terminates layer one calls and frees up the layer one Scheduling process for other layer one calls.

Further, the layer one Event Scheduling Process has various Reject Mode handling capabilities that it can implement if it cannot successfully set up a call. Some examples of Reject Mode include sending a Reject Message back to the previous node thereby canceling setup of the call, enabling the node device embodiment to try an alternate route; or determining the next best scheduled time that fits into the original parameters on the Call Setup Request.

Finally, the process by which the layer one switching system works is achieved in the following steps:

Step 1—All routers set their clocks to exactly the same time, within some extremely small acceptable tolerance so that small variations are insignificant compared to the bit rate of the routers and transmission systems. Once the clocks are synchronized, all routers then measure or compute the approximate transmission delay times between themselves and their adjacent routers, as explained later.

Step 2—Real-time or high-priority Source 1 sends a call setup message to Departure Router 2 indicating that it wants to set up a real-time or high-priority layer one transmission to real-time or high-priority Receiver 5. This message may notify the Departure Router 2 that this is the first of a long stream of packets whose delivery is time-dependent and should not be subject to router, buffer, multiple paths, or other packet network delays. Included in this notification should be a minimum of the requested bit rate for the data and the requested periodicity.

Step 3—Departure Router 2 looks at the intended destination and requested data rate in the call setup message. Just as it does in standard packet switching, it determines that the next router is Mid-destination Router 3 and the transmission path is Transmission Path 12. Departure Router 2 then looks at Transmission Path 12's data rate and compares it to the requested data rate from real-time or high-priority Source 1. Departure Router 2 then determines how frequently and for what duration it should send packets of data from real-time or high-priority Source 1 over Transmission Path 12 to Mid-destination Router 3. This determination is based upon data rates and pre-existing layer one schedules/reservations that may already be in existence. Based upon this determination, Departure Router 2 reserves exact times and durations for it to send information over Transmission Path 12 to Mid-destination Router 3. It then sends a call setup message to Mid-destination Router 3 telling it that it is requesting to reserve/schedule a real-time or high-priority transmission, along with the appropriate source address, destination address, its preferred departure times and duration time from Departure Router 2, and its estimated arrival times at Mid-destination Router 3.

Step 4—The Mid-destination Router 3 receives the call setup message from Departure Router 2. Router 3 looks at the source, destination, and requested data rate. It determines that the next router is Final Destination Router 4 using Transmission Path 13. It then looks at its own schedule, the transmission delay times, the calculated arrival times and duration time of the data that is to come from Departure Router 2. Mid-destination Router 3 then tries to schedule its physical-layer or layer one switching mechanism to effectively "hardwire" route the stream straight on through to the Final Destination Router 4. If there is a scheduling conflict due to an existing schedule, Mid-destination Router 3 may use various Reject Modes to try to accommodate the data by buffering and delaying it very slightly. If this can't be done with only a slight delay, Mid-Destination Router 3 may determine a reservation/schedule that works better for it. It reserves those times and communicates back to Departure Router 2 its suggested changes to the original schedule. It also may at this time notify Final Destination Router 4 what it is trying to do to determine what unreserved/unscheduled time Final Destination Router 4 might have available. This information is passed back to Departure Router 2. In this way the routers may negotiate an acceptable reservation/schedule that works for all of them.

If no schedule is acceptable, then the Departure Router 2 notifies the real-time or high-priority Source 1 that it has been unable to set up a guaranteed real-time or high-priority layer one reservation. Real-time or high-priority Source 1 can then decide if it wants to: (a) use standard packet switching with all of the inherent delays, (b) wait until the reservation/schedule frees up from other sessions which will complete and tear down their reservations/schedules soon, or (c) begin a standard packet switching session with the hope that a guaranteed real-time or high-priority reservation/schedule will become available during the session as other real-time or high-priority sessions are completed and torn down. In situation (c) a standard packet switching style session can be converted to a guaranteed on-time real-time or high-priority layer one session once the reservation/scheduling arrangements can be made, even during the course of a session, if desired.

Step 5—Final Destination Router 4 repeats the process described in Step 4, communicating its reservation/schedule back to Departure Router 2 and Middestination Router 3 until an acceptable reservation/schedule is set up between them. Final Destination Router 4 then notifies the Real-time or high-priority Receiver 5 that a session is being established. In this way the Real-time or high-priority Receiver 5 gets ready to accept Real-time or high-priority data input.

Step 6—Once the reservation/scheduling is agreed upon, Departure Router 2 notifies real-time or high-priority Source 1 to start shipping data. Departure Router 2 then ships the data to Mid-destination Router 3 over Transmission Path 12 at exactly the agreed upon time. Mid-destination Router 3 is ready and waiting for the data at exactly the calculated arrival time and "hardwire" layer one switches the data straight on through to Final Destination Route 4 over Transmission Path 13 at precisely the correct times. Final Destination Route 4 then "hardwire" layer one switches the data straight on through to the Real-time or high-priority Receiver 5 over Transmission Path 14.

Step 7—When the session has no more data to ship, for example, the streaming program is completed, or the phone call is "hung up", then the reservation/schedule for that session needs to be torn down. This event can be triggered by a TearDown notification message from either of the end routers to the routers along the path. Once a router receives notification that the session is over, it tears down that session, wherein it frees up its reservation schedule, and reverts to standard packet network mode until another guaranteed real-time or high-priority session is requested and negotiated, which starts the process all over again.

It is accordingly an object of the present invention to guarantee high-quality, rapid, consistent, on-time, non-blocked, non-delayed, non-congestion-affected, loss-less, jitter-free, reliable delivery of packets in a packet network, for real-time, high-priority, and/or high-quality-of service applications that require it. It does this in the following ways: (a) It assures delivery of the packets in order without being discarded or dropped as in normal packet, cell, or frame switching. (b) It delivers the packets on time by scheduling arrival times and departure times. (c) It reduces delays by skipping the queuing mechanisms in the routers. (d) It eliminates the need for large buffers, thereby reducing or eliminating long start delays and awkward pauses. (e) It reduces significantly or entirely eliminates jitter by delivering packets at known, predictable times.

Thus the overall benefits of the invention are:

It establishes a means to deliver packets, cells, or frames over a packet switched network in a way that guarantees that they will be delivered on-time and in time to be used by the receiving application. This means that packets won't be lost or arrive too late to be used by the application.

It reduces the overall delay time for real-time applications such as voice, video, and other real-time multimedia delivery needs over a packet network. This will reduce or eliminate the noticeable "lag-time" for Internet Phone. It also will reduce or eliminate the delayed start times in "streaming" audio and video, because the receiver doesn't need to wait to fill its huge incoming buffer.

It can be used as a prioritization and advanced reservation scheme, thus assuring high priority users that they can have the capacity needed at a particular time.

It solves the non-guaranteed, random, lossy degraded, and delayed response time problems of packet, cell, and frame-based networks for real-time applications, high-priority messages, and high-quality-of-service.

It works with standards based protocols and networks, e.g., RIP, OSPF, RSVP, ISA, IGMP (multicast), ATM, TCP/IP, Ethernet, Token Ring, X.25, Frame Relay, SMDS.

It thus creates the capability for a Next Generation of routers and/or software

DEFINITIONS

Throughout this disclosure, various devices, methods, and systems are described in various manners using various descriptive terms. Thus, for purposes of understanding the context, scope, and clarity of the present disclosure, the following definitions are provided.

The term switching as used in the present invention describes multiple functions including, but not limited to the origination of data (as in a source network element); the reception of data (as in a destination network element); the transfer of data directly through a network element (as in pure layer one switching); and the reception, storage, and retransmission of data through a network element (with buffering). Consequently, the term switching in the present invention is defined as comprising at least, but is not limited to, one or more of the following operations: transferring, transferring to, transferring from, transferring over, transferring between, transmitting, communicating, sending, receiving, retransmitting, broadcasting, multicasting, uni-casting, switching, routing, relaying, storing, retrieving, forwarding, storing-and-forwarding, bypassing, passing through, tunneling, tunneling through, cutting through, and/or any other method of moving information either into a device, out of a device, or through a device.

The terms transmitting and transmission, as used in the present invention, are also used to describe the origination of data (as in a source network element—transmit from); the reception of data (as in a destination network element—received transmission); the transfer of data directly through a network element (as in pure layer one switching—transmitted through); and the reception, storage, and retransmission of data through a network element (with buffering—transmitted through). Thus, the terms transmitting and transmission are defined as comprising at least, but are not limited to, one or more of the following operations: transferring, transferring to, transferring from, transferring over, transferring between, transmitting, communicating, sending, receiving, retransmitting, broadcasting, multicasting, uni-casting, switching, routing, relaying, storing, retrieving, forwarding, storing-and-forwarding, bypassing, passing through, tunneling, tunneling through, cutting through, and/or any other method of moving information either into a device, out of a device, or through a device.

Information is defined as at least, but not limited to data communicable over a network. Information comprises, but is not limited to one or more of the following types of data: data that has been formatted in a packet, cell, or frame; data that has a header; data in which a header has been removed or replaced; voice data; video data; telephony data; video conferencing data; computer data; computer host data; computer network data; local area network data; stored data; retrieved data; scheduled data; guaranteed data; layer one data; layer two data; layer three data; layer four data; phone data; Internet phone data; packet phone data; Internet video conferencing data; video streaming data; audio streaming data; multimedia data; multimedia streaming data; broadcast data; multicast data; point-to-point data; emergency message data; time-dependent data; network control data; guaranteed delivery data; important data; urgent data; and/or any other data associated with layer one switching. Information also comprises data associated with, but not limited to, one or more of the following applications: browsers, web browsers, browser applications, graphics, viewers, electronic mail, voice, voice mail, video, video conferencing, shared white-boarding, analog to digital conversion, digitization, compression, packetization, de-packetization, de-compression, digital-to-analog conversion, real-time applications, computer applications, computer host applications, computer network applications, storage applications, storage network applications, database applications, retrieval applications, scheduled applications, guaranteed delivery applications, high-priority applications, Quality of Service (QoS) applications, Class of Service (CoS) applications, Type of Service (ToS) applications, layer one applications, layer one session applications, phone applications, Internet phone, Internet phone applications, packet phone applications, Internet video conferencing, video streaming, audio streaming, multimedia, multimedia streaming applications, broadcast applications, multicast applications, emergency system applications, time-sensitive applications, time-dependent applications, network control applications, guaranteed delivery applications, important information applications, and urgent information applications.

Information also comprises, but is not limited to, data associated with one or more of the following protocols: any data network protocols, computer network protocols, local area network protocols, Ethernet protocols, token ring protocols, internet protocols, intranet protocols, IP protocols including TCP/IP protocols and UDP/IP protocols, asynchronous transfer mode (ATM) protocols, X.25 protocols, routing protocols, routed protocols, voice over IP protocols, voice mail protocols, storage network protocols, database protocols, retrieval network protocols, store-and-forward protocols, frame relay protocols, resource reservation protocols, bit stream reservation protocols, layer one protocols, layer two protocols, layer three protocols, layer four protocols, higher layer protocols, call or session setup protocols, call or session teardown protocols, cut-though protocols, flow protocols, asynchronous protocols, synchronous network protocols, and/or any other network or communication protocols.

A network element and/or device is defined as at least, but not limited to, one or more elements, components, subcomponents, mechanisms, sub-mechanisms, systems, subsystems, processors, nodes, and/or any other devices used in, attached to, or associated with a network of any sort. Network elements may comprise at least, but are not limited to, one or more of the following elements, components, subcomponents, mechanisms, sub-mechanisms, systems, subsystems, processors, nodes, and/or devices: pure layer one embodiments, layer two elements, layer three elements, layer four elements, end user embodiments, overlay embodiments, integrated embodiments, local area network embodiments, cut-through embodiments, source elements, destination elements, departure elements, combinations of source elements with other network elements, combinations of destination elements with other network elements, originating edge node elements, departure node elements, mid-destination elements, final destination elements, terminating edge node elements, and/or any other elements, components, subcomponents, mechanisms, sub-mechanisms, systems, subsystems, processors, nodes, or any other devices used in a network of any sort.

Network elements and/or devices may comprise at least, but are not limited to, one or more of the following devices, instruments, apparatus, mechanisms, and/or functional components: communications devices; telecommunications devices; data communications devices; hybrid network devices; network-attached devices; local area network-attached devices, such as local area network controllers, local area network bridges, local area network routers, local area network switches, and/or local area network hubs; browser devices; web browser devices; graphics devices; electronic mail devices; voice devices; video devices; video conferencing devices; real-time devices; end-user devices; computer devices; computer host devices; server devices; processor devices; microprocessor devices; integrated circuit devices; computer network devices; storage devices; retrieval devices; storage area network devices; memory devices; database devices; switching devices; routing devices; workstations; bridges; hubs; wireless devices; scheduled devices; guaranteed delivery devices; high-priority devices; layer one devices; phone-oriented devices, such as Internet phone devices, packet phone devices, private branch exchanges (PBXs), and telephone instruments; Internet video conferencing devices; video streaming devices; audio streaming devices; multimedia devices; multimedia streaming application devices; broadcast application devices; multicast application devices; emergency system application devices; time-sensitive application devices; time-dependent application devices; network control application devices; guaranteed delivery application devices; important information application devices; urgent information application devices; interconnection devices; gateways to other networks; and/or any other device, instrument, mechanism and/or functional component used in, associated with, and/or attached to a network of any sort.

Network elements and/or devices may be operable in at least, but not limited to, one or more of the following networks: communications networks, telecommunications networks, data communications networks, local area networks, Ethernet local area networks, ring-style local area networks, token-style local area networks, star-type local area networks, point-to-point networks, loop networks, arbitrated loop networks, multi-drop bus networks, fabric networks, voice networks, video networks, video conferencing networks, real-time networks, computer networks, processor networks, microprocessor networks, storage networks, retrieval networks, storage area networks, database networks, server networks, switching networks, routing networks, store-and-forward networks, cut-through networks, scheduled networks, guaranteed delivery networks, high-priority networks, layer one networks, phone networks, private branch exchange (PBX) networks, Internet phone networks, packet phone networks, Internet video conferencing networks, video streaming networks, audio streaming networks, multimedia networks, multimedia streaming networks, broadcast networks, multicast networks, emergency system networks, time-sensitive networks, time-dependent networks, network control networks, guaranteed delivery networks, important information networks, hybrid networks, urgent information networks, and/or any other networks which may be adapted to functionally carry out layer one switching.

Network elements and/or devices may be operable using at least, but not limited to, one or more of the following protocols: any data network protocols, computer network protocols, local area network protocols, Ethernet protocols, token ring protocols, internet protocols, intranet protocols, IP protocols including TCP/IP protocols and UDP/IP protocols, asynchronous transfer mode (ATM) protocols, X.25 protocols, routing protocols, routed protocols, voice over IP protocols, voice mail protocols, storage network protocols, database protocols, retrieval network protocols, store-and-forward protocols, frame relay protocols, resource reservation protocols, bit stream reservation protocols, layer one protocols, layer two protocols, layer three protocols, layer four protocols, higher layer protocols, call or session setup protocols, call or session teardown protocols, cut-though protocols, flow protocols, asynchronous protocols, synchronous network protocols, and/or any other network or communication protocols.

Network elements and/or devices may be associated with at least one or more of the following applications: browsers, web browsers, browser applications, graphics, viewers, electronic mail, voice, voice mail, video, video conferencing, analog to digital conversion, digitization, compression, packetization, de-packetization, de-compression, digital-to-analog conversion, real-time applications, computer applications, computer host applications, computer network applications, storage applications, storage network applications, database applications, retrieval applications, scheduled applications, guaranteed delivery applications, high-priority applications, Quality of Service (QoS) applications, Class of Service (CoS) applications, Type of Service (ToS) applications, layer one applications, layer one session applications, phone applications, Internet phone, Internet phone applications, private branch exchange (PBX) applications, packet phone applications, Internet video conferencing, video streaming, audio streaming, multimedia, multimedia streaming applications, broadcast applications, multicast applications, emergency system applications, time-sensitive applications, time-dependent applications, network control applications, guaranteed delivery applications, important information applications, and/or urgent information applications.

Network elements and/or devices may comprise and/or be associated operationally with at least one or more of the following elements and/or components: microprocessors, processors, integrated circuits, application specific integrated circuits, programs, memory, program memory, stored memory, random access memory (RAM), memory devices, storage, storage devices, queues, buffers, shift registers, and switches.

The terms synchronizing and synchronization are defined as comprising at least, but are not limited to, one or more elements, mechanisms, methods and/or schemes for establishing, coordinating, and/or maintaining timing in one or more network elements and/or devices. Synchronizing and synchronization may be achieved by, but are not limited to, utilizing one or more of the following elements, mechanisms, methods, and/or schemes: master clock; central clock; receiver clock; Global Positioning System; differential Global Positioning System; synchronization transmitter; synchronization receiver; synchronization transmission media; atomic clocks; cesium clocks; rubidium clocks; hydrogen maser clocks; quartz clocks; satellite-based clocks; transit navigational satellite clocks; GOES satellite clocks; telecommunications synchronous network systems; wireless clocks; LORAN clocks; TV clocks; WWVB radio clocks; radio phone clocks; local radio clocks; land-based clocks with physical interconnections such as copper wire, cable, microwave or fiber; central office clocks; sea-based clocks; any other accurate clocks; in-band synchronization; out-of-band synchronization; local area network synchronization clocks; pulses; master pulses; propagation delay; pulses plus propagation delay; synchronization pulses; synchronization pulses on transmission lines; synchronization signals; wireless synchronization pulses; synchronization bits; synchronization bits from one or more packets; synchronization packets; synchronization cells; synchronization frames; loose synchronization; close synchronization; synchronization within a safety zone time window; synchronization by comparison of expected packet, cell, or frame arrival time to actual packet, cell, or frame arrival time; synchronization based on previous packet, cell, or frame arrival time; common mode time transfer; absolute time synchronization; relative time synchronization; clock fly-overs; common-view mode; multi-satellite common view mode; time-stamped clock information; time codes; two-way time transfer; one-way time transfer; Network Transfer Protocol; Network Time Protocol; Real Time Protocol; and any other elements, mechanisms, methods and/or schemes used for establishing, coordinating, and/or maintaining timing in one or more network elements and/or devices.

A synchronization component is defined as at least, but not limited to, one or more elements and/or mechanisms used for synchronization of one or more distributed network elements or devices. Synchronization components may comprise at least, but are not limited to, one or more of the following elements and/or mechanisms: master clock; central clock; Global Positioning System; differential Global Positioning System; synchronization transmitter; synchronization receiver; synchronization transmission media; atomic clocks; cesium clocks; rubidium clocks; hydrogen maser clocks; quartz clocks; satellite-based clocks; transit navigational satellite clocks; GOES satellite clocks; telecommunications synchronous network systems; wireless clocks; LORAN clocks; TV clocks; WWVB radio clocks; radio phone clocks; local radio clocks; land-based clocks with physical interconnections such as copper wire, cable, microwave or fiber; central office clocks; sea-based clocks; any other accurate clocks; in-band synchronization; out-of-band synchronization; local area network synchronization clocks; pulses; master pulses; propagation delay; pulses plus propagation delay; synchronization pulses; synchronization pulses on transmission lines; synchronization signals; wireless synchronization pulses; synchronization bits; synchronization bits from one or more packets; synchronization packets; synchronization cells; synchronization frames; loose synchronization; close synchronization; synchronization within a safety zone time window; comparison of expected packet, cell, or frame arrival time versus actual packet, cell, or frame arrival time; synchronization based on previous packet, cell, or frame arrival time; and/or any other elements or mechanisms used for synchronization of one or more distributed network elements or devices.

A reservation schedule is defined as at least, but not limited to, one or more elements and/or mechanisms used to reserve one or more times for the operation of switching, transferring, transmitting, bypassing, or receiving information. A reservation schedule may comprise at least, but is not limited to, one or more of the following elements and/or mechanisms: one or more specific times; one or more absolute times; one or more relative times; one or more periodic times and/or periodic time intervals; one or more repeating times; one or more non-periodic times; one or more start times; one or more completion and/or end times; one or more sources and/or one or more destinations, which may include internal ports or addresses as well as external ports or addresses; and availability status for said times, said sources, and/or destinations, such as available, unavailable (reserved), or tentatively scheduled. An example of a reservation schedule, specifically an example of a layer one event schedule is shown in FIG. 37. The terms open and opening are defined as establishing a direct layer one physical connection through one or more network elements.

The terms close and closing are defined as disconnecting a direct layer one physical connection through one or more network elements.

A layer one connection is defined as a physical connection into, out of, through, or around a device and/or network element at a physical layer one level. Said layer one connection is determined based upon time as opposed to header information, although header information may be used for call setup and in the originating edge node. A layer one connection may or may not include buffering.

Connection media into and out of layer one switching devices and/or network elements may comprise one or more of, but is not limited to, the following connection media: electrical media, wire media, copper wire media, cable media, coaxial cable media, microwave media, wireless media, optical media, and fiber media.

The terms store-and-forward switching, store-and-forward switch, and/or store-and-forward switching component, as used in the present invention refer to any layer two or higher-layer packet-based, cell-based, or frame-based data switching network element, device, instrument, apparatus, mechanism, and/or component. Store-and-forward switching, store-and-forward switches, and/or store-and-forward switching components may comprise at least, but are not limited to, one or more of the following layer two or higher-layer network elements, devices, instruments, apparatus, mechanisms, and/or components: communications devices; telecommunications devices; cut-through switches; cut-through devices; data communications devices; hybrid network devices; network-attached devices; local area network-attached devices, such as local area network controllers, local area network bridges, local area network routers, local area network switches, and/or local area network hubs; browser devices; web browser devices; graphics devices; electronic mail devices; voice devices; video devices; video conferencing devices; real-time devices; end-user devices; computer devices; computer host devices; server devices; processor devices; microprocessor devices; integrated circuit devices; computer network devices; storage devices; retrieval devices; storage area network devices; memory devices; database devices; switching devices; routing devices; workstations; bridges; hubs; wireless devices; scheduled devices; guaranteed delivery devices; high-priority devices; phone-oriented devices, such as Internet phone devices, packet phone devices, private branch exchanges (PBXs), and telephone instruments; Internet video conferencing devices; video streaming devices; audio streaming devices; multimedia devices; multimedia streaming application devices; broadcast application devices; multicast application devices; emergency system application devices; time-sensitive application devices; time-dependent application devices; network control application devices; guaranteed delivery application devices; important information application devices; urgent information application devices; interconnection devices; gateways to other networks; and/or any other layer two or higher-layer device, instrument, and/or mechanism used in, associated with, or attached to a network of any sort.

Store-and-forward switching, store-and-forward switches, and/or store-and-forward switching components may comprise at least, but are not limited to, one or more of the following layer two or higher-layer network protocols: any data network protocols, computer network protocols, local area network protocols, Ethernet protocols, token ring protocols, internet protocols, intranet protocols, IP protocols including TCP/IP protocols and UDP/IP protocols, asynchronous transfer mode (ATM) protocols, X.25 protocols, routing protocols, routed protocols, voice over IP protocols, voice mail protocols, storage network protocols, database protocols, retrieval network protocols, store-and-forward protocols, frame relay protocols, resource reservation protocols, bit stream reservation protocols, layer two protocols, layer three protocols, layer four protocols, higher layer protocols, call or session setup protocols, call or session teardown protocols, cut-though protocols, flow protocols, asynchronous protocols, synchronous network protocols, and/or any other layer two or higher-layer network or communication protocols.

Layer one switching circuitry is defined as circuitry capable of establishing a physical layer one connection into, out of, through, and/or around a network element. Layer one switching circuitry may or may not include buffering and various input to output switching components. Layer one switching circuitry may comprise a non-blocking, non-delaying switching fabric; but it may also comprise a blocking and/or delaying switching fabric. In addition, when used with buffering and other input and output switching elements, the layer one switching circuitry may be caused to act like a non-blocking, non-delaying switch layer one switch; or it may be caused to act like a blocking and/or delaying layer one switch.

Bypass switching circuitry is defined as circuitry capable of establishing a physical connection and/or a layer one connection into, out of, through, and/or around a layer two or higher-layer device and/or network element. Bypass switching circuitry may or may not include buffering. Bypass switching utilizes layer one switching circuitry. Bypass switching circuitry may utilize separate switching fabric from the layer two and/or higher-layer device it bypasses; or the bypass switching circuitry may utilize the same switching fabric as the layer two or higher-layer switching circuitry, such that a single switching fabric is used for both functions, which may also be called layer one cut-through switching or layer one tunneling.

BRIEF DESCRIPTION OF THE DRAWINGS

FIG. 8 also shows two examples of the sixth device embodiment as layer one Local Area Network or LAN systems.

FIG. 14 shows the Operational Process for Edge Input Circuitry, wherein the process behind the operation of the input means shown in FIG. 13 is explained.

FIG. 15 shows the Operational Process for Non-Edge or Internal Layer One Input Circuitry, wherein the process behind the operation of the input means shown in FIG. 13 is explained.

FIG. 17 shows the Input Queue Manager Process, wherein the process behind the operation of the input buffer means shown in FIG. 16 is explained.

FIG. 19 and FIG. 20 show the Operational Process for Edge Output Circuitry, wherein the process behind the operation of the output means shown in FIG. 18 is explained.

FIG. 21 and FIG. 22 show the Operational Process for Non-Edge or Internal Layer One Output Circuitry, wherein the process behind the operation of the output means shown in FIG. 18 is explained.

FIG. 23 is a detailed schematic diagram of a preferred embodiment of output buffer means according to the present invention, including output switching means, output switching control means, output buffer bypass means, output buffer memory means, output interface handler means, address resolution means, output queue manager means, and output program memory means.

FIG. 24 shows the Output Queue Manager Process, wherein the process behind the operation of the output buffer means shown in FIG. 23 is explained.

FIG. 33 and FIG. 34 show the master controller process used to operate the controller shown in FIG. 30, FIG. 31, and FIG. 32.

FIG. 37 is an illustrative example of a layer one event schedule, including time, inputs, outputs, status, time to kill, time offsets, and propagation delays according to the present invention.

FIG. 42 shows an exemplary layer one call setup request message parameter list according to the present invention.

DETAILED DESCRIPTION

Figure 1:
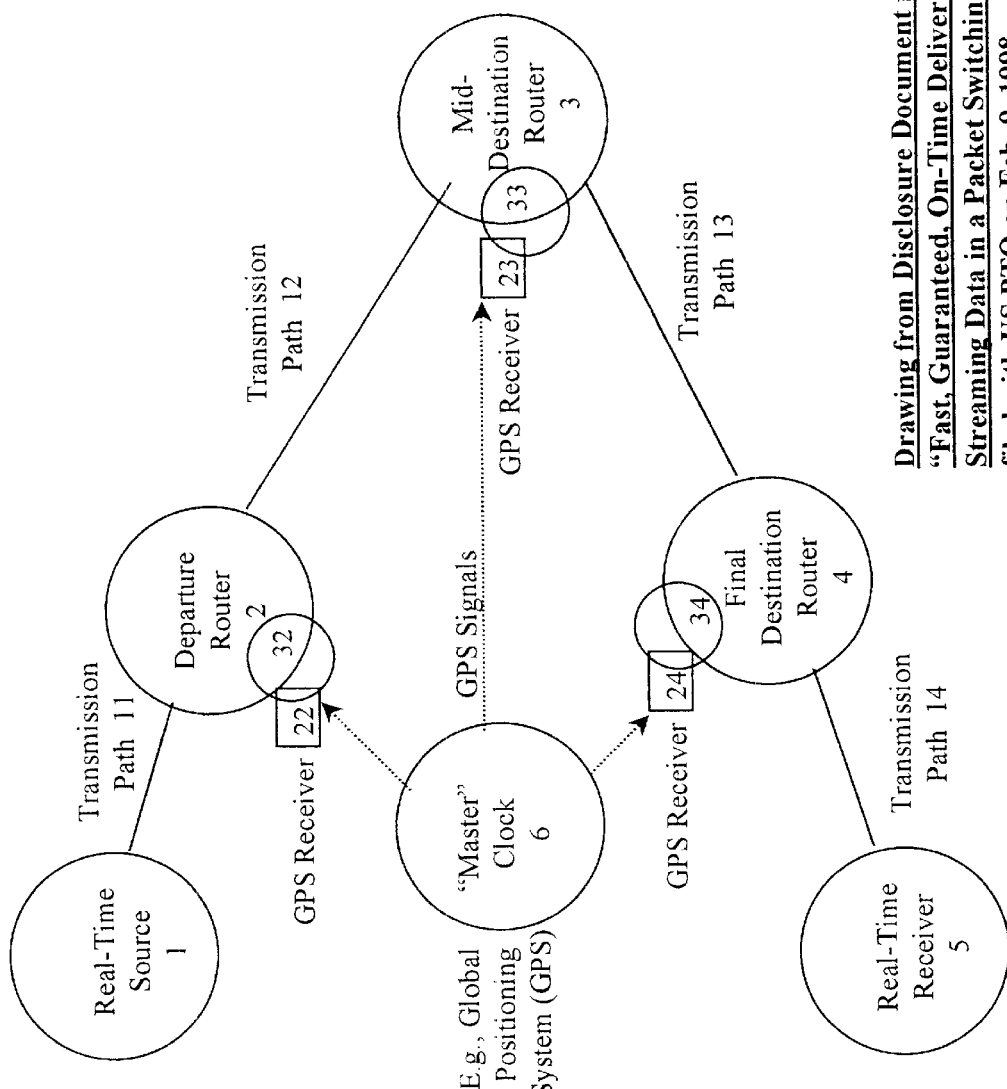
FIG. 1 is a high-level functional block diagram of a certain environment and components of a network system as disclosed in Disclosure Document No. 431129, referenced previously. It shows a packet-switched network comprised of routers which are synchronized by a master clock, according to a preferred embodiment of the network architecture according to the present invention.

FIG. 1 shows an illustrative packet, cell, or frame-based network as disclosed in U.S. PTO Disclosure Document No. 431129, which has been previously incorporated herein by reference.

FIG. 1 comprises a real-time data source or call originator 1 such as a streaming audio/video application source or an Internet phone caller, a departure router, switch, or originating edge node 2; a mid-destination router, switch, or middle node 3; a final destination router, switch, or terminating edge node 4; and a real-time receiver or destination 5 for the real-time streaming audio/video application destination and/or Internet phone or video conference receiver.

FIG. 1 also illustratively shows a transmission/communications path 11 between the real-time data source or call originator 1 and the departure router, switch, or originating edge node 2; a transmission/communications path 12 between the departure router, switch, or originating edge node 2 and the mid-destination router, switch, or middle node 3, a transmission/communications path 13 between the mid-destination router, switch, or middle node 3 and the final destination router, switch, or terminating edge node 4; and a transmission/communications path 14 between the final destination router, switch, or terminating edge node 4 and the real-time receiver or destination node 5.

FIG. 1 includes upgraded hardware and software 32, 33, and 34 which is added to standard packet, cell, or frame network routers and switches designated network elements 2, 3, and 4 in order to create the capabilities of the present invention.

FIG. 1 includes a master clock 6 which communicates with receiver/synchronization means 22, 23, and 24, thereby enabling the network device embodiments of the present invention to synchronize their clocks to a high degree of accuracy.

For practical purposes, the preferred embodiment of the present invention uses the existing satellite Global Positioning System (GPS) as the master clock 6. The GPS system and means for synchronizing the network elements will be described in more detail later. However, any means for synchronizing the clocks to a high degree of accuracy is acceptable, such as synchronization pulses on transmission lines, synchronization through radio signals, atomic, cesium, or radium clocks, etc.

Figure 2:
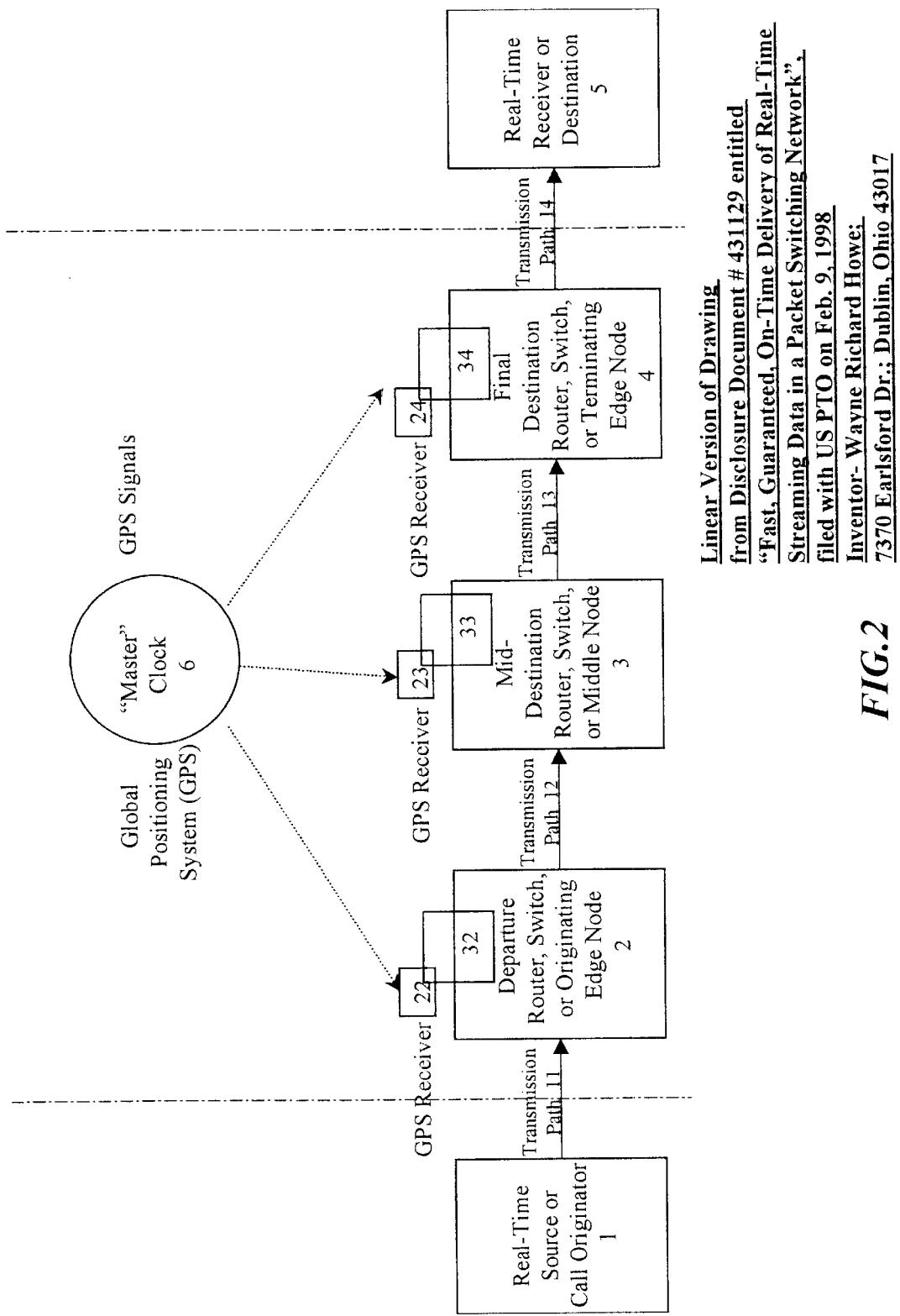
FIG. 2 is a redrawing of FIG. 1, done in a linear manner for easier visual understanding, such that data clearly flows from left to right, i.e., from source to destination, through the network system according to a preferred embodiment of the present invention.

FIG. 2 shows a redrawing of FIG. 1 done in a linear manner with additional descriptors to better enable discussion of the flow of data and information from left to right. In this way information can be seen to travel from the real-time source or originator 1 on the left through the network elements comprising departure router or originating edge node 2, 22, and 32, through mid-destination router or middle node 3, 23, and 33, through final destination router or terminating edge node 4, 24, and 34, and finally to real-time receiver or destination 5. In these diagrams, the mid-destination router or middle node 3, 23, and 33 are meant to represent a plurality of middle nodes 3, 23, and 33. The vertical lines indicate the boundaries or edges of the network with the source 1 and destination 5 lying outside of the network.

Additional hardware/software 32, 33, and 34 includes means to enable a layer one or physical layer bypass connection for the transfer of incoming data from one incoming line such as transmission path 12 to an outgoing line such as transmission path 13 through mid-destination node 3 and 33. This capability enables real-time or high-priority packets to bypass the standard queuing or buffering means of routers and switches 2, 3, and 4 and tunnel straight through the node at the physical or layer one level.

Figure 3:
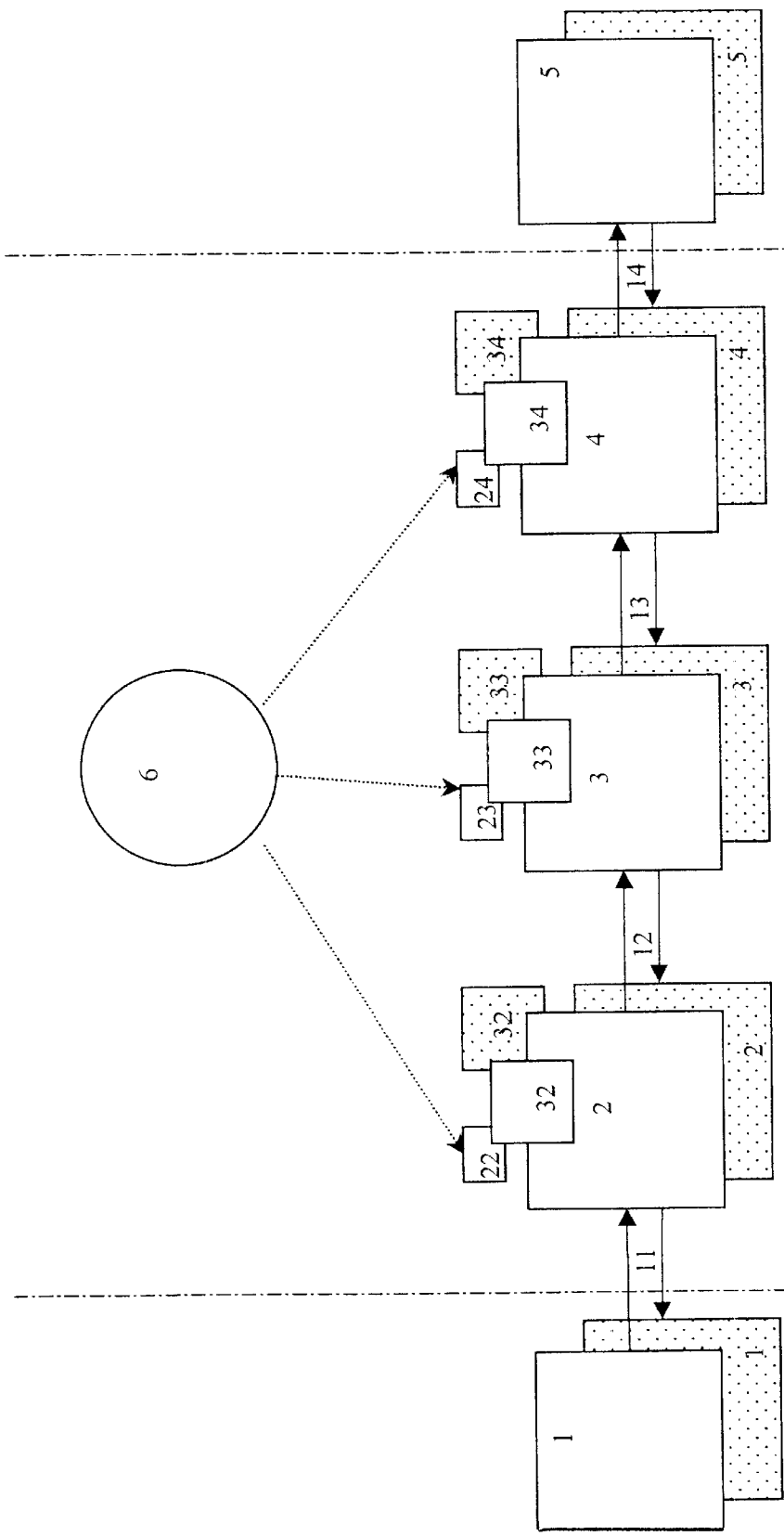
FIG. 3 is a more detailed high-level functional block diagram FIG. 2, showing the bi-directionality or two-way nature of the network system according to a preferred embodiment of the present invention.

Although we have simplified the flow of data in FIG. 1 and FIG. 2 to show a flow of data from left to right, it is important to understand that the communications across the network are bi-directional, such that a parallel process is occurring in the opposite direction, from right to left as shown in FIG. 3. In FIG. 3, the shaded areas indicate the flow of information in the opposite direction, such that destination 5 also serves as a source of information for this reverse flow, while final destination or termination node 4 and 34 serve as a departure or origination node. In the reverse flow, mid-destination node 3 and 33 continue to represent a plurality of mid-destination nodes, while departure or origination node 2 and 32 also serve the function of final destination or terminating edge node. A specific example of this two-way flow is when source 1 and destination 5 are participants in a two-way phone call such as Internet phone or video conferencing. Source 1 serves the role of a source and destination, as does destination 5.

For purposes of clarity in the present description, we will show all the path flows as unidirectional, but for practical purposes, the present invention is bi-directional, with the same devices and processes used in both directions.

Figure 4:
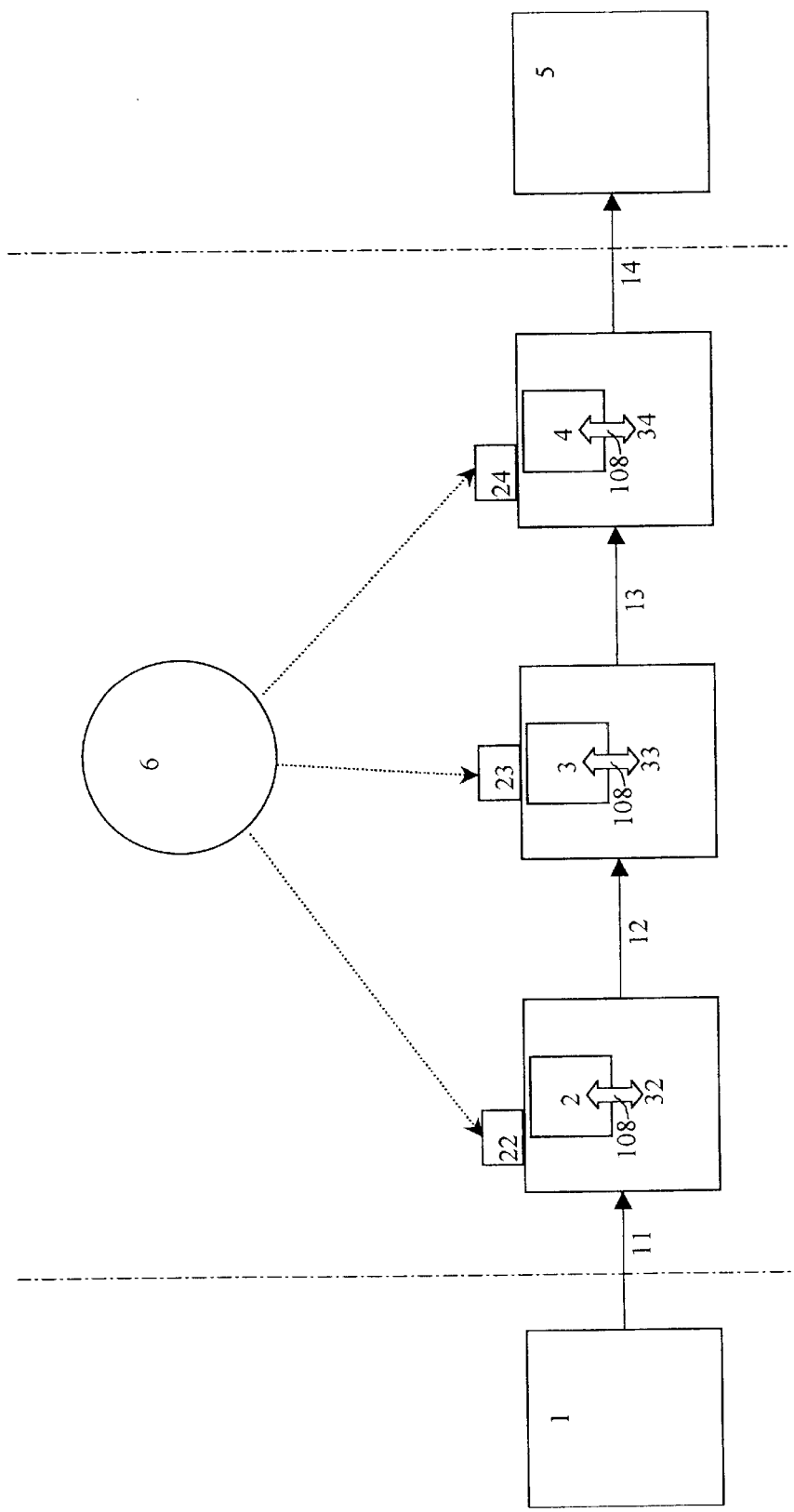
FIG. 4 is a detailed high-level functional block diagram of the network, wherein the first device embodiment, that of the preferred integrated device embodiment is shown operating as the network elements.

FIG. 4 is an illustrative example of the layer one network showing a first preferred embodiment of the network element devices as deployed in the network, wherein the device embodiments integrate the packet, cell, or frame routers or switches 2, 3, and 4 within the layer one bypass switching systems 32, 33, and 34 respectively. In this preferred integrated embodiment, also terned the "integrated" embodiment, the layer one controller is the primary controller of the entire device, such that it can control integrated packet, cell, or frame switches 2, 3, and 4 through control lines 108, to cause delaying, stopping or starting standard non-real-time, non-high-priority store-and-forward packets in the input and output buffers and in the packet, cell, or frame switches 2, 3, or 4 respectively for the purposes of scheduling and switching layer one real-time or high-priority packets. This integrated embodiment means that standard packets routed through packet, cell, or frame switches 2, 3, or 4 are not lost due to layer one timing considerations, although they may be delayed.

Figure 5:
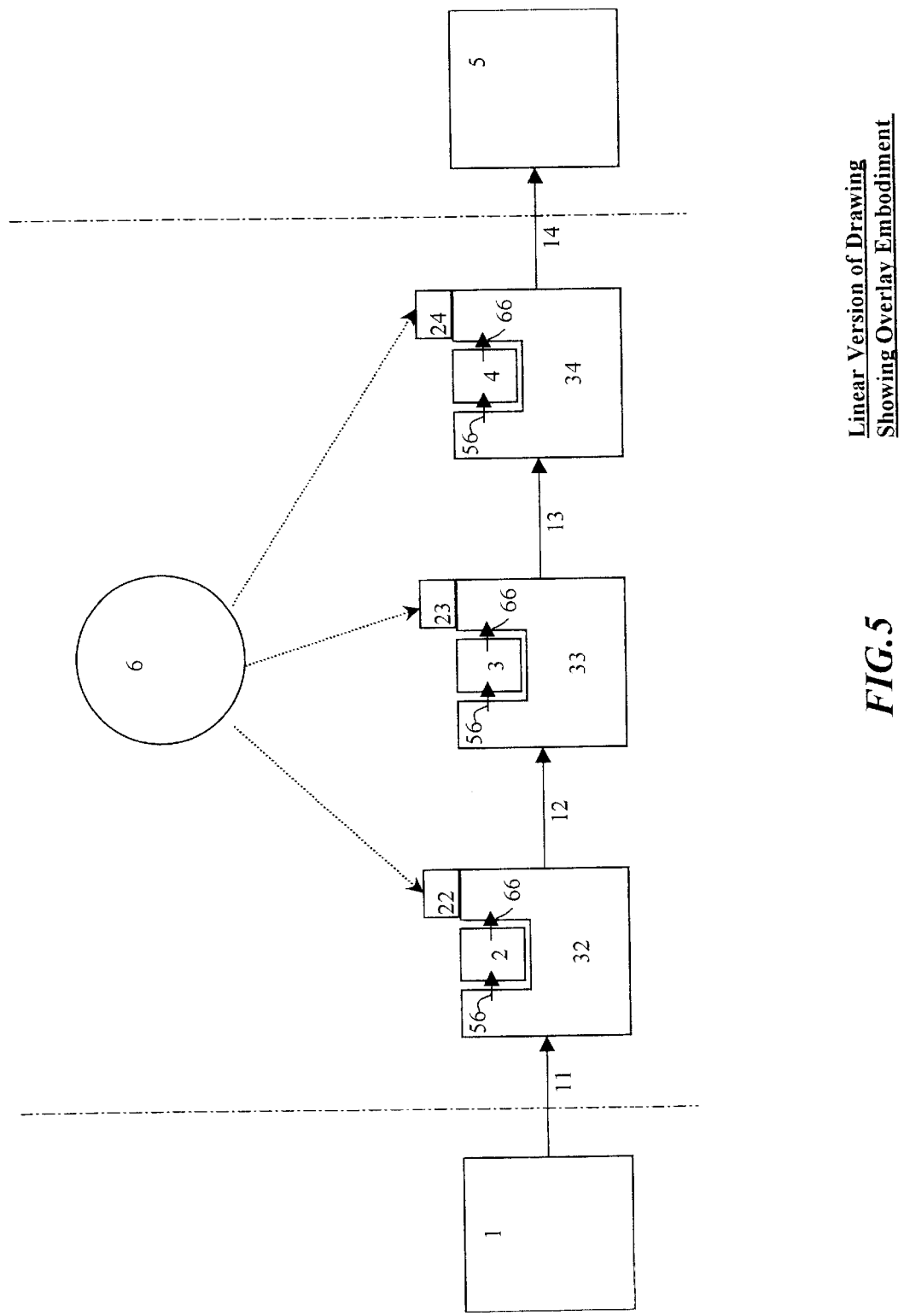
FIG. 5 is a detailed high-level functional block diagram of the network, wherein the second device embodiment, that of the overlay device embodiment is shown operating as the network elements.

FIG. 5 is an illustrative example of the layer one network showing a second embodiment of the network element devices descriptively entitled an "overlay" embodiment, wherein the packet, cell, or frame routers or switches 2, 3, and 4 are separate devices both structurally and control-wise from the layer one bypass switching systems 32, 33, and 34 respectively. The purpose of this "overlay" embodiment is to be able to less expensively add layer one switching to existing packet networks with existing packet, cell, or frame switches. In this case, only the layer one systems 32, 33, or 34 along with their synchronization means require additional expense.

In this second embodiment, the layer one controllers in systems 32, 33, and 34 are not the primary controllers of the packet, cell, or frame routers or switches 2, 3, and 4. Packet, cell, or frame routers or switches 2, 3, and 4 can operate as stand-alone units and control their own functionality. The layer one systems 32, 33, and 34 are "overlaid" on top of or around the standard packet, cell, or frame switches 2, 3, and 4, such that standard packets arriving on lines 12 coming into the node 33 go through the layer one system 33 and then are routed through lines 56 to the "overlaid" packet, cell, or frame switch 2. Output lines coming out of packet, cell, or frame switch 2 are routed through lines 66 back into the layer one system 33 and then out on transmission lines 14.

This means that the layer one systems 32, 33, and 34 will be unable to directly control delaying, stopping or starting standard non-real-time, non-high-priority store-and-forward packets while they are partially or completely in packet, cell, or frame switches 2, 3, and 4. As a result, if there is contention for an output port between the layer one systems 32, 33, or 34 and their respective standard packet, cell, or frame switches 2, 3, or 4, the layer one control system will prevail and the layer one packet that is scheduled will get routed. The standard packet from packet, cell, or frame switch 2, 3, or 4 contending for the output port will be stored in the output buffers of the respective layer one system 32, 33, or 34. The "overlay" embodiment can be designed to store standard packets coming from the packet, cell, or frame switch 2, 3, or 4, to the output buffers, but the output buffers must be large enough to prevent overflow if the Level 1 scheduled time is lengthy.

A third embodiment of the device (not shown because it is a deconstruction of the second embodiment) can be implemented in which the "overlay" embodiment is used, but the input buffers are removed. This cost-cutting approach, also termed the "dummied down" embodiment theoretically could lose incoming packets, cells, or frames due to layer one switching contention. However, practically speaking the output of the previous switch which is feeding the current input buffers must typically uses synchronization flags, frame delimiters, or the like, which is all that would probably be lost in this scenario. In the case that standard packets were lost, as they inevitably are in congested store-and-forward networks, standard protocols will generally ensure retransmission.

A fourth embodiment of the device (not shown because it is a deconstruction of the second and third embodiments) can be implemented in which the "overlay" embodiment is used, but the input and output buffers are removed. This cost-cutting approach, also termed the "really dummied down" embodiment will undoubtedly lose outgoing packets, cells, or frames due to layer one switching contention. In the case that standard packets, cells, or frames are lost, as they inevitably are in congested store-and-forward networks, standard protocols will generally ensure retransmission. However, this is viewed as a low-cost, low-performance trade-off and is not preferred. Nevertheless, the use of this approach has the advantages that layer one packet switching with its benefits can be implemented over an existing store-and-forward network at very low cost, thus giving layer one performance at the expense of degraded standard packet, cell, or frame-based performance.

Figure 6:
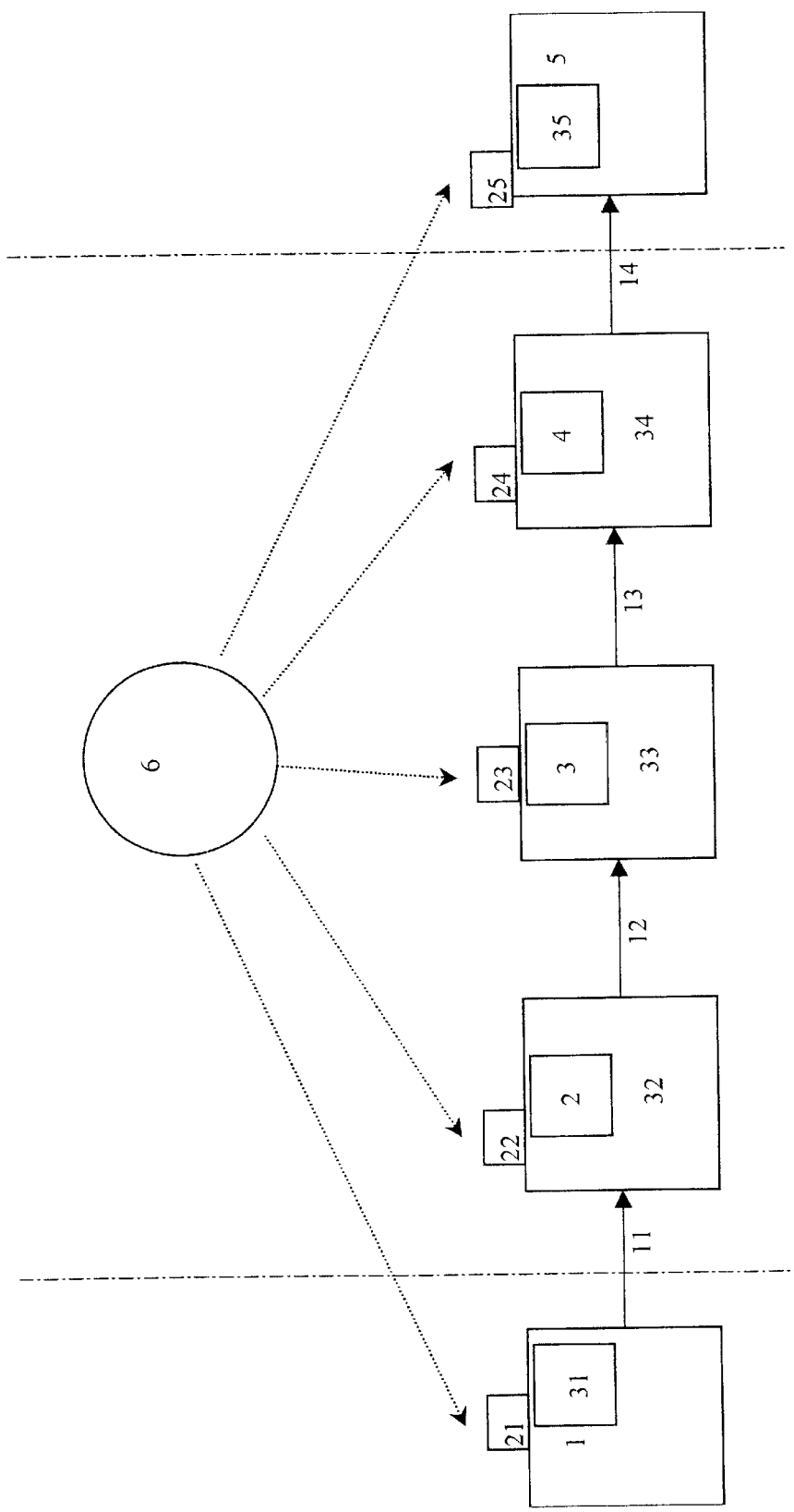
FIG. 6 is a detailed high-level functional block diagram of the network, wherein the fifth device embodiment, that of the source and destination device embodiment is shown operating as the source and destination.

FIG. 6 is an illustrative example of the layer one network showing a fifth embodiment of the device, descriptively entitled the "source and destination" or "end-user" embodiment, wherein the layer one system functionality has been moved outside of the network boundaries into the source and destination devices themselves. In this fifth embodiment of the device, synchronization means 21 is using the same master clock 6 to synchronize the layer one system 31 in the source device 1. In the same manner, synchronization means 25 is using the same master clock 6 to synchronize the layer one system 35 in the destination device 5. Since all of the layer one devices 31, 32, 33, 34, and 35 are synchronized to the same master clock 6, the entire chain can easily implement layer one switching functionality end-to-end. The purpose of this "end-user" embodiment includes being able to decrease delay time, response time, and jitter even farther by not requiring real-time or high-priority packets to have to be buffered by the originating node 32 while waiting for the scheduling time. In this way, the layer one enabled end-user devices 1 and 5 will know what the layer one schedule is and can deliver their real-time or high-priority application data in a more knowledgeable and hence efficient manner. Although FIG. 6 shows these end-user device embodiments outside of the network boundaries, they also could be considered network elements, as they can now function as part of the layer one network since they move some network functionality to the end-user device.

Figure 7:
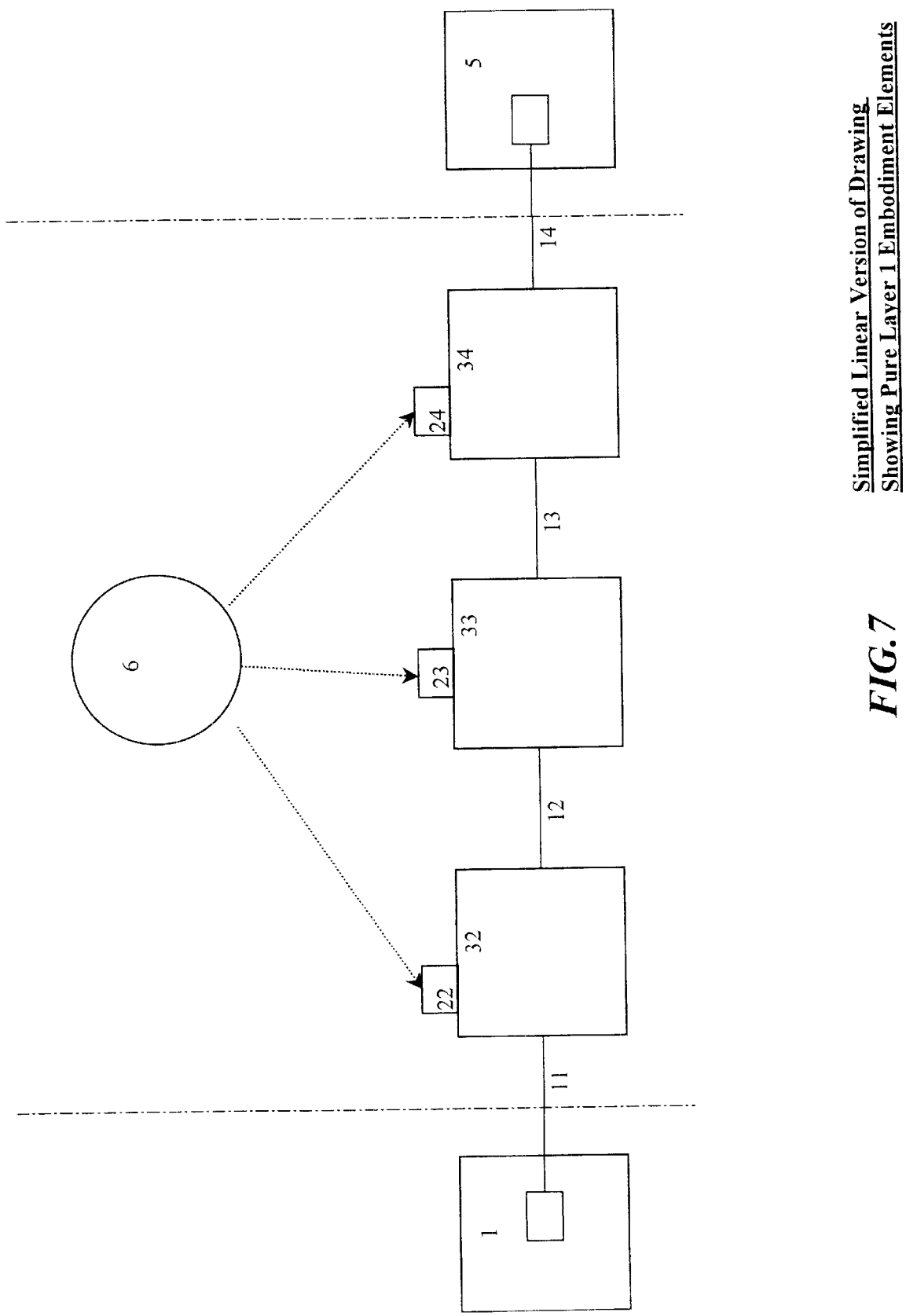
FIG. 7 is a detailed high-level functional block diagram of the network, wherein the seventh device embodiment, that of the pure layer one device embodiment is shown operating as a network element.

FIG. 7 is a simplified illustrative example showing elements of a seventh embodiment or "pure layer one" embodiment of the present invention, wherein the standard packet, cell, or frame routers or switches 2, 3, and 4 have been removed entirely, such that the network element "pure layer one" embodiment device consists exclusively of the layer one hardware and software 32, 33, and 34, together with synchronization means 22, 23, and 24. This means that this network performs scheduled layer one switching exclusively, such that standard store-and-forward packet switching does not take place in this embodiment of the present invention. As a result, in FIG. 7, source 1 would request a scheduled time across the layer one network. If the network elements accepted the request, source 1 could transmit its information across the network according to the scheduled times. Source 1 would compete for network resources from other layer one scheduled sessions, but only layer one resources and switching would be consumed. No store-and-forward packet switching would take place across this embodiment of the layer one network.

Figure 8:
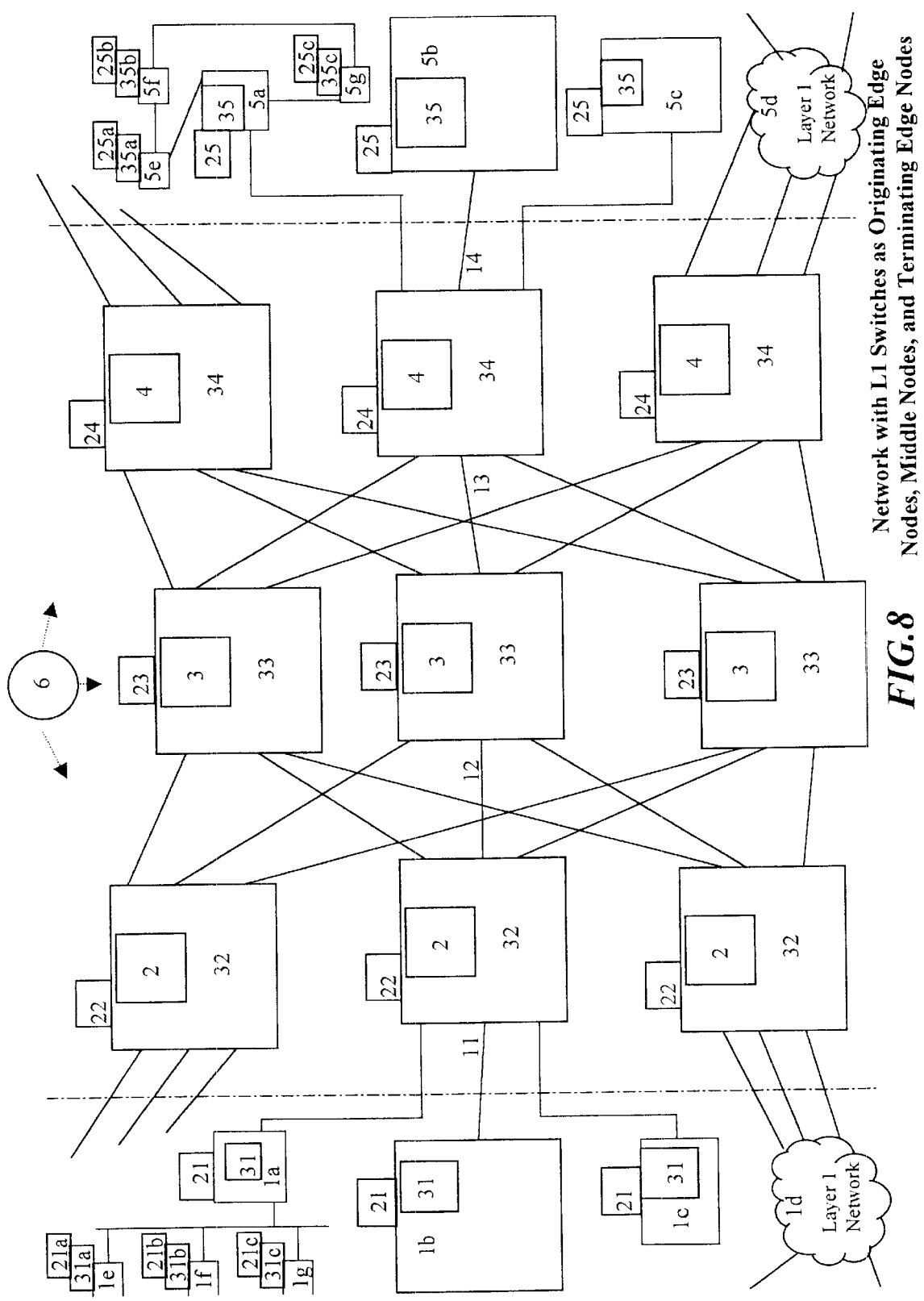
FIG. 8 is a more detailed high-level functional block diagram of a more complex network environment with the components of a layer one network system according to the present invention.

FIG. 8 is an illustrative examples of a more complex version of a layer one network showing the previously described sources, destinations, and layer one network elements interconnected. Master clock 6 is still used to synchronize all of the device embodiments.

In FIG. 8, Source 1a and Destination 5a are illustrative examples of the sixth device embodiment also termed the "IAN" embodiment. Source 1 a exemplifies a layer one-capable Ethernet-style LAN controller, bridge, or router. Destination 5a exemplifies a layer one-capable-Token Ring or other ring-style LAN controller, bridge, or router. Layer one star-type LANs could also be implemented in the same manner.

In all of these "LAN" embodiments a Local Area Network or LAN is connected to the layer one Network, such that the LAN controller, bridge, router and/or switch 1a includes layer one functionality 31 and timing synchronization means 21, and is connected to a layer one switch 32 in the network. In this way layer one LANs can be connected to layer one networks. "LAN" device embodiments may consist of the LAN controller 1a having layer one functionality 31 and timing synchronization 21 either with or without the LAN-attached devices having layer one functionality. If the LAN-attached devices do not have layer one functionality, they can still send real-time or high-priority messages by sending them via the normal LAN protocols to the layer one enabled LAN controller 1a, 31, and 21, which then acts as an edge node, stores the packets, sets up the layer path to the destination and then schedules the release of the packets.

Alternatively, FIG. 8 shows that the "LAN" device embodiment can comprise the LAN controller 1a, 21, 31, with LAN-attached devices 1e, 21a, 31a; 1f, 21b, 31b; and 1g, 21c, 31c representing a layer one synchronized LAN, with said devices attached to the LAN having layer one functionality as well as the LAN controller 1a.

In this configuration, the LAN controller, bridge, router, and/or switching device 1a with layer one functionality means 31 could synchronize with the network's master clock 6, such as a GPS system using synchronization means 21. The devices on the LAN 1e, 1f, and 1g with layer one capability 31a, 31b, and 31c respectively, could then synchronize off of the LAN controller 1a using timing synchronization means 21a, 21b, and 21c, respectively. This method of synchronization could be similar to the NTP method cited in the TrueTime reference. Alternatively, the devices on the LAN 1e, 1f, and 1g could use timing synchronization means 21a, 21b, and 21c respectively with other timing synchronization methods such as the two-way time transfer method cited in the U.S. Naval observatory reference, or they could each synchronize directly with the GPS system.

FIG. 8 also shows destination 5a as an illustrative example of a ring-style "LAN" embodiment of the device, wherein a Local Area Network or LAN is connected to the layer one Network. In this example the LAN controller, router, and/or destination switch 5a includes layer one functionality 35 with timing synchronization means 25 and is connected to layer one switch 34 in the network. In this way layer one switching can be connected to LANs as well as other devices. "LAN" device embodiments may consist of the LAN controller 5a having layer one functionality 35 and timing synchronization 25 either with or without the LAN-attached devices having layer one functionality. If the LAN-attached devices do not have layer one functionality, they can still send real-time or high-priority messages by sending them via the normal LAN protocols to the layer one enabled LAN controller 5a, 35, and 25, which then acts as an edge node, stores the packets, sets up the layer path to the destination and then schedules the release of the packets.

Alternatively, FIG. 8 shows that the "LAN" device embodiment can comprise the LAN controller 5a, 25, 35, with LAN-attached devices 5e, 25a, 35a; 5f, 25b, 35b; and 5g, 25c, 35c in a token ring style configuration, representing a layer one synchronized LAN, with said devices attached to the LAN having layer one functionality as well as the LAN controller 5a.

In this configuration, the LAN controller, bridge, router, and/or switching device 5a with layer one functionality means 35 could synchronize with the network's master clock 6, such as a GPS system using synchronization means 25. The devices on the LAN 5e, 5f, and 5g with layer one capability 35a, 35b, and 35c respectively, could then synchronize off of the LAN controller 5a using timing synchronization means 25a, 25b, and 25c, respectively. This method of synchronization could be similar to the NTP method cited in the TrueTime reference. Alternatively, the devices on the LAN 5e, 5f, and 5g could use timing synchronization means 25a, 25b, and 25c respectively with other timing synchronization methods such as the two-way time transfer method cited in the U.S. Naval observatory reference, or they could each synchronize directly with the GPS system.

In layer one "LAN" embodiments, the LAN software in all of the LAN devices would be upgraded to include the capability to suspend normal LAN contention or action during scheduled layer one events. Each LAN device would listen for scheduled layer one events and not transmit during those times. When scheduled layer one events were not occurring, LAN contention would resume as normal. Since all of the LAN devices would be synchronized, they could easily perform these capabilities and could communicate at a layer one level to other devices on the same layer one enabled LAN, to devices on adjoining layer one enabled LANs, and/or to devices in other interconnected layer 1 networks. This means that applications such as the integration of voice mail and email could be consolidated or integrated onto a single platform and in a single networking environment, even though email arrives at the application by standard store-and-forward networking, while voice mail arrives using layer one networking.

In FIG. 8, Source 1b exemplifies a source connected directly to the layer one network through transmission line 11. Source 1c exemplifies a host system with layer one switching capability.

Source 1d in FIG. 8 exemplifies a layer one network that is connected to a separate layer one network. In this case, the layer one networks can establish seamless layer one sessions and route seamless layer one switching end-to-end across both layer one networks. Even when these interconnected layer one networks are not synchronized off of the same master clock 6, there are methods which will be explained subsequently, whereby the layer one nodes in different networks can determine very accurately the differences in times between their clocks and the clocks of adjacent layer one nodes, and the propagation delay between the nodes. With this information, they can calculate and use offsets to adjust for their timing differences and propagation delays such that the layer one scheduling between adjacent nodes is highly accurate, highly efficient, and error-free.

Destination 5b exemplifies a layer one enabled end-user destination receiving layer one routing directly to its internal layer one system 35 through transmission line 14. Destination 5c exemplifies a host system with layer one switching capability.

Destination 5d in FIG. 8 exemplifies a layer one network that is connected to a different layer one network as already discussed. A plurality of layer one networks can be interconnected for extremely rapid transfer of data through all of the networks.

Figure 9:
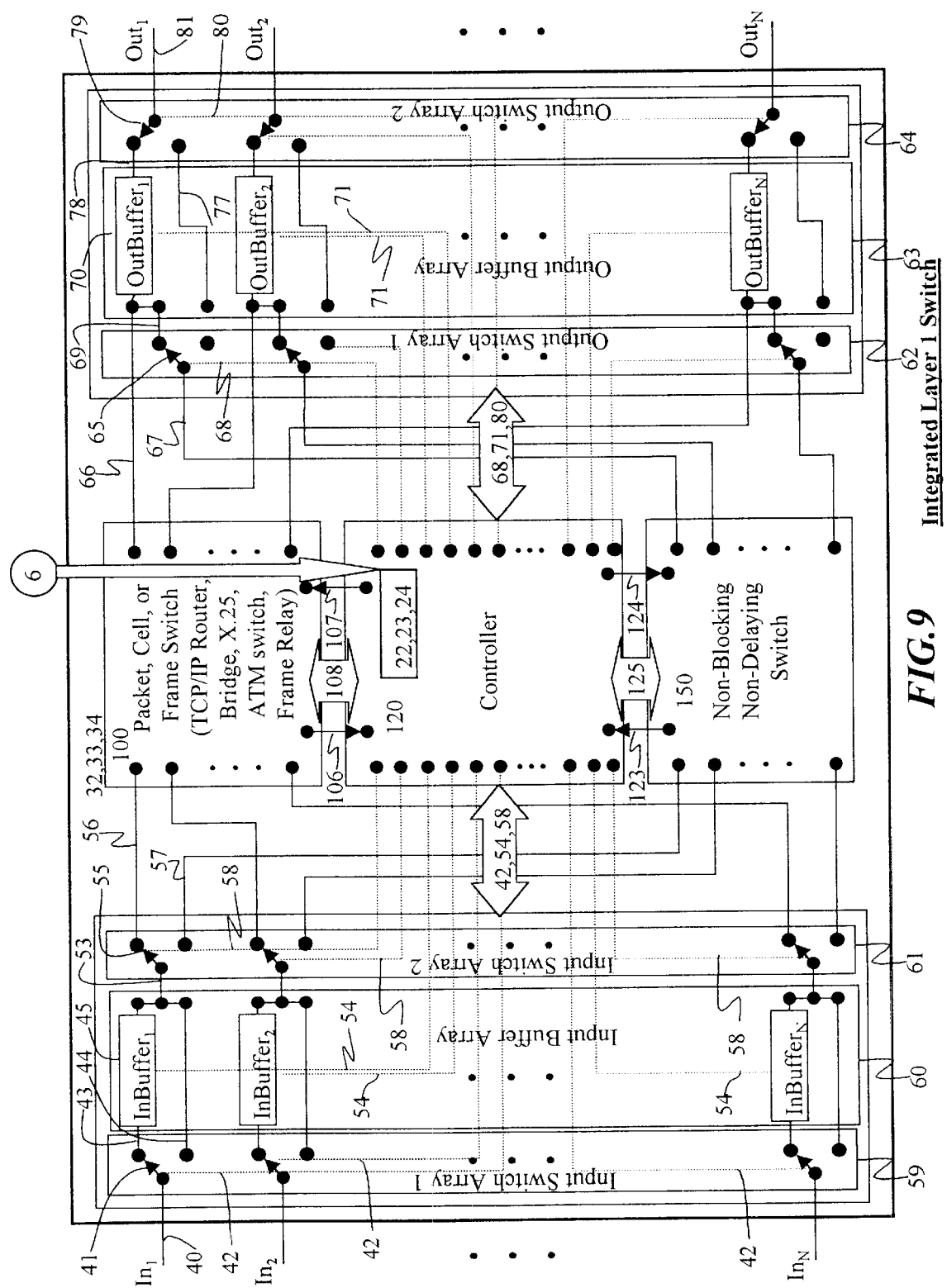
FIG. 9 is a high level schematic diagram of a first embodiment and the preferred embodiment of an integrated layer one network switch or router device according to the present invention comprising master clock synchronization means, input, output, control, and integrated store-and-forward switching means, and non-blocking, non-delaying layer 1 switching means.

FIG. 9 shows a high level block diagram of a first embodiment, also termed the "integrated" embodiment, of an integrated layer one switch. This preferred embodiment integrates a packet, cell, or fame switch 100 into the rest of the layer one switch 32, 33, or 34, comprising a first input switch array 59, an input buffer array 60; a second input switch array 61; a controller 120 with timing synchronization means 22, 23, 24; a non-blocking, non-delaying switch 150; a first output switch array 62, an output buffer array 63, and a second output switch array 69.

In this preferred embodiment, both layer one packets and standard packets, cells, or frames are routed from the previous node to the input lines such as $In_1$ 40. In standard packet mode, while standard packets, cells, or frames are streaming into input line 40, the layer one switch controller 120 uses control line(s) 42 to position switch 41 into the position to route the standard packets, cells, or frames from input line $In_1$ 40 to input buffer $InBuffer_1$ 45. Here the standard packets, cells, or frames are stored while the controller 120 determines where each packet should go and which packets to route first. To do this, the $InBuffer_1$ 45 looks at each packet, cell, or frame and determines its layer three destination or layer two flow path or equivalent, and its priority, if any. Using the layer three destination or layer two flow path or equivalent, the controller 120 then looks at its routing or flow table and determines the next destination and which output line the packets, cells, or frames are to be sent out on. It may at this point insert the net destination into the packet, cell, or frame, or perform this operation in the output buffer $OutBuffer_1$ 70. Alternatively, for high speed packet, cell, or frame switching, the routing table can be stored in a high speed cache as part of the InBuffer circuitry.

Once the destination is determined, if standard packet, cell, or frame priority systems such as Quality of Service (QOS), Class of Service (COS), Resource Reservation Protocol (RSVP) or other priority schemes are incorporated in the device, the controller 120 or $InBuffer_1$ 45 uses the priority level to determine which packets, cells, or frames should be moved out of the buffer first into the packet, cell, or frame switch fabric 100. Otherwise a simpler algorithm such as round-robin may be used or any other sharing algorithms well-known to those skilled in the art.

Before moving a standard packet from the $InBuffer_1$ 45 to the packet, cell, or frame switch 100, the controller 120 first looks at the layer one schedule to be sure that moving the standard packet out of the $InBuffer_1$ 45 will not conflict with a scheduled layer one packet due to arrive on input line $In_1$ 40. Based upon which output line $Out_n$ the packet is supposed to route out of, the controller 120 also looks at the layer one schedule to be sure that moving this packet out of the $InBuffer_1$ 45 will not cause it to load into the output buffer $OutBuffer_n$ at a time when it will conflict with a scheduled layer one packet due to be switched through on that output line $Out_n$. When the controller determines that no layer one conflict will occur at that input port, it uses control line(s) 58 to positions switch 55 such that the non-layer one packet, cell, or frame will be routed to the packet, cell, or frame switch 100. It then triggers the $InBuffer_1$ 45 to move the packet, cell, or frame into packet, cell, or frame switch 100 via switch 55 and line 56.

Packet, cell, or frame switch 100 uses standard packet-oriented switch fabric well-know to those skilled in the art to route the packet to the correct output line, which for illustrative purposes we choose to be line 66. Since controller 120 has already determined that there is no layer one conflict with output buffer $OutBuffer_1$ 70, controller 120 uses control line(s) 68 to position switch 65 so that the packet will route into $OutBuffer_1$ 70. The packet, cell, or frame then routes out of switch 100 through line 66, through switch 69, and into $OutBuffer_1$ 70.

Either controller 120 and/or $OutBuffer_1$ 70, now determine which packets should be shipped out first based on priority. When $OutBuffer_1$ 70 is ready to ship a packet, cell, or frame out of output line $Out_1$ 81, controller 120 checks the layer one schedule to be sure that no layer one packets, cells, or frames are scheduled to be shipped out of output line $Out_1$ 81 during the time it takes to send out the next standard packet. $OutBuffer_1$ 70 can compute the time that it will take to send the next outgoing standard packet, cell, or frame because it knows how fast its output link is and how large the next packet, cell, or frame is by looking at its header or by examining the space taken up in the buffer. If there will be a conflict between a scheduled layer one packet on this output line $Out_1$ 81 and a standard packet from $OutBuffer_1$ 70, the scheduled layer one packet takes priority and $OutBuffer_1$ 70 holds the outgoing packet until the layer one scheduled event is completed. This process is then repeated continuously, thus shipping layer one packets, cells, or frames at scheduled times, and standard packets, cells, or frames at non-layer one times.

When a layer one packet is scheduled to arrive on input line $In_1$ 40, the master controller 120, uses control line(s) 42 and 58 to shift input switches 41 and 55 respectively to the bypass position, such that packets will not flow from input line $In_1$ 40 to the $InBuffer_1$ 45. Instead the layer one packet, cell, or frame is routed directly from input line $In_1$ 40, through bypass line 44, through switch 55 to line 57, and directly into the non-blocking, non-delaying switch 150. At precisely the same time, controller 120 uses control lines 125 to cause non-blocking, non-delaying switch 150 to route the layer one packet, cell, or frame directly from the line 57, through switch 150 and out the correct line 67. At precisely the same time, using control line(s) 68 and 80, controller 120 also positions switches 65 and 79 respectively such that the scheduled layer one packet, cell, or frame routes through from non-blocking, non-delaying switch 150 on line 67 through switch 65 to the buffer bypass line 77, out switch 79 to output line $Out_1$ 81 and on to the next layer one switch which repeats the process.

There is one variation to the way that layer one switching works that occurs only when the layer one Switch is the first layer one device in the layer one path, i.e., either it is the originating edge node 32, see FIG. 4, or it plays the role of an originating edge node as does layer one switching means 31 in FIG. 6. This is because, when a layer one switch is the first switch in the path from source to destination, there is no preceding layer one entity to send the layer one packets at the precise times required Consequently, the originating edge node 32 must hold the layer one packets, cells, or frames that it receives from the non-layer one source or originating device 1 in its input buffer InBuffer$_1$ 45, see FIG. 9, until the scheduled layer one event occurs. The controller 120 for the originating edge node 32 must then, at the scheduled time, switch to layer one mode and cause the input buffer InBuffer$_1$ 45 to release the layer one packets through the non-blocking, non-delaying switch and on through the rest of the layer one path. All of the subsequent layer one devices work as previously described.

FIG. 9 also illustrates how store-and-forward messages are communicated over the standard packet network both from and to the controller 120 from sources 1, destinations 5, and other network elements 2, 3, 4, 32, 33, and 34. In addition to routing end-to-end packets through switch 100, the controller 120 has a network address for standard packet, cell, or frame messages whereby switch 100 routes these messages to controller 120 through line 106. Controller 120 can also send standard packet, cell, or frame messages through line 107 to switch 100 for routing to the network.

FIG. 9 also illustrates how layer one messages such as emergency messages, synchronization timing messages, and administration messages are communicated from and to the controller 120 from other layer one devices. In addition to routing layer one packets through switch 150, the controller 120 has a network address for layer one messages whereby switch 150 routes these messages to controller 120 through line 123. Controller 120 can also send high-priority scheduled layer one messages such as emergency messages, synchronization timing messages, and administrative messages through line 124 to switch 150 for routing to the network.

Figure 10:
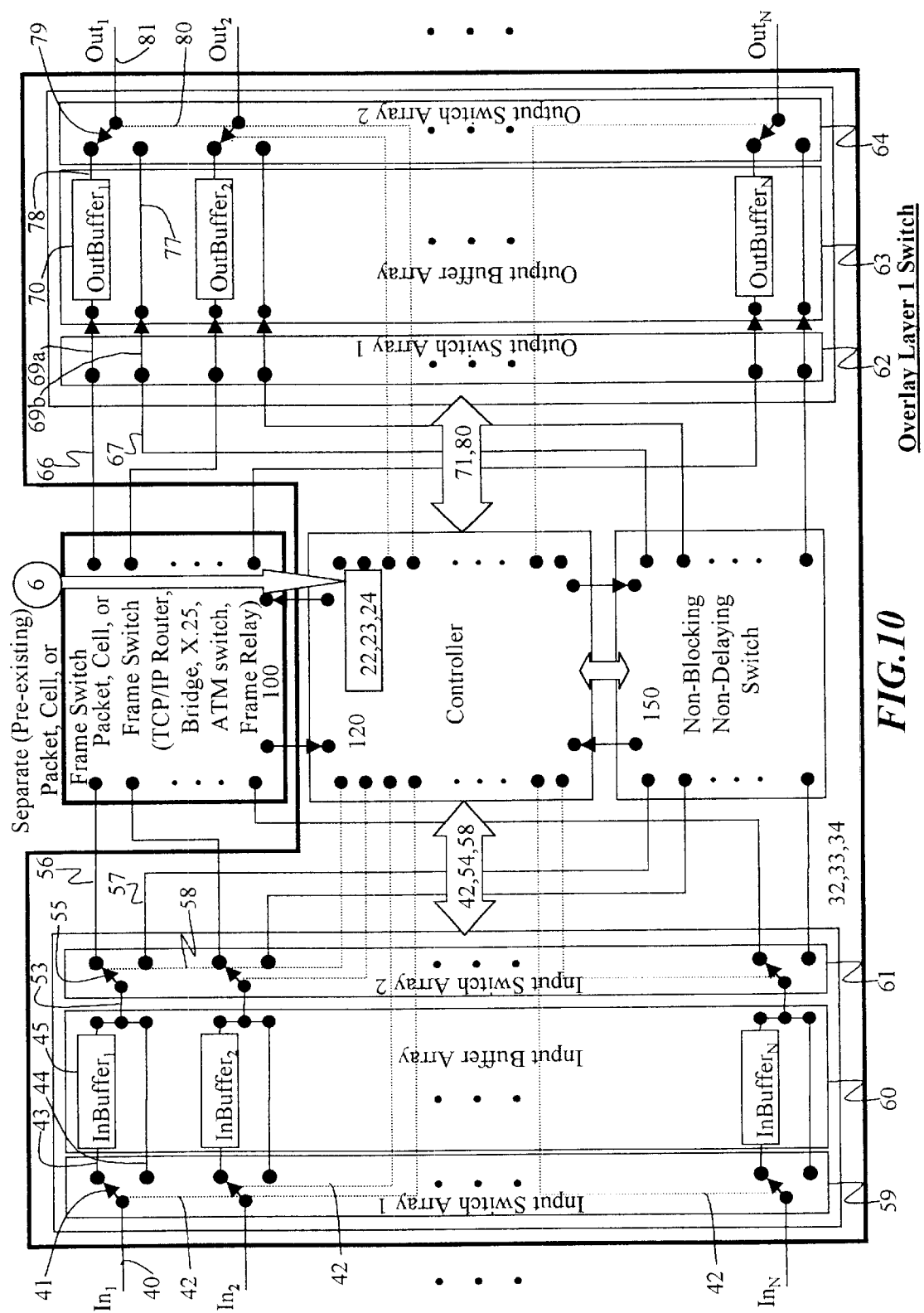
FIG. 10 is a high level schematic diagram of a second embodiment, the "overlay" embodiment of a layer one network switch or router device according to the present invention comprising master clock synchronization means, input, output, control, and non-blocking, non-delaying layer 1 switching means, coupled to a physically separate store-and-forward switching means.

FIG. 10 illustrates a second embodiment of the device, also termed the "overlay" embodiment, wherein the packet, cell, or frame switch 100 is a separate, non-integrated device, as explained previously. FIG. 10 works in the same manner as the preferred embodiment shown in FIG. 9, except that there is no control means 108 between controller 120 and switch 100. From a practical standpoint, controller 120 can still control when it sends packets from InBuffer$_1$ 45 to switch 100, so that it can avoid layer one conflicts when transferring standard packets, cells, or frames in InBuffer$_1$ 45 to switch 100. However, controller 120 cannot control when separate and discrete switch 100 will send packets, cells, or frames into OutBuffer$_1$ 70. The solution is to modify the first output switch array 62 in the non-integrated second embodiment as shown in FIG. 10. This modification comprises removing the first output switch array 62 including switch 65, line 69, and control line(s) 68; then adding line 69a such that the output line 66 from switch 100 routes directly from the output of switch 100 through line 69a into OutBuffer$_1$ 70; then adding line 69b, such that switch 150 feeds out through line 67, directly over line 69b, and into output buffer bypass line 77. In this way, whenever there is conflict at the output buffer between scheduled layer one packets from non-blocking, non-delaying switch 150 and store-and-forward packets from switch 100, both packets route without interfering with each other. The layer one packets route straight through the bypass line and out of the output line Out$_1$ 81. The store-and-forward packets dump into the OutBuffer$_1$ 70. The only danger is that if the layer one schedule is highly filled, OutBuffer$_1$ 70 may overflow, losing packets and causing congestion. This effect may be partially ameliorated by increasing the size of OutBuffer$_1$ 70 and decreasing the layer one scheduling commitments that this embodiment's device is allowed to accept.

The third and fourth embodiments, descriptively titled the "dummied down" and "dummied way down" embodiments respectively, are modifications of the second embodiment shown in FIG. 10

In the third embodiment, the input buffer array 60 with its input buffers InBuffer$_1$ 45 is eliminated along with the first input switch array 59 with its switches 41. This means that input line In$_1$ 40 goes directly to the input of switch 55. Controller 120 continues to use control lines 58 to control the switching of switch 55 for layer one switching. However, control lines 42 and 54 are not used in this embodiment.

In the fourth embodiment, the output buffer array 63 with its output buffers OutBuffer$_1$ 70 is eliminated. This means that lines 66 and 67 go directly to switch 79, which is still controlled by control line 80. Switch 79 continues to feed output line Out$_1$ 81. Control line 71 is no longer used in this embodiment.

Figure 11:
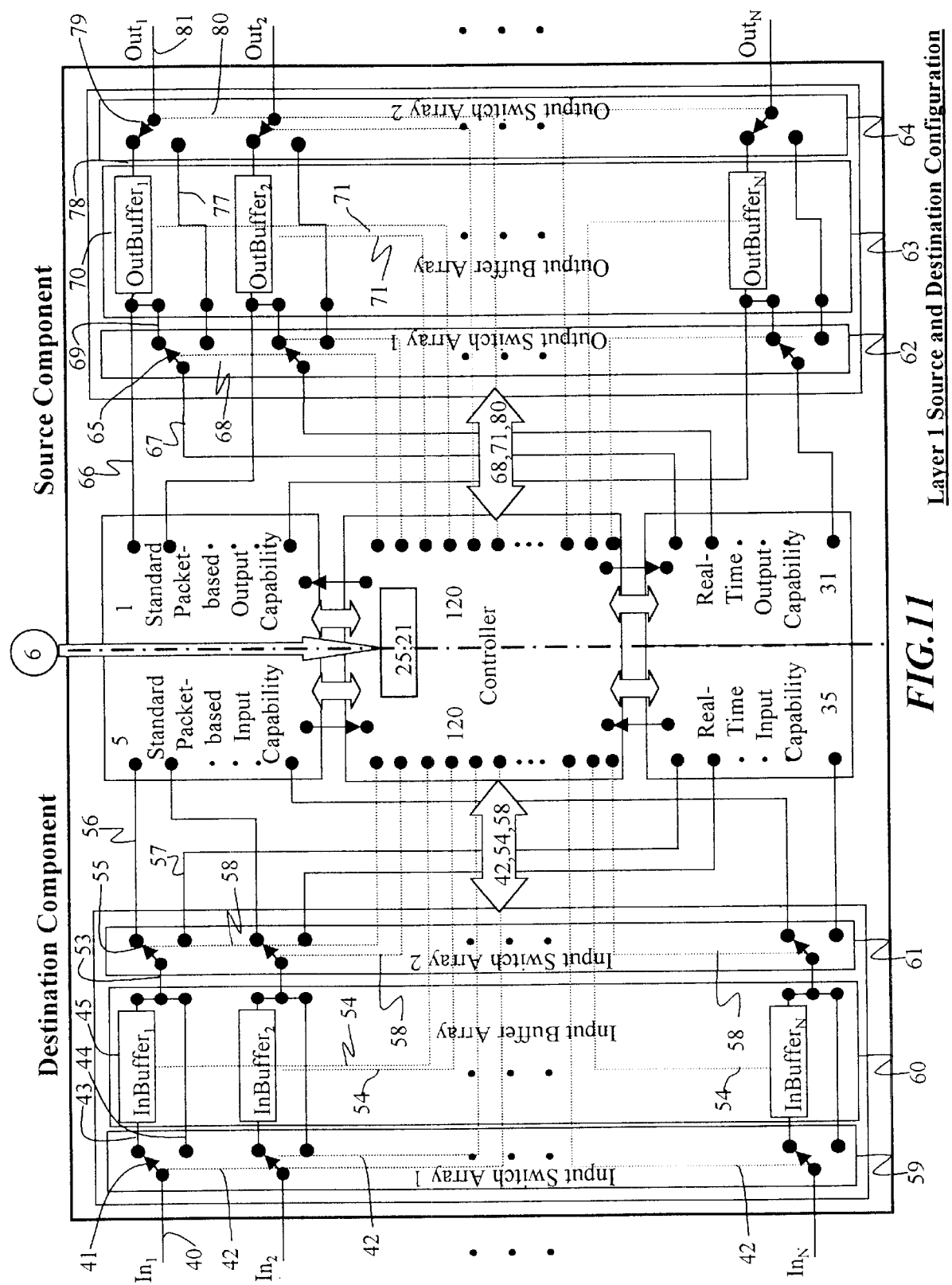
FIG. 11 is a high level schematic diagram of a fifth embodiment, also termed the "source and destination" embodiment or "end-user" embodiment of a layer one network switch or router device according to the present invention comprising master clock synchronization means, input, output, control, with standard store-and-forward packet, cell, or frame-based input and output handling means, and real-time or high priority layer one input and output handling means.

FIG. 11 is an illustrative example of a fifth embodiment of the device according to the present invention, descriptively entitled the "end-use" embodiment, wherein the layer one system functionality has been moved outside of the network boundaries into the source and destination devices. As discussed previously in FIG. 3, each of devices has a source and a destination component. Both the source and destination components are shown in FIG. 11. Note that for purposes of drawing similarity and clarity, the destination component is on the left and the source component is on the right in FIG. 11. The "end-user" embodiment of the device according to the present invention is very much like the first embodiment, i.e., the integrated device embodiment, except that the packet, cell, or frame based switch 100 has been replaced in the end-user device by industry standard packet-based device input capability 5 and industry standard source packet-based output capability 1. This capability includes various software and hardware means which are used to apply and strip off the layers of protocol required to communicate in a store-and-forward network, such that the end user is presented with the application layer information as is well known to those skilled in the art. All of these capabilities for standard input and output exist today in hardware and software communications applications, e.g., Outlook™ e-mail software from Microsoft®, Explorer™ web browser from Microsoft®.

The other change in the "end-user" embodiment from the first embodiment of the present invention is the replacement of the non-blocking, non-delaying switch 150 with real-time packel-oriented input capability 35 and real-time packet-oriented output capability 31. An example of this would be software and hardware necessary to communicate in a real-time application such as Internet Phone. With Internet Phone, the real-time packet-oriented input capability 35 comprises various hardware and software means to get the voice input, sample it, digitize it, compress it, and put it in regular, periodic packets suitable for layer one transmission. Real-time source output capability 31 in the example of Internet Phone comprises various hardware and software means to receive layer one packets, assemble them, deliver them to the application in a usable way, convert them from digital to analog and play the audio out on a speaker. All of these capabilities for real-time input and output exist today in hardware and software applications like video conferencing hardware and software from Intel®, Internet Phone™ from VocalTec®, and Netshow™ from Microsoft®, and streaming audio/video from RealAudio®.

All of the other capabilities of the "end-user" embodiment are the same as the previous embodiments. The controller controls when packets would be shipped and received. For a single user, the capabilities might include only one input buffer 45 and only one output buffer 70, but for shared end-user devices there may be multiple lines and buffers as shown in FIG. 11.

Figure 12:
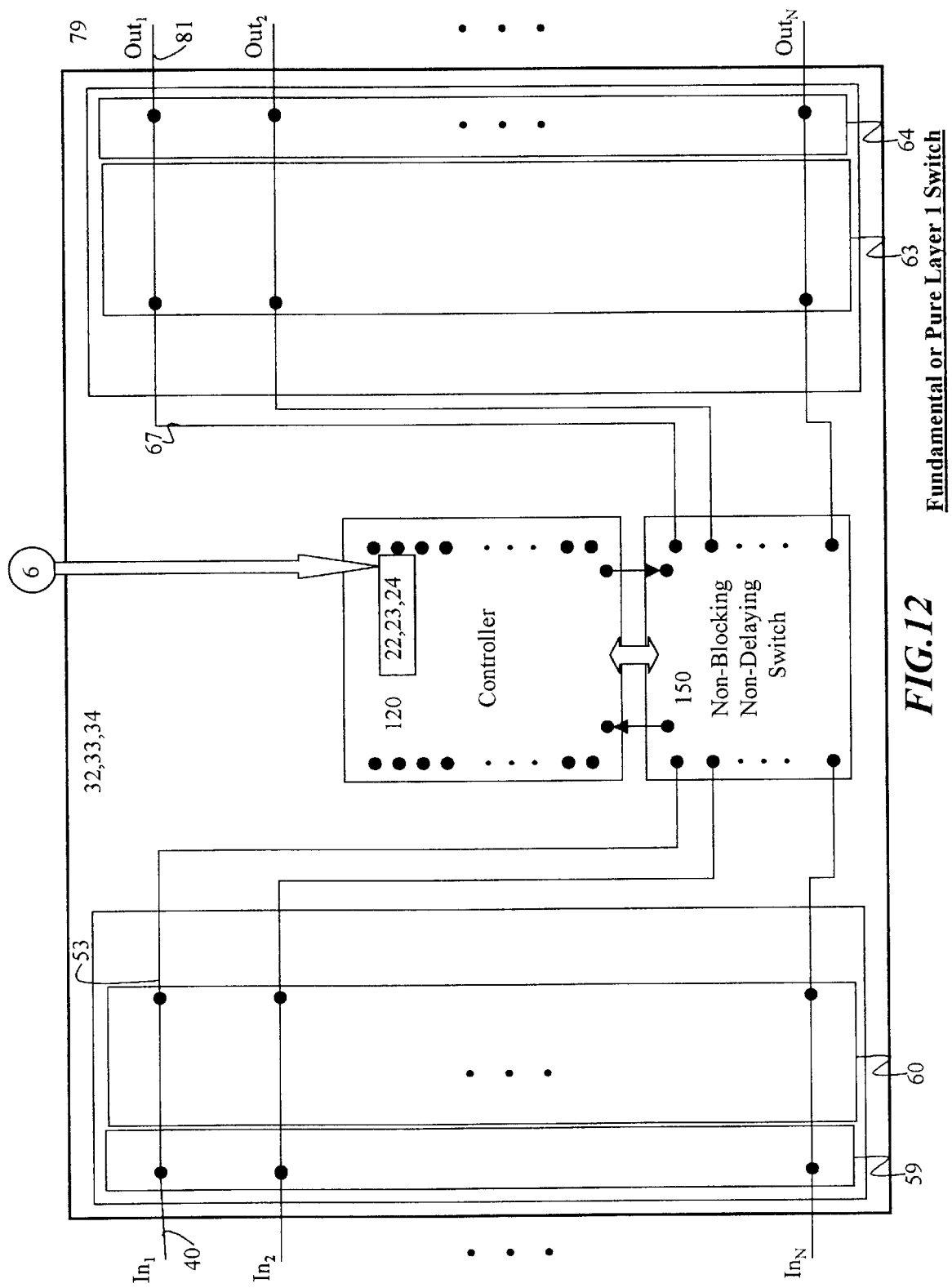
FIG. 12 is a high level schematic diagram of a seventh embodiment, the "pure layer one" embodiment of a layer one network switch or router device according to the present invention comprising master clock synchronization means, input, output, control, and non-blocking, non-delaying layer 1 switching means, with no store-and-forward switching means.

FIG. 12 is an illustrative example of a seventh embodiment of the device according to the present invention, descriptively entitled the "Fundamental layer one" or "Pure layer one" embodiment, wherein normal packet, cell, or frame store-and-forward functionality of switch 100 has been taken out, leaving only the layer one system functionality. This device exclusively switches using the layer one event scheduling process described elsewhere in this document.

Figure 13:
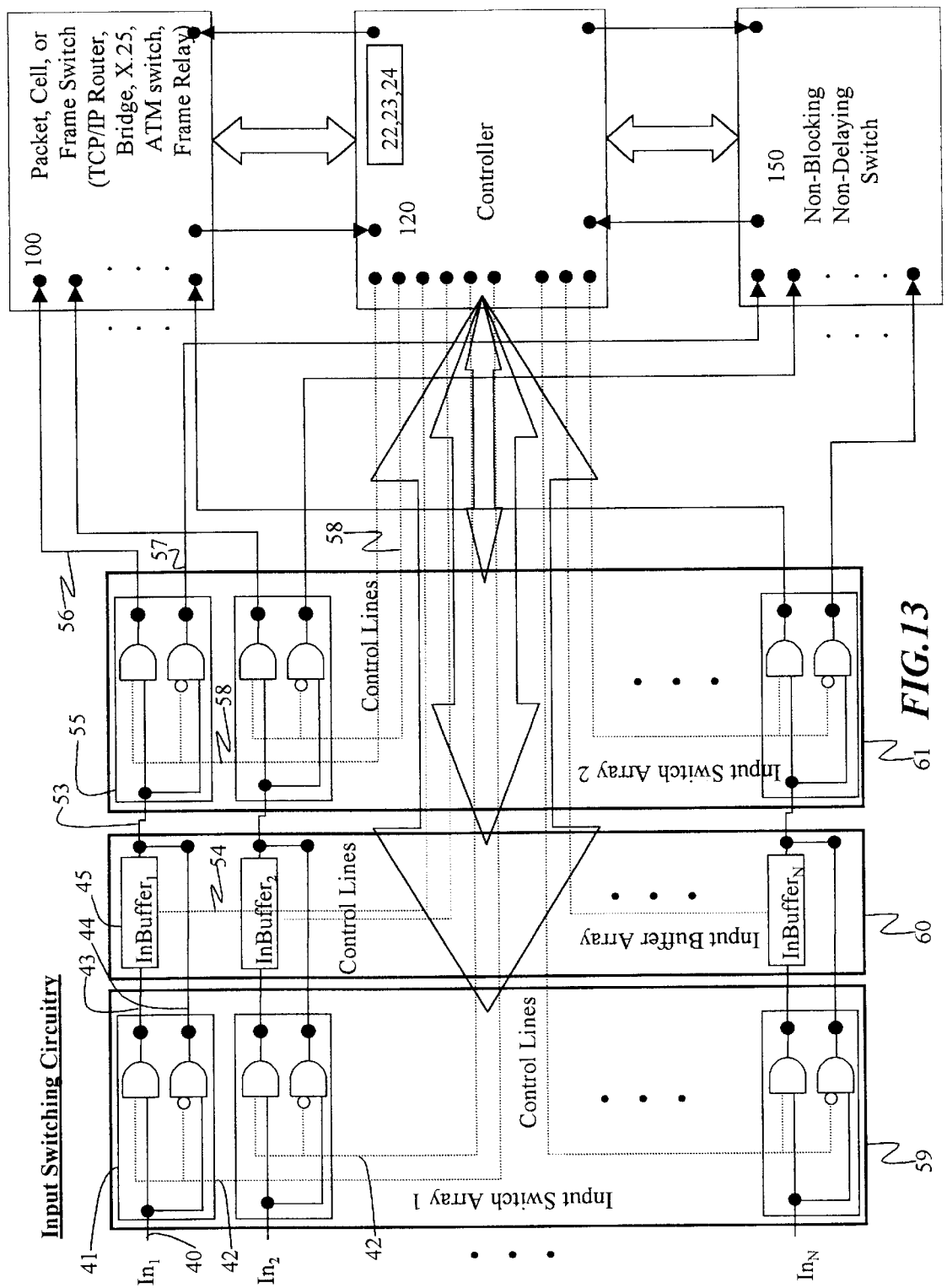
FIG. 13 is a detailed functional block diagram of a preferred embodiment of input means according to the present invention, including input switch means, input switch array means, input switch control means, input buffer means, input buffer array means, and input buffer control means.

FIG. 13 shows a detailed view of exemplary logic circuitry for the input switches 41 and 55 in the input switch arrays 59 and 61 of the device according to the present invention. FIG. 13 shows just one of a plurality of means of implementing this switching capability. As explained previously, standard store and forward packets coming in on input 40 are switched to the input buffer 45 to await being switched through switch 55 to store-and-forward switch 100. layer one packets coming in on input 40 are switched through switch 41 to bypass line 44 and on through switch 55 to output line 57 and into non-blocking, non-delaying switch 150. FIG. 13 clearly shows that when the controller 120 makes the control line 42 high for switch 41, the top AND gate turns on and switches whatever is on input line 40 through to line 43 and the input buffer. At the same time, this turns the lower AND gate off and prevents any input on line 40 from being switched through to line 44. Conversely, when the controller 120 makes the control line 42 low for switch 41, the top AND gate turns off and prevents whatever is on input line 40 from being passed through to line 43 and the input buffer. At the same time, this turns the lower AND gate on and switches any input on line 40 through to line 44. The rest of the logic is the same, and is very clear to those skilled in the art. Thus, it will not be explained further.

FIG. 14 details the input means or input circuitry operational process, specifically for when the input means are operating as "edge buffers" providing the initial buffering for the originating layer one device or originating edge node in a network.

FIG. 15 details the input means or input circuitry operational process, specifically for when the input means are operating as "non-edge buffers", i.e., internal to the network as middle nodes or terminating nodes.

Figure 16:
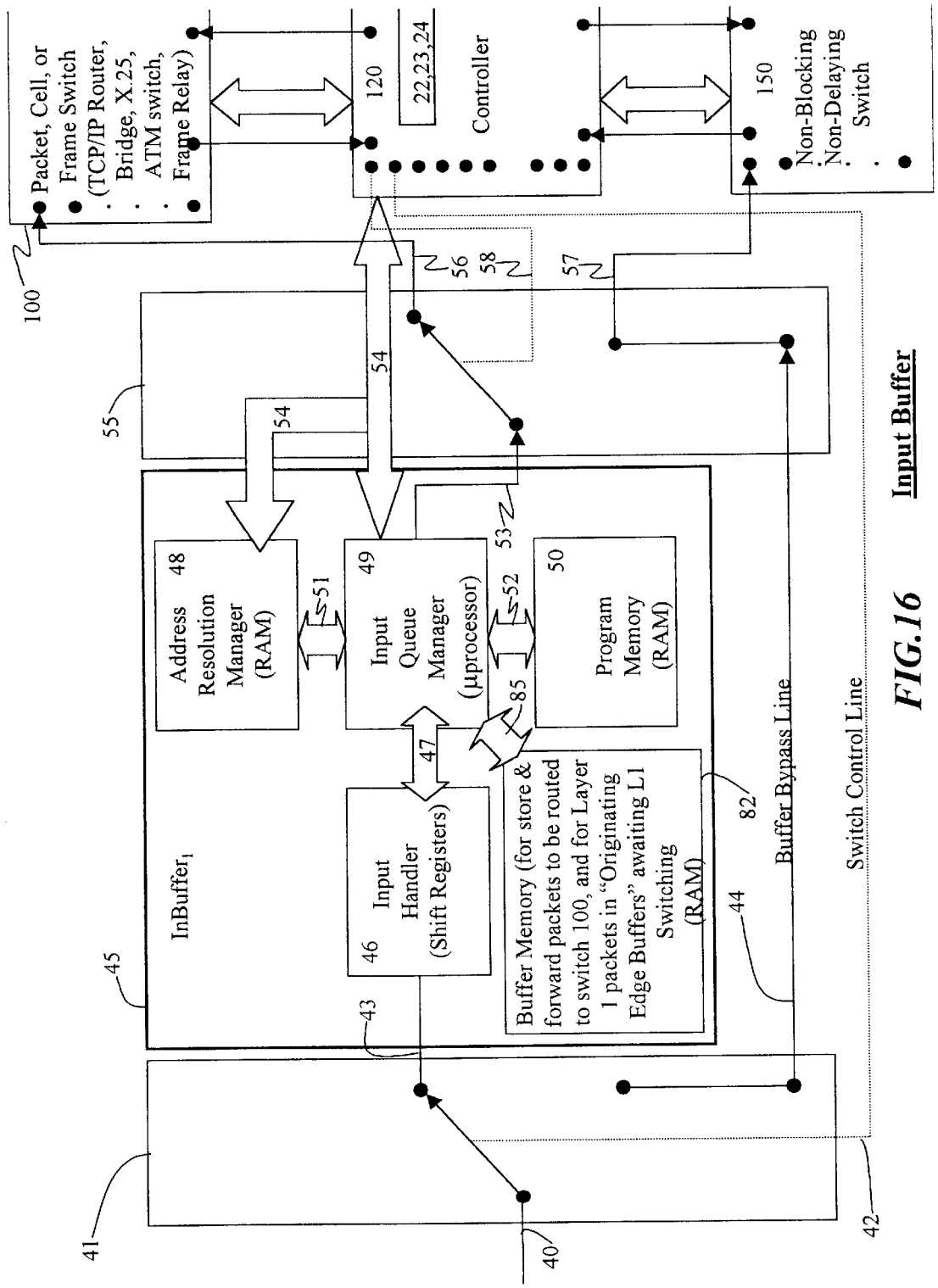
FIG. 16 is a detailed schematic diagram of a preferred embodiment of input buffer means according to the present invention, including input switching means, input switching control means, input buffer bypass means, input buffer memory means, input interface handler means, address resolution means, input queue manager means, and input program memory means.

FIG. 16 shows a detailed view of exemplary hardware and software circuitry and functionality for the input buffer InBuffer$_1$ 45 of the device according to the present invention. As packets are routed to line 43, they are shifted into the input handler 46, which comprises several shift registers under the control of the input queue manager 49. Input queue manager 49 is a microprocessor running of a program stored in program memory 50 residing on a RAM storage device. Input queue manager 49 loads the shift registers 46 with packets and transfers them to buffer memory 82, a RAM storage device.

Input Queue Manager 49 then looks at the packets in buffer memory 82, pulls out the layer three or layer two address and detects if there is any priority scheduling required. It then looks at the address resolution manager 48 which resides on a RAM storage device, and which fundamentally stores routing tables for network address resolution. These routing tables are updated as needed by the main microprocessor on the controller 120. The input queue manager 49 uses the address resolution manager 48 to look up the address of the next destination for the packet, cell, or frame, and the output port for the switch 100 to switch the packet out to. When the input queue manager has a packet to ship to switch 100, it notifies controller 120 over bus 54 with the appropriate information such as the input and output lines, and the size of the packet. Controller 120 examines its layer one event schedule to determine if any collisions with scheduled layer one packets might occur on those input and output lines. If there is no problem controller 120 triggers switch 55 using control line(s) 58 and notifies input queue manager 49 to send the packet to switch 100, which it does.

If the input buffer 45 acts as an originating edge node for the layer one network, then controller 120 will use switch 41 to route layer one packets into the input buffer 45. Controller 120 will tell input queue manager 49 to notify him when the layer one packets arrive, based on source and destination addresses and priority level. When the layer one packets arrive, they are transferred to a special location in buffer memory. Input queue manager 49 notifies controller 120 when these packets arrive. Controller 120 constantly checks the layer two event schedule and when an event is approaching he notifies input queue manager 49 to have them ready. At the designated scheduled layer one time, controller 120 throws all the required switches as described previously for direct layer one switching and notifies input queue manager 49 to ship the layer one packet(s).

If the input buffer 45 is not acting as an originating edge node, then it does not see any layer one switches, since the controller 120 bypasses the input buffer 45 at the scheduled times by switching the layer one packets around the buffer by means of the input switches 41 and 55, and buffer bypass line 44.

FIG. 17 shows an example of the detailed program process which the input queue manager 49 performs in the input buffer shown in FIG. 16.

Figure 18:
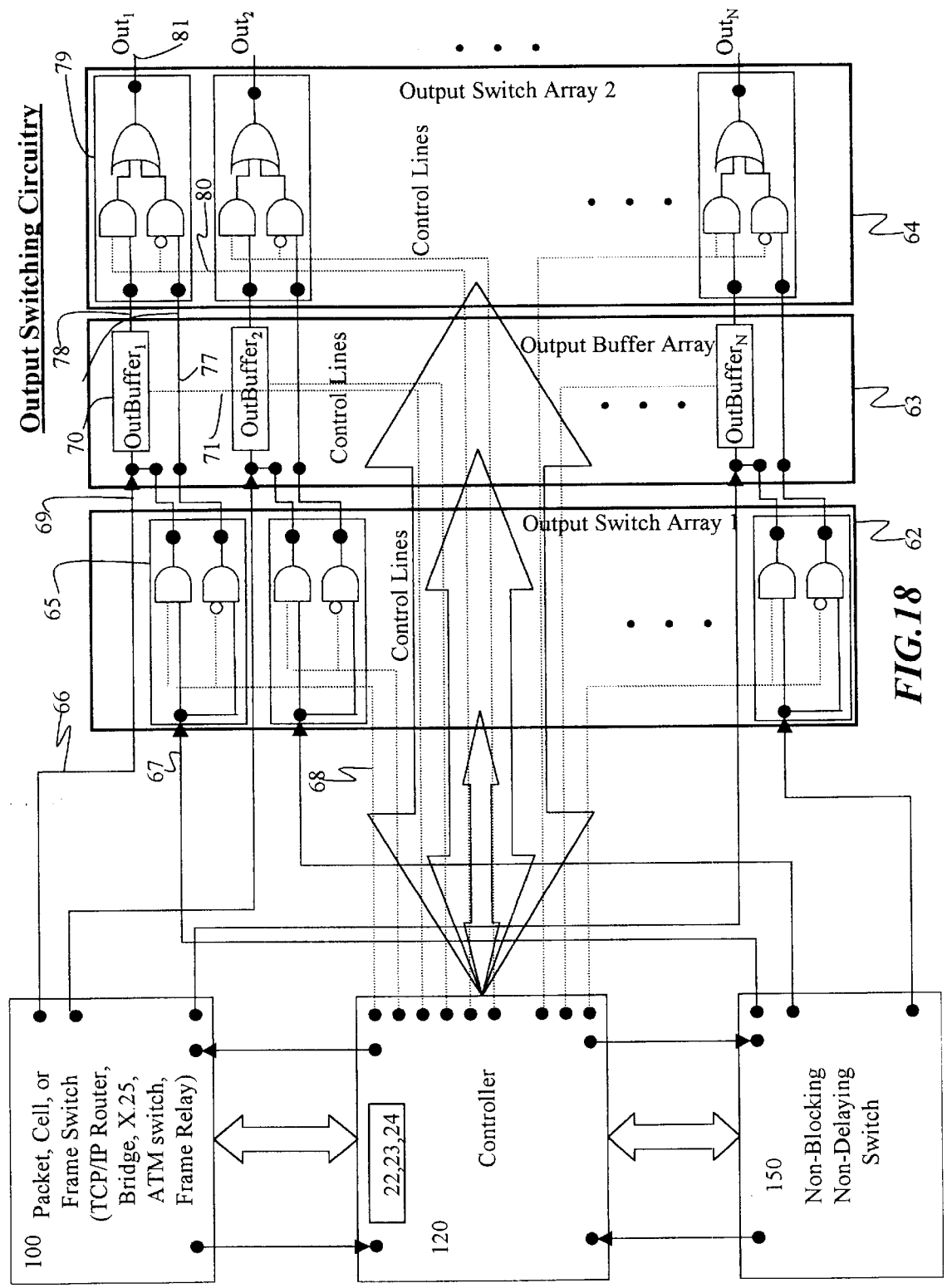
FIG. 18 is a detailed functional block diagram of a preferred embodiment of output means according to the present invention, including output switch means, output switch array means, output switch control means, output buffer means, output buffer array means, and output buffer control means.

FIG. 18 shows a detailed view of exemplary logic circuitry for the output switches 65 and 79 in the output switch arrays 62 and 64 of the device according to the present invention. FIG. 18 shows just one of a plurality of means of implementing this switching capability. As explained previously, standard store and forward packets coming out of switch 100 on line 66 are sent by line 69 to the output buffer 70 to await being transmitted out on output line 81. Layer one packets coming from non-blocking, non-delaying switch 150 are passed through line 67 and through switch 65 to output buffer bypass line 77 and are switched through switch 79 to output line 81. FIG. 18 clearly shows that when the controller 120 makes the control line 68 high for switch 65, the top AND gate turns on and switches the layer one packets on line 67 through to output buffer 70. At the same time, this turns the lower AND gate off and prevents any input from the layer one packets on line 67 from being switched through to the buffer bypass line 77. Conversely, when the controller 120 makes the control line 68 low for switch 65, the top AND gate turns off and prevents layer one packets on line 67 from being passed through to the output buffer 70. At the same time, this turns the lower AND gate on and switches any layer one packets through to the buffer bypass line 77.

The logic in switch 79 then switches between the output buffer 70 and the layer one packets on output buffer bypass line 77. The controller 120 by making the control line(s) 80 high switches packets through switch 79 to output line 81 and turns off any packets being fed from line 77. Conversely, by making the control line(s) 80 low, the controller 120 switches layer one packets on buffer bypass line 77 through switch 79 to output line 81, while blocking any data from output buffer 70.

FIG. 19 and FIG. 20 detail the output means or output circuitry operational process, specifically for when the output means are operating as "edge buffers" providing the final buffering for the terminating layer one device or terminating edge node in a network.

FIG. 21 and FIG. 22 detail the output means or output circuitry operational process, specifically for when the output means are operating as "non-edge buffers", i.e., internal to the network as middle nodes or originating nodes.

FIG. 23 shows a detailed view of exemplary hardware and software circuitry and functionality for the output buffer OutBuffer$_1$ 70 of the device according to the present invention. As packets are routed out of switch 100 to line 65, they are sent to the output queue manager 72.

Output queue manager 72 is a microprocessor running a program stored in program memory 74 residing on a RAM storage device. Output queue manager 72 receives the packets and transfers them to buffer memory 83, a RAM storage device.

Output queue manager 72 then looks at the packets in buffer memory 83, to see if there is any priority scheduling required. When the output queue manager 72 has a selected a packet to send to output line 81, it transfers the packet from buffer memory 83 to the output handler 73, which comprises a plurality of shift registers under the control of the output queue manager 73.

Output queue manager 72 then notifies controller 120 over bus 71 that the packet is ready to transmit, and tells it other appropriate information such as the output line, the priority, and the size of the packet. Controller 120 examines its layer one event schedule to determine if any collisions with scheduled layer one packets might occur on those input and output lines. If there is no problem, controller 120 triggers switch 79 using control line(s) 80 and notifies output queue manager 72 to send the packet out line 81.

Headerless packet switching is a layer one switching technique that extracts the layer two and layer three source and destination addresses for layer one scheduled packets. If headerless packet switching is being implemented in the network, then layer one packets without their layer two and layer three source and destination addresses must be have these addresses reinserted at the terminating edge node prior to leaving the layer one network. If this output buffer acts as an terminating edge node, then the controller 120 alerts the output queue manager 72 of the upcoming layer one "headerless" packet. Since layer one's event scheduler knows the correct source and destination addresses based on its scheduling, the controller 120 will also give the correct source and destination address(es). When the packet arrives, the controller actuates switch 65 to route the packet to the output queue manager 72. The controller 120 then signals the output queue manager that this is a "headerless" packet. The output queue manager 72 stores the headerless packet in buffer memory 83. Next the output queue manager inserts the correct source and destination address(es) into the packet headers and then, with the permission of controller 120, routes the packet out line 81.

FIG. 24 shows an example of the detailed program process which the output queue manager 72 performs in the output buffer shown in FIG. 23.

Figure 25:
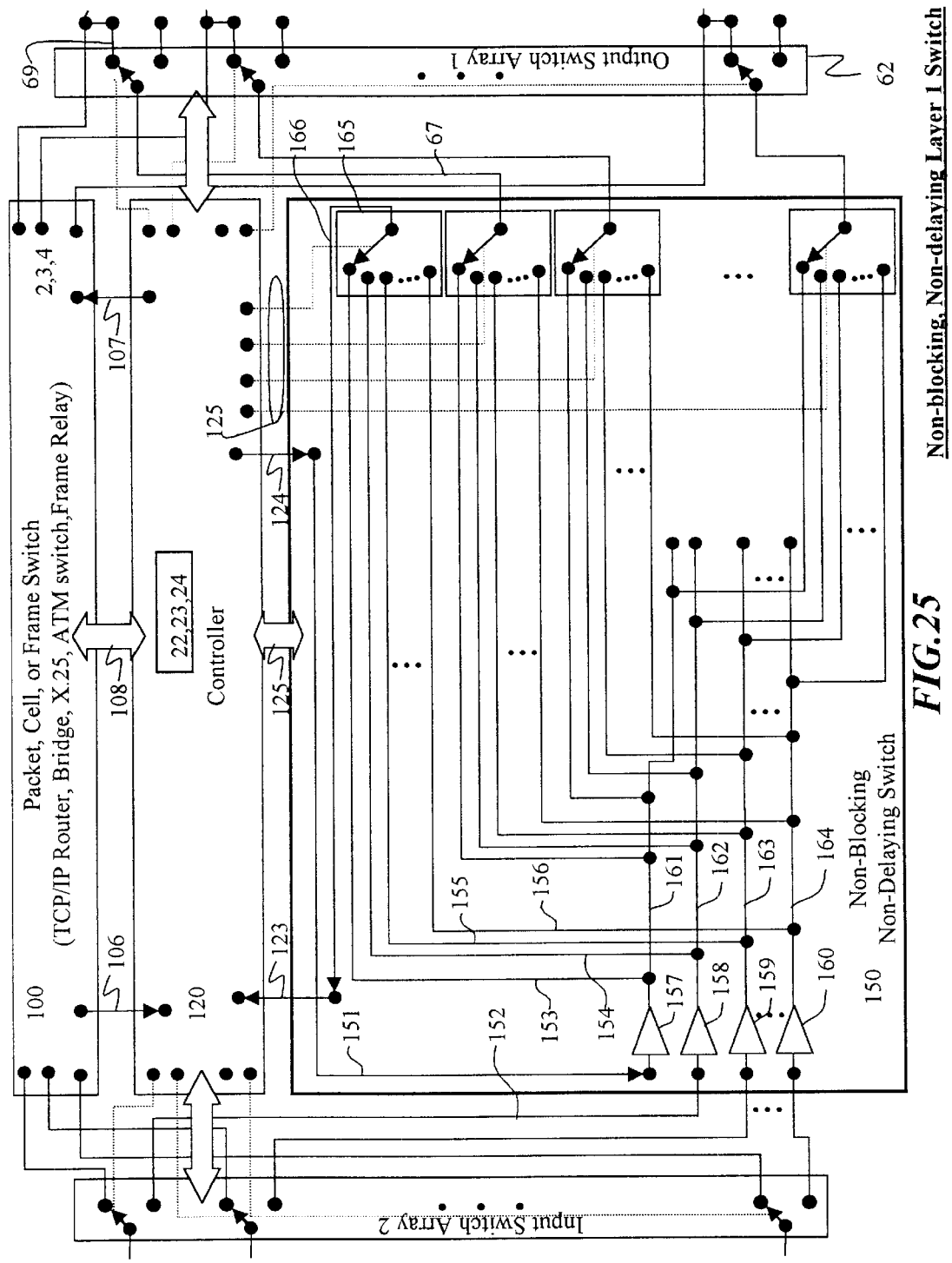
FIG. 25 is a detailed functional block diagram of an illustrative embodiment of non-blocking, non-delaying switching means according to the present invention, including input amplifying and limiting means, input matrix means, output matrix means, output switching means, output switching control means, and output means.
Figure 26:
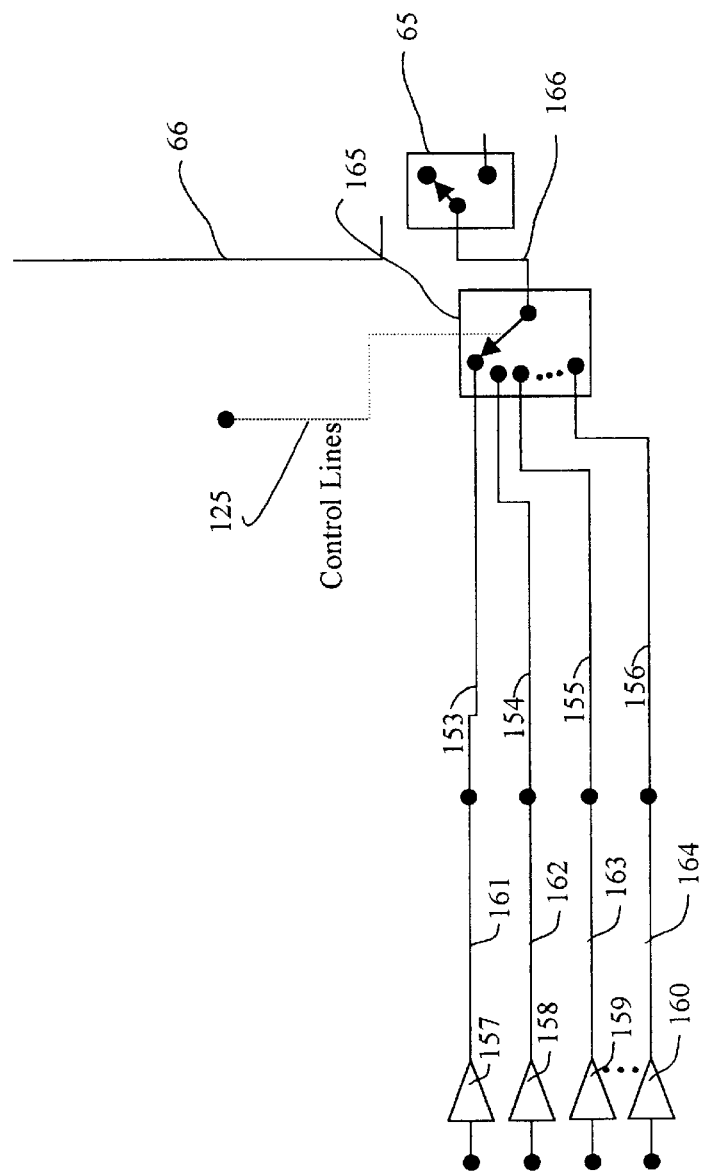
FIG. 26 is a detailed functional block diagram of an illustrative embodiment of non-blocking, non-delaying switching means according to the present invention, including input amplifying and limiting means, input matrix means, output matrix means, output switching means, output switching control means, and output means.

FIG. 25 shows a detailed view of exemplary hardware and software circuitry and functionality for the non-blocking, non-delaying layer one switch of the device according to the present invention. There are a plurality of methods to implement this non-blocking, non-delaying switching methods according to the present invention. This is just one example of a plurality of possible designs that could be used. FIG. 26 shows a detailed illustrative example of one input to output path for the non-blocking, non-delaying layer one switch of the device according to the present invention.

In FIG. 25, scheduled layer one packets are switched from the second input switch array into the non-inverting amplifiers 157, 158, 159, and 160 which may also act as repeaters and clean up the signal. Input line 151 feeding non-inverting amplifier 157 is a means whereby the controller 120 can send scheduled layer one packets.

Once the layer one packets exit non-inverting amplifiers 157, 158, 159, and 160, each input signal is sent down its respective bus 161, 162, 163, and 164. Output buses 153, 154, 155, and 156, which are tapped on to these input buses 161, 162, 163, and 164, respectively, are configured such that every possible output receives every possible input, thus the switch is non-blocking. The switch is also configured such that all inputs 161, 162, 163, and 164 are immediately available at all outputs 153, 154, 155, and 156, resulting in no time switching nor space switching delays, thus the switch is non-delaying. Although there are very small propagation delays, even these have been minimized. This is an important aspect of the invention, as the efficiency of the invention is dependent upon the timing involved.

FIG. 25 illustrates how messages are received by the controller 120 from the non-delaying non-blocking switch 150, through output line 166 and 123. Other output lines 67 are routed to the first output buffer switch array 62.

FIG. 26 shows an illustrative functional example of how output switch 165 is configured such that only one of the output buses 153, 154, 155, or 156 is switched to the output line 166.

Figure 27:
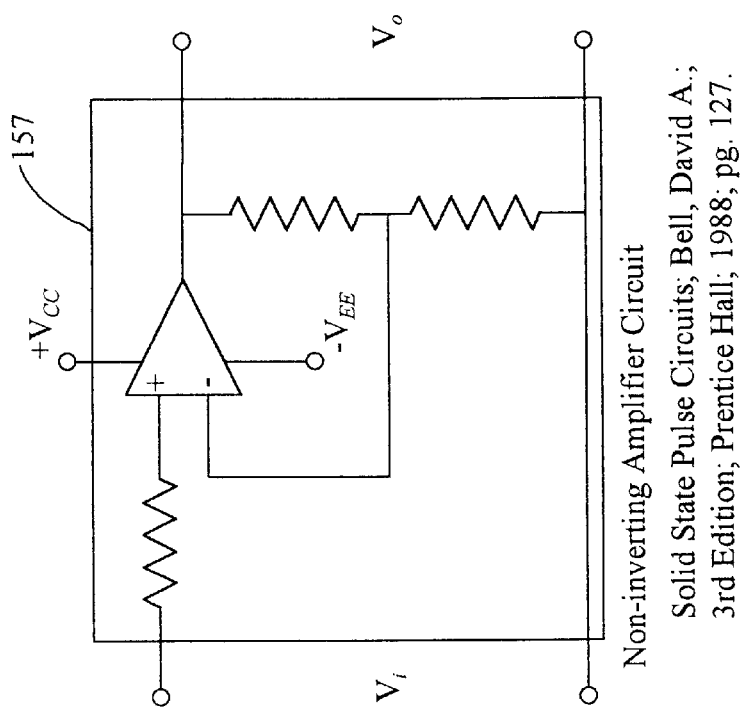
FIG. 27 is a detailed functional schematic diagram of an illustrative embodiment of a non-inverting amplifier circuit from the non-blocking, non-delaying switching means shown on FIG. 25 and FIG. 26 according to the present invention.

FIG. 27 is an illustrative, exemplary non-inverting amplifier circuit well-known and understood by those skilled in the art. It is one example of a plurality of circuits which may perform this function. The specific design should be such as to obtain the minimum time delay from output to input. The non-inverting amplifier 157 may be optional at this exact point in the circuit, but devices such as these may be needed for signal strength, isolation, and good design characteristics. The important point is to keep time delays to a minimum. The entire device and network implementation should thus be designed to reduce or minimize time delays from start to finish throughout the entire layer one data path.

Figure 28:
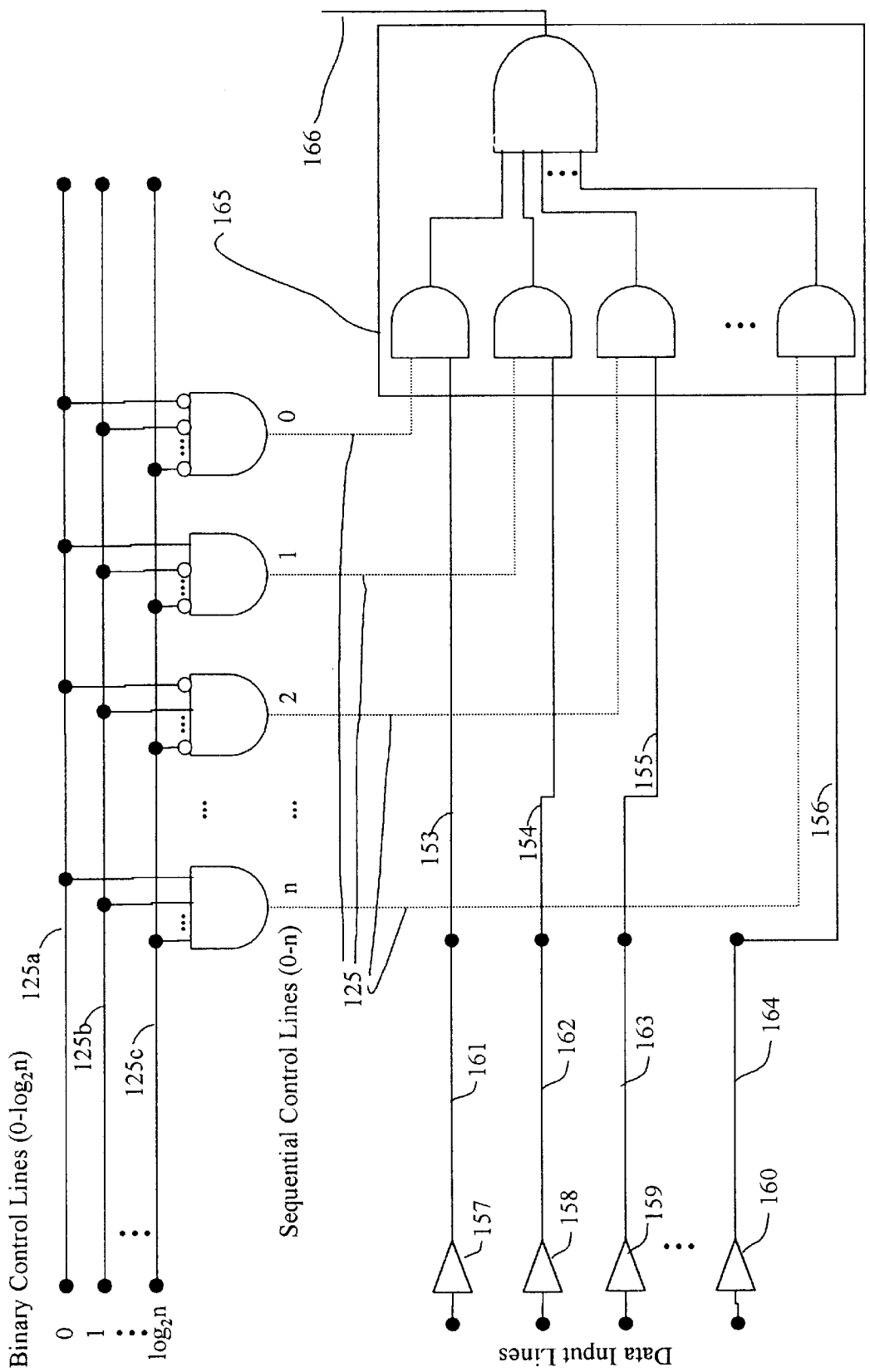
FIG. 28 is a detailed schematic diagram of an illustrative embodiment of control means for selecting the output of the non-blocking, non-delaying switching means according to the present invention.

FIG. 28 shows an illustrative example at the logical level of one of a plurality of ways that this switching circuit might be implemented. Binary control lines 125a, 125b, and 125c with a binary numbering scheme are used to select the specific sequential control line 125 which then switches on the correct output line 153, 154, 155, or 156. A triggering control line may also be used as well as other logic devices which are well known in the art. In this example, it is clear that sequential control line that is made high will switch the corresponding output line 153, 154, 155, or 156 to the output line 166.

Figure 29:
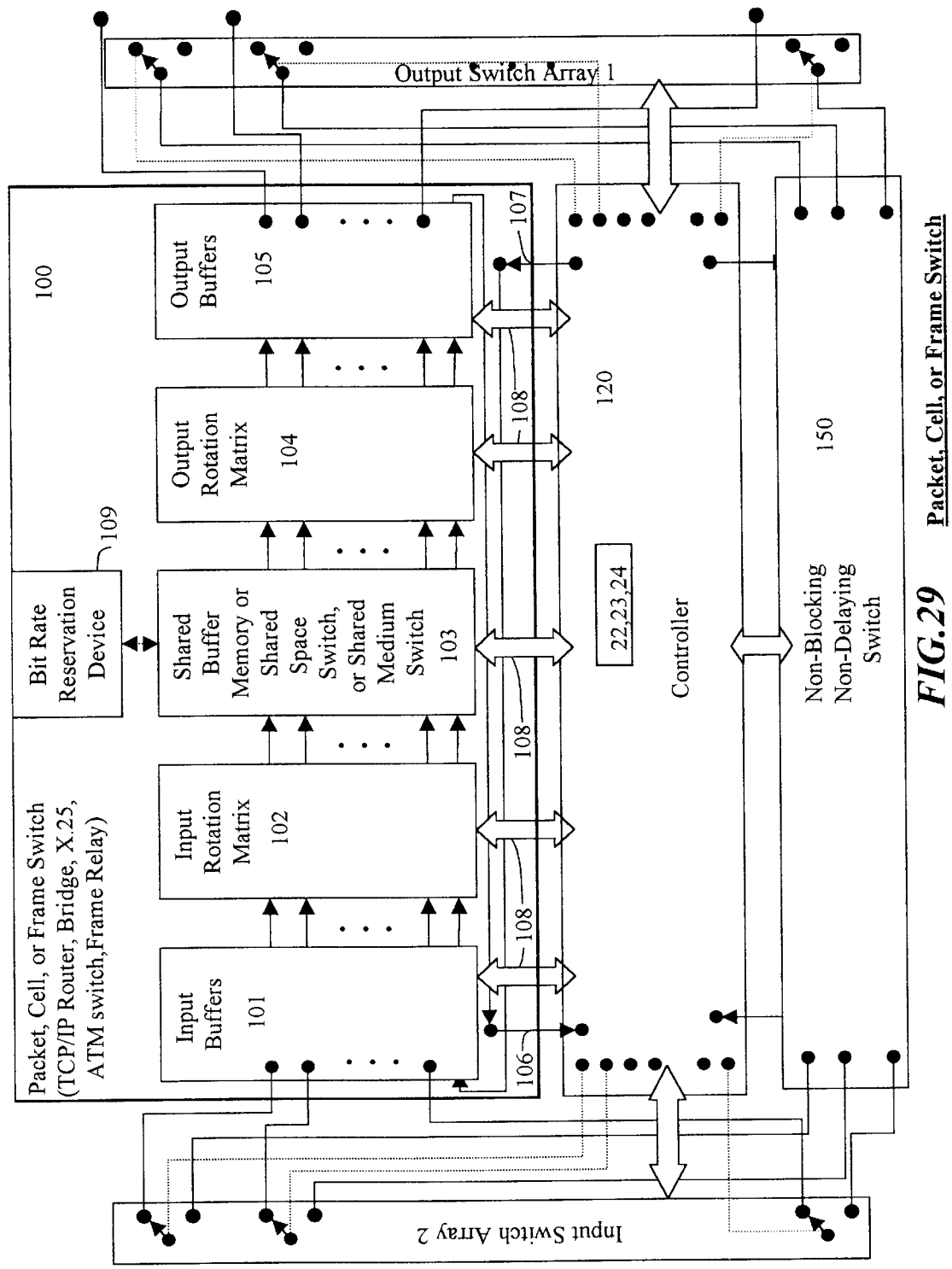
FIG. 29 is a detailed schematic diagram of an illustrative embodiment of store-and-forward packet, cell, or frame switching means according to the present invention.

FIG. 29 provides an illustrative example of the packet, cell, or frame switch 100. The specific details of the switch 100 shown are one of a plurality of store-and-forward switch implementations well known to those skilled in the art. These details are not the focus of this invention and will not be covered here. Virtually any store-and-forward switch may be used for switch 100. The inputs and outputs for switch 100 have already been discussed. Controller 120 uses control lines 108 to route packets through the packet switch. Lines 106 and 107 are input and output lines which enable controller 120 to receive and transmit standard packets through the packet switch 100 for various communication purposes such as call setup.

Figure 30:
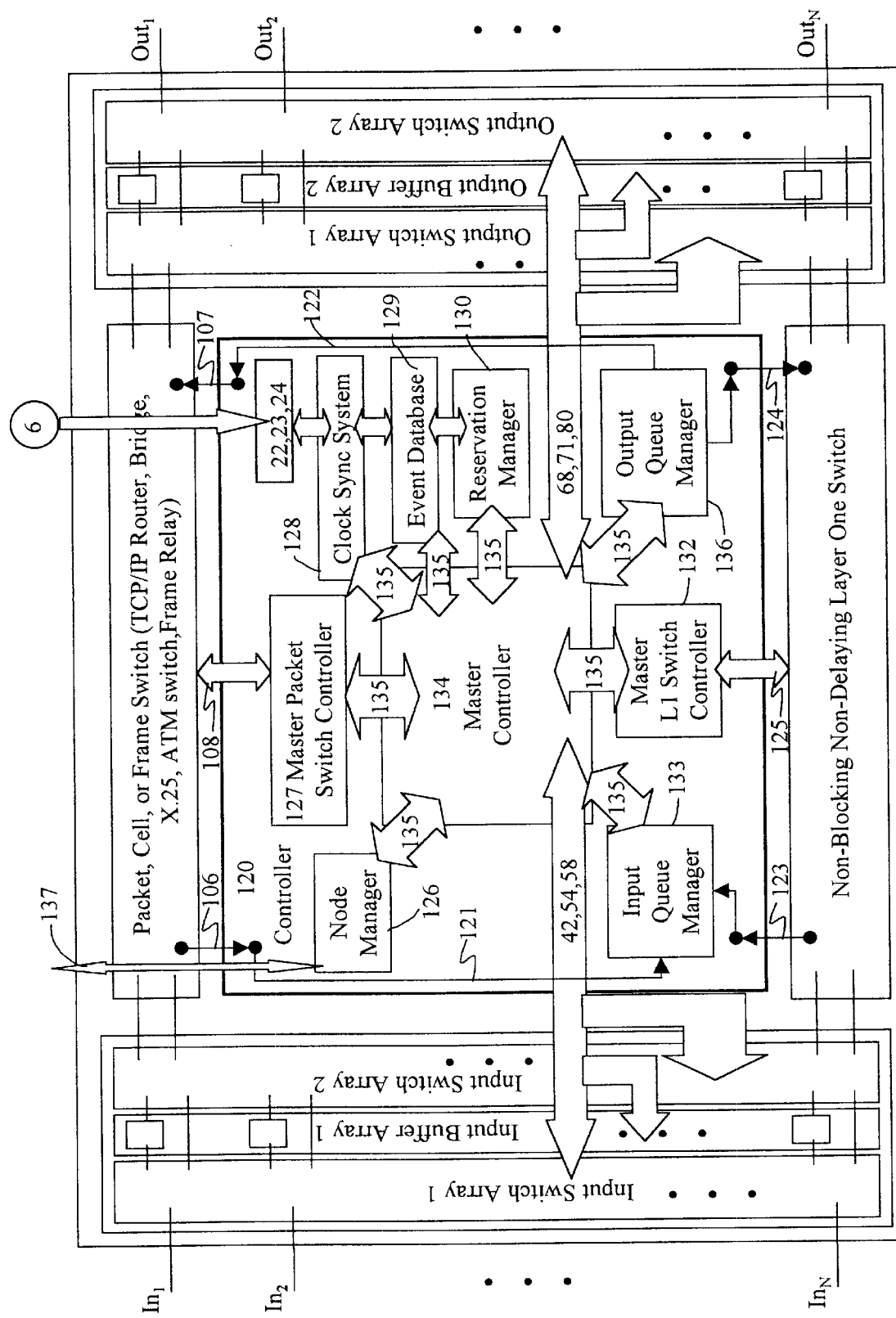
FIG. 30 is a detailed schematic diagram of an illustrative embodiment of the controller means according to the present invention.
Figure 31:
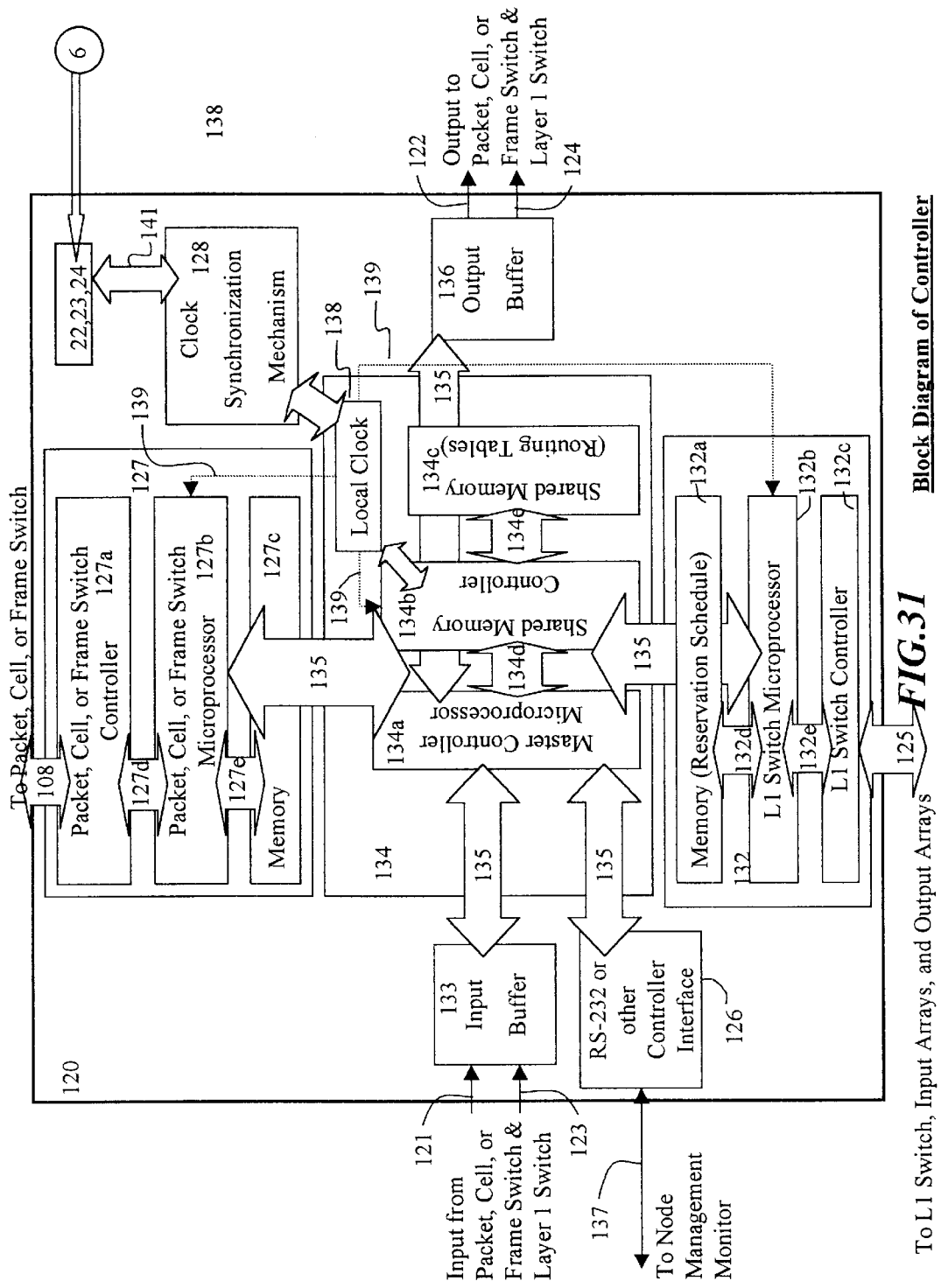
FIG. 31 is a detailed hardware diagram of an illustrative embodiment of the controller means according to the present invention.
Figure 32:
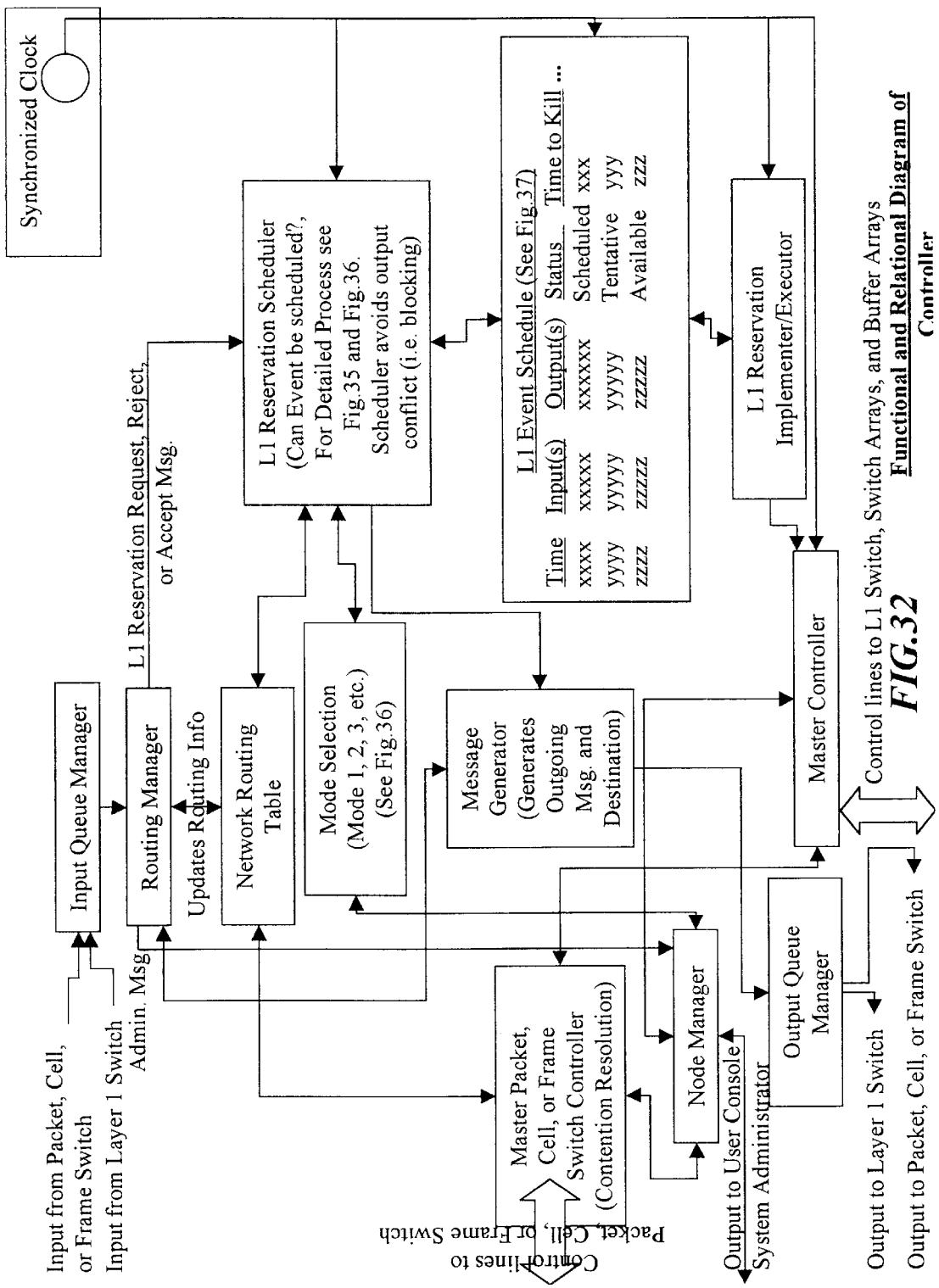
FIG. 32 is a detailed functional and relational block diagram of the controller means according to the present invention.
Figure 34:
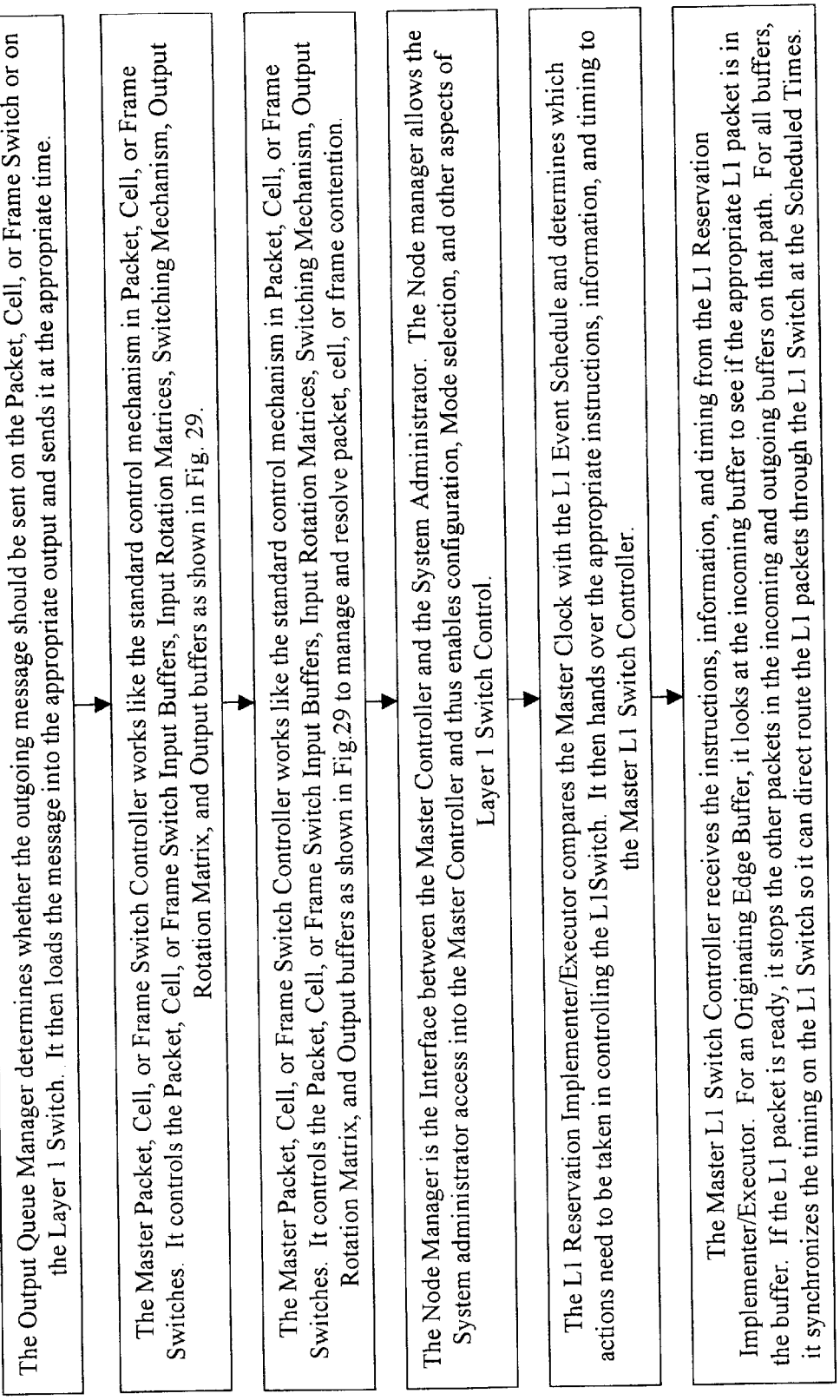

FIG. 30, FIG. 31, FIG. 32, FIG. 33, and FIG. 34 show how the controller 120 works. FIG. 30 is a functional block diagram showing the key functional components of the controller 120. FIG. 31 is a block diagram of the hardware for controller 120. FIG. 32 is a Logic Diagram for controller 120 showing a flow chart of the various aspects of the logic process. FIG. 33 and FIG. 34 show the process that the controller 120 uses to operate the switch. Together, these figures provide the workings of the controller 120.

FIG. 30 shows controller 120 comprising the master controller 134, the master packet switch controller 127, the clock synchronization system 128, the master clock receiver 22, 23, or 24, the layer one event database 129, the reservation manager 130, the output queue manager 136, the master L1 switch controller 132, the input queue manager 133, node manager 126, input lines 106, 120, and 123, output lines 124, 122, and 107, and control lines 135 for internal communication, control lines 108 for communication with switch 100, control lines 125 for communication with switch 150, control lines 42 for communication with input switch array 59, control lines 54 for communication with input buffer array 60, control lines 58 for communication with input switch array 61, control lines 68 for communication with output switch array 62, control lines 71 for communication with output buffer array 63, and control lines 80 for communication with output switch array 62.

FIG. 31 shows the hardware layer of controller 120. At this level, controller 120 comprises master controller microprocessor 134a for running the master controller program stored in shared memory controller 134b; shared memory 134c for routing tables; input buffer 133 for getting external network input from switch 100 and switch 150; output buffer 136 for transmitting messages externally through switches 100 and 150; master clock receiver 22, 23, 24; clock synchronization mechanism 128; local clock 138; packet, cell, or frame switch controller 127a for controlling switch 100; packet, cell, or frame switch microprocessor 127b for running the control program for switch 100 store in memory 127c; and layer one switch controller 132c for controlling switch 150; layer one switch microprocessor 132b for running the control program for switch 150 stored in memory 132a, which also includes the layer one reservation schedule.

FIG. 32 shows the functional and relational diagram for controller 120, wherein the input queue manager gets input from packet, cell, or frame switch 100 or layer one switch 150. The input queue manager strips off the flags and sends the packets to the routing manager. The routing manager determines what type of message it is and sends it to the appropriate function. If the message is a layer one message, such as a call setup reservation request, an accept message, or a reject message, the routing manager sends the message to the reservation scheduler. If the message contains network routing update information, the routing manager sends the message to the network routing process to update the network routing tables. If the message is an administrative message, the routing manager sends it to the node manager.

When the layer one reservation scheduler gets a reservation message, it checks the routing table to determine which input and output lines may be affected. Then it looks at the layer one event schedule to determine whether the event can be scheduled. This entire layer one event scheduling process is detailed in FIG. 35 and FIG. 36, with the layer one event schedule illustrated in FIG. 37. Based on the layer one event schedule it either schedules the event, tentatively schedules the event, makes the event available again, or does nothing. It then tells the message generator which message to send as a response. The message generator generates a message, checks the network routing table for addressing information and sends the message to the output queue manager to transmit over switch 100 or switch 150. The layer one reservation scheduler may also check the mode selection to determine how the system administrator through the node manager wishes for it to respond to a rejection message. This process is described in FIG. 36.

As events are scheduled in the layer one Event schedule (see FIG. 37) by the layer one event scheduler (see process in FIG. 35 and FIG. 36), the layer one reservation executor continuously looks at the event schedule to determine which layer one events are approaching execution. It alerts the master controller 134 regarding these events in enough time for the master controller to execute the appropriate action at the correct time, specifically enabling layer one switching.

The node manager handles input and output from the a user console, to enable the system administrator to control the system.

FIG. 33 and FIG. 34 further explain the master controller 134 process, step by step.

Figure 35:
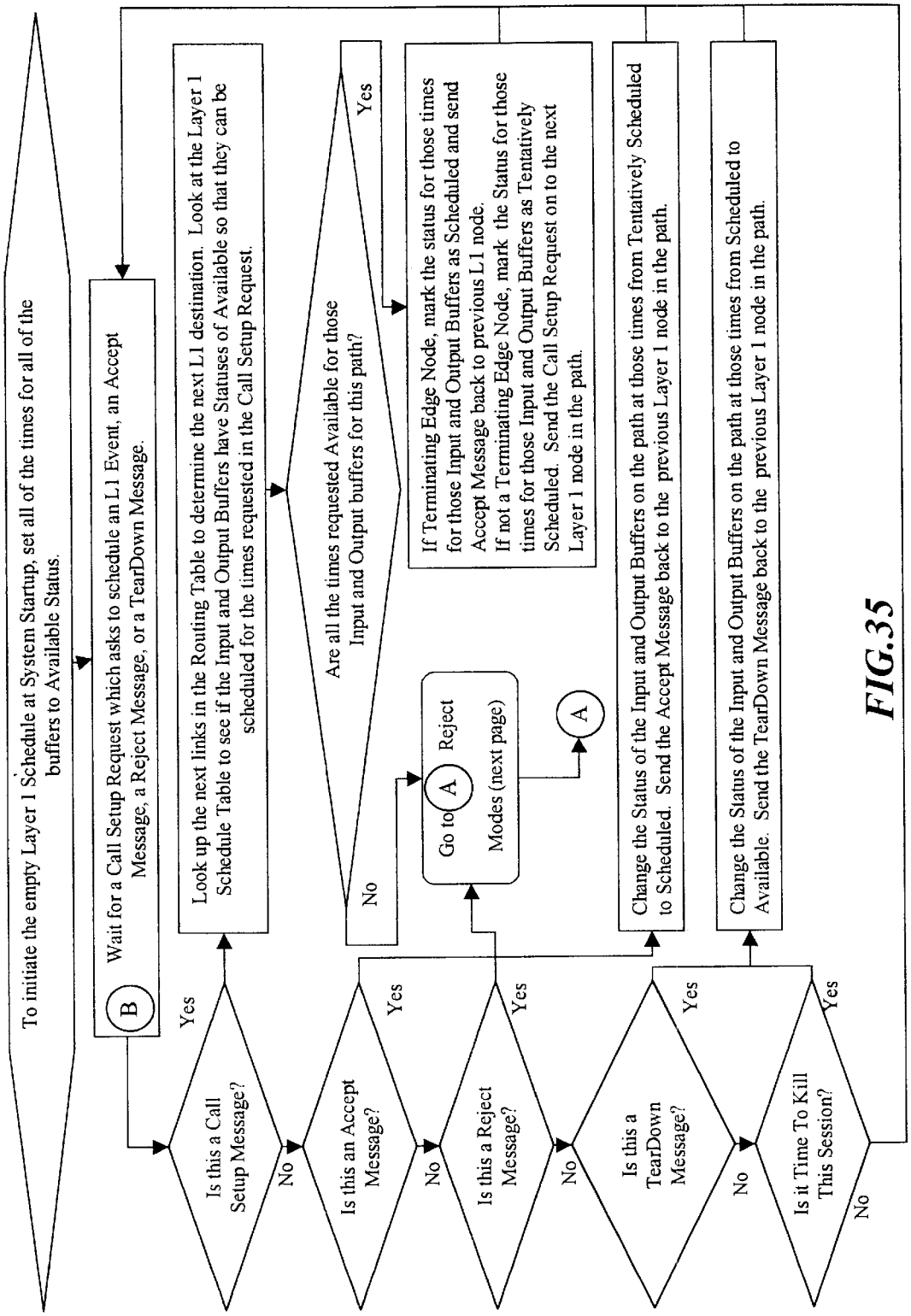
FIG. 35 and FIG. 36 is a flowchart diagramming the layer one event scheduling process, including Reject Modes, according to the present invention.
Figure 36:
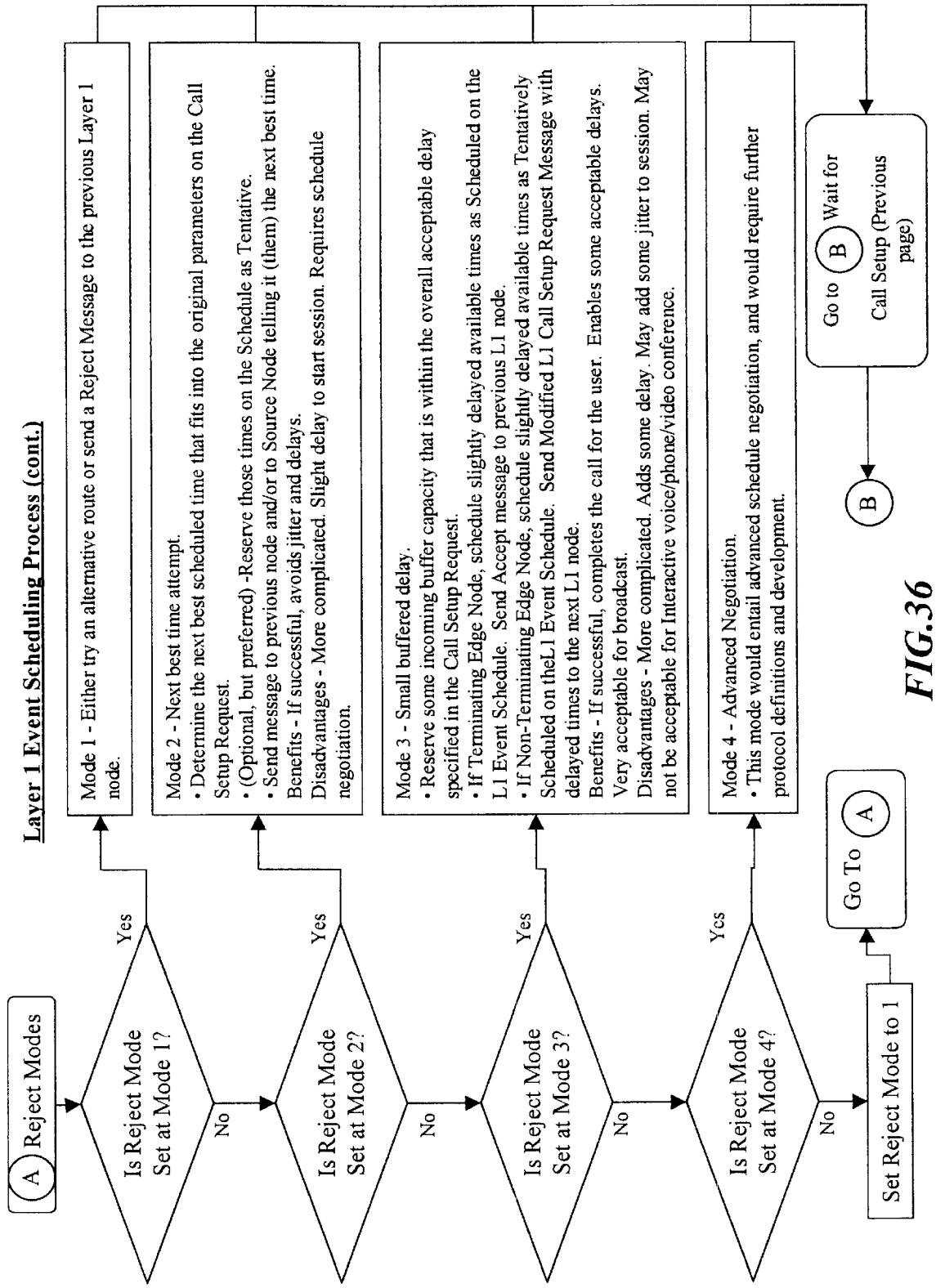

FIG. 35 and FIG. 36 are flowcharts which detail the entire layer one event scheduling process as explained previously.

FIG. 37 exemplifies the layer one event schedule. This is just one illustrative representation, as it could be represented and managed in a plurality of ways. It includes a column representing the time in day (dd), hour (hh), minutes (mm), seconds (ss), thousandths of seconds (mmm), millionths of seconds or microseconds ($\mu\mu\mu$), and hundreds of nanoseconds (n), although it could be even more precise if the synchronization accuracy supported it. Next are shown the input line and output line that could be potentially scheduled for a potential path through the node. Next to the input and output lines is an indication of whether the line acts as an edge buffer or edge node, i.e., is it the originating or terminating line into or out of the layer 1 network. If so, it acts slightly differently as described in FIG. 14, FIG. 15, FIG. 19, FIG. 20, FIG. 21, and FIG. 22. Next is shown the status of the path through the node, whether this path is scheduled, tentatively scheduled, available, or reserved specifically for standard packets, cells, or frames. Times reserved for standard packet, cell, or frame switching are shown below the dashed line. The next column is a "Time to Kill" column in which a timer is set for a scheduled session. If there is no layer one activity during that layer one interval on that path for a certain period of time, the "Time to Kill" timer will expire and tear down the session. The next two columns, "Time Offset to Next Node" and "Propagation Delay to Next Node" indicate the difference in clock synchronization time and propagation delay between this node and the next node connected to that incoming line as measured by the two-way time reference method discussed in FIG. 39 and FIG. 40, This event schedule could add additional elements as well and be represented in a plurality of ways.

Figure 38:
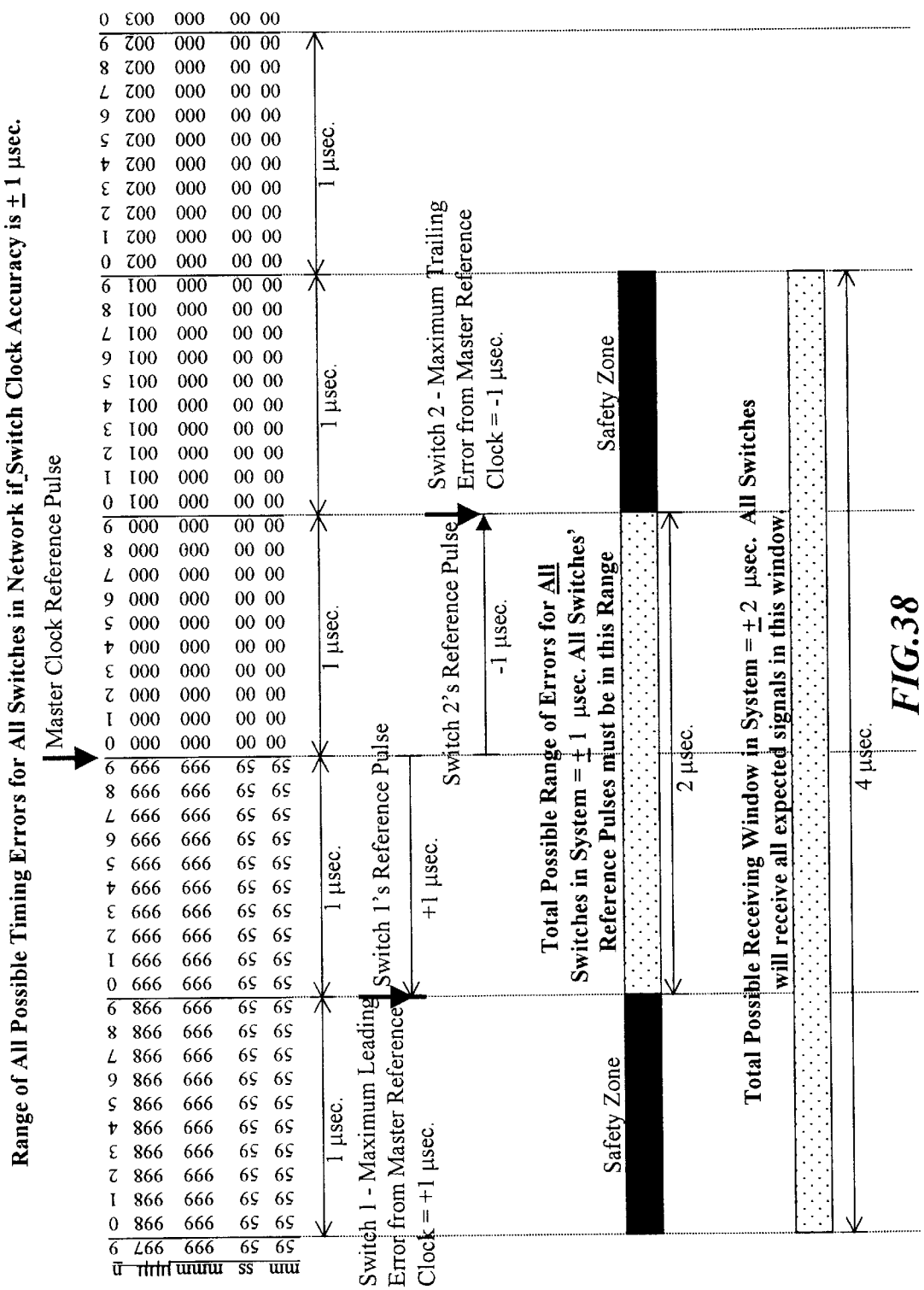
FIG. 38 shows the range of all possible timing errors for all switches in a network using the illustrative example of switch clock accuracy of ±1 microsecond, according to the present invention.
Figure 39:
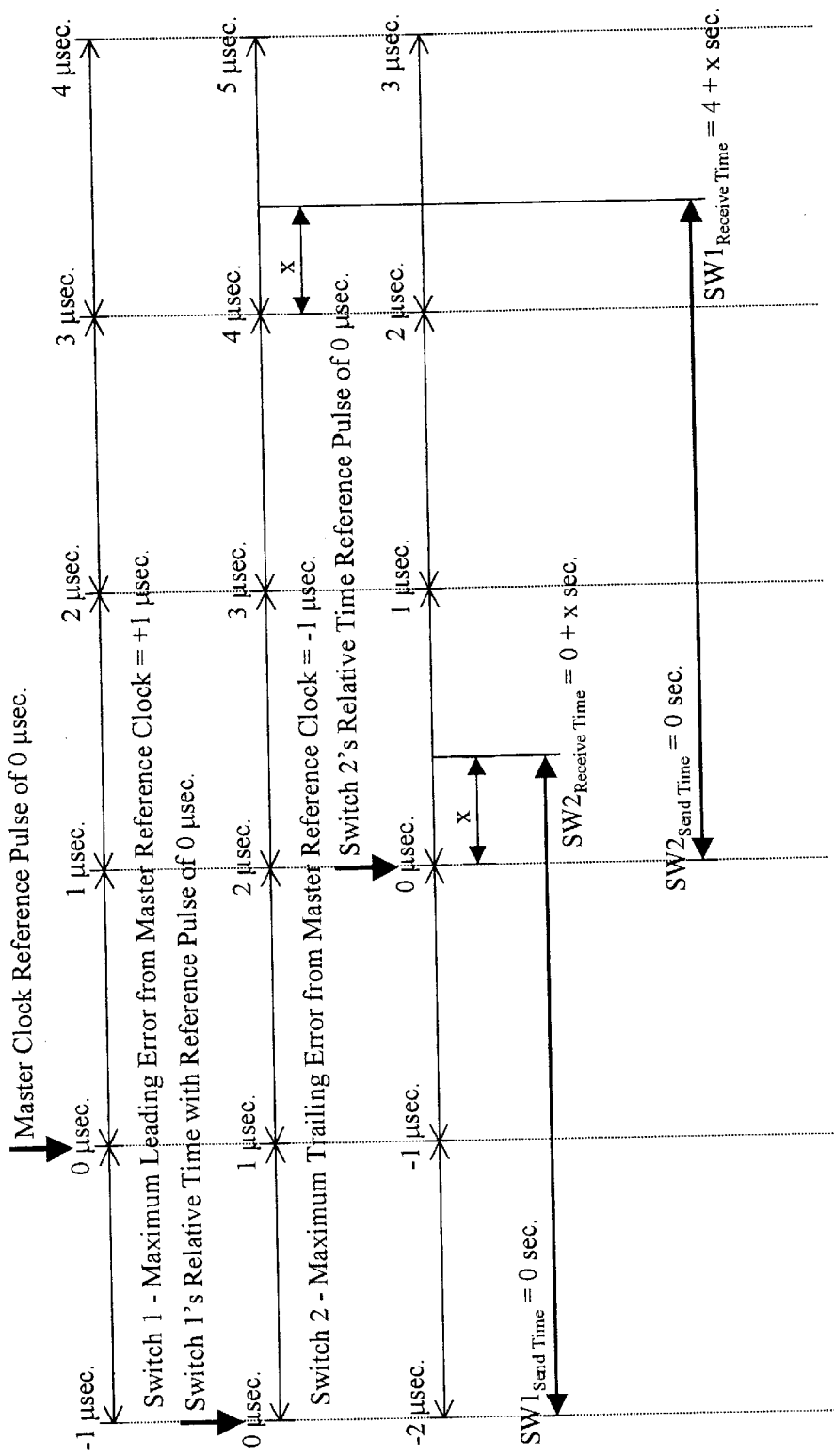
FIG. 39 is a timing diagram showing the two-way time transfer clock synchronization method according to the present invention.
Figure 40:
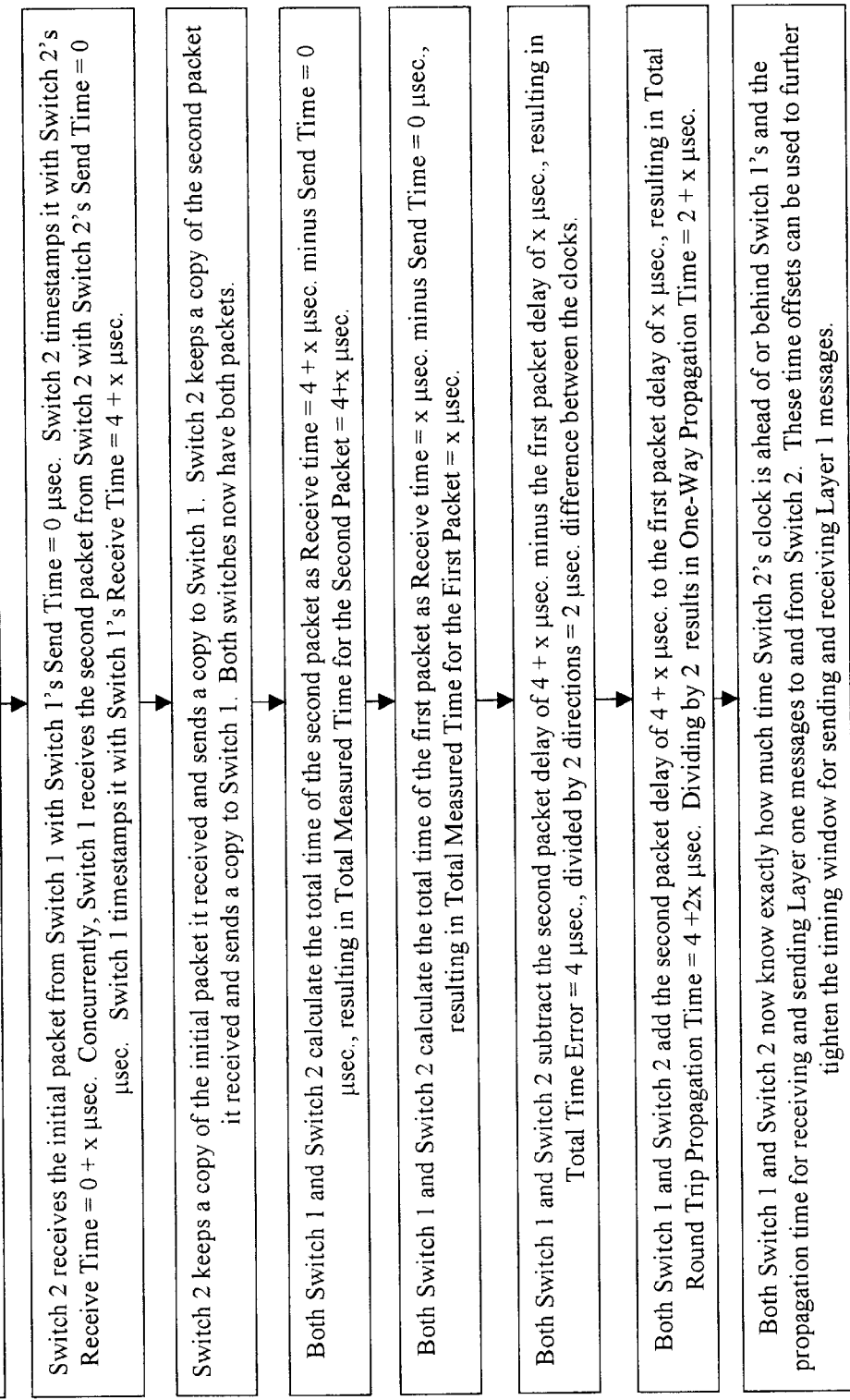
FIG. 40 shows the two-way time transfer clock synchronization method process according to the present invention.
Figure 41:
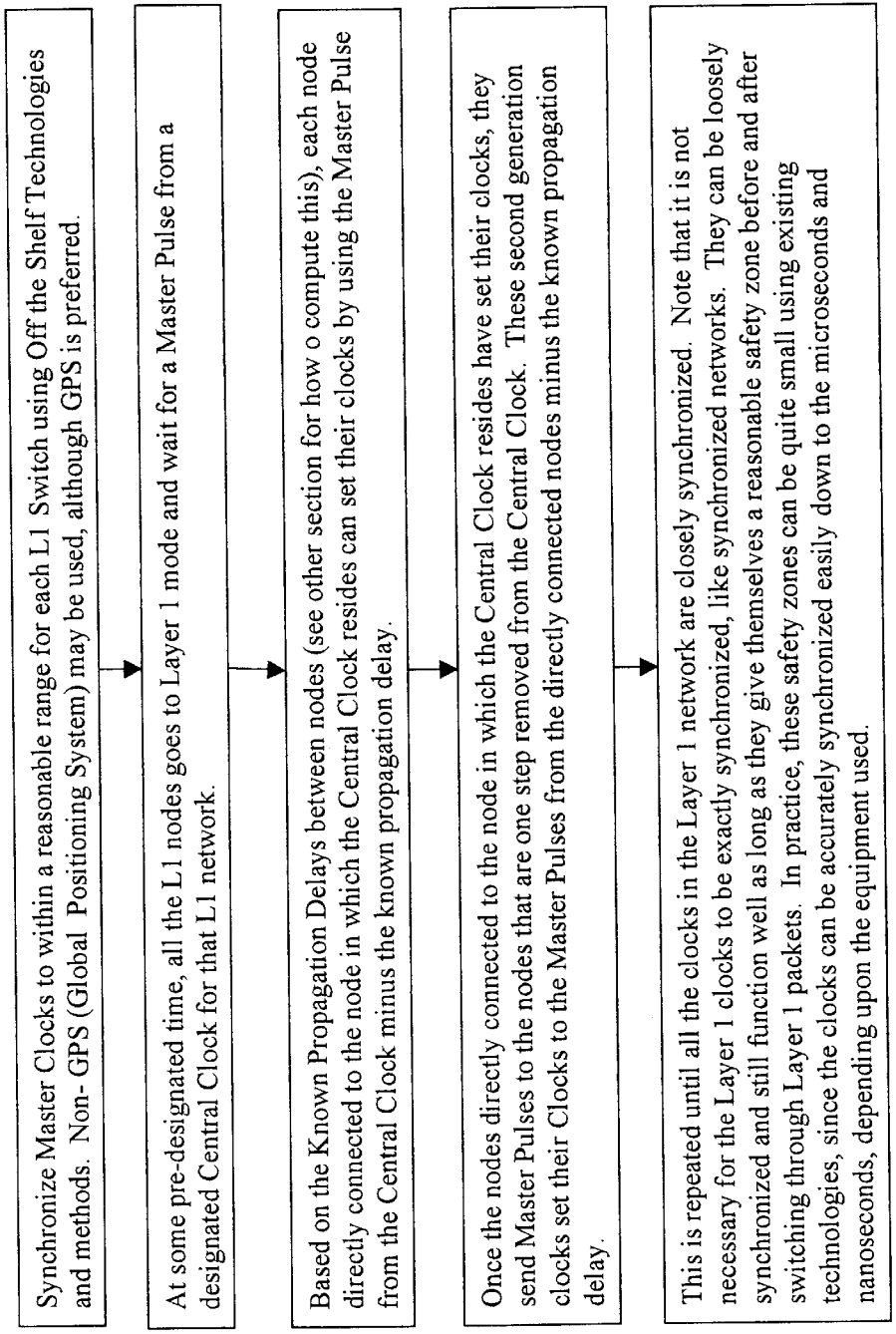
FIG. 41 shows an illustrative alternative process of synchronizing layer one network clocks according to the present invention.

FIG. 38 and FIG. 39, are timing diagrams used to clarify the timing synchronization processes outlined in FIG. 40 and FIG. 41, and used by the present invention for time synchronization purposes. FIG. 38 shows an illustrative example to calculate the range of all possible errors for all layer one switches in a layer one network. FIG. 38 shows a timing diagram at the top of the page, beginning with a master clock reference accuracy down to the hundreds of nanoseconds. The clock itself is shown incrementing from left to right and shows minutes (mm), seconds (ss), thousandths of seconds (mmm), millionths of seconds or microseconds ($\mu\mu\mu$), and hundreds of nanoseconds (n). Practically speaking, relatively inexpensive GPS enables timing systems are currently available offering accuracies of ±1 microsecond. Using ±1 microsecond as an illustrative accuracy number, FIG. 38 shows that if all layer one switches in the layer one network were accurate to within ±1 second, then the maximum leading error of switch 1 versus the maxim lagging error of switch 2 would result in a total possible range of errors for all the nodes of only 2 $\mu$seconds. Temporarily ignoring propagation delay, this means that if a layer one packet were to be sent across a layer one network according to the present invention, every node in the network would be able to predict that packet's arrival time to within ±2 microseconds such that the total possible error range for a node awaiting the packet's arrival is ±2 microseconds or 4 microseconds. In other words, all nodes will receive all expected layer one signals in this 4 microsecond window.

Illustratively, if the layer one switch was operating at DS-1 speeds of 1.544 Megabits per second, 4 microseconds would be the equivalent of 6.176 bits. Thus, waiting for the layer one packets on that input or output line would result in a maximum loss of 7 bits. This is not even the size of an address header. Alternatively, if the layer one switch was operating at 1 Gigabits per second, 4 microseconds would be the equivalent of 4000 bits or 500 octets, about the size of several address headers.

Figure 47:
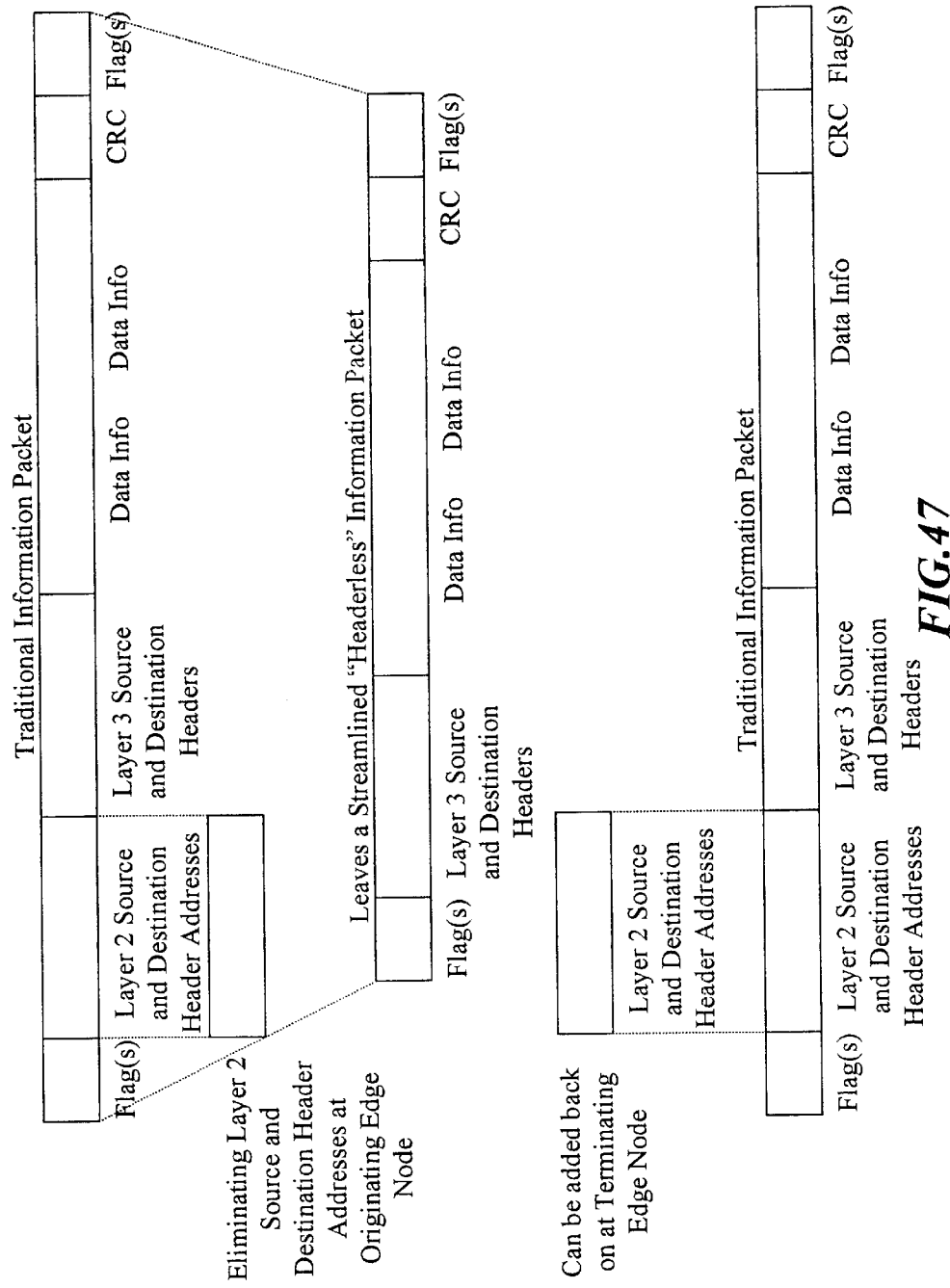
FIG. 47 illustrates the added efficiency of "headerless" packet switching according to the present invention.

If the timing synchronization system was made accurate to within ±100 nanoseconds, as some GPS systems are, then the range of all possible timing errors would be 400 nanoseconds or ±200 nanoseconds. Illustratively, if the layer one switch was operating at DS-1 speeds of 1.544 Megabits per second, 400 nanoseconds would be the equivalent of 0.6176 bits, or less than 1 bit. Alternatively, if the layer one switch was operating at 1 Gigabits per second, 400 nanoseconds would be the equivalent of 400 bits or 50 octets, about the size of an address header. Consequently, this system would work well with headerless packets as shown in FIG. 47, in which the address headers and other repetitive information is removed, thus leaving a margin for timing errors.

FIG. 39 and FIG. 40 illustrate the two-way time transfer technique for determining very precisely the differences in timing between two nodes and the propagation time between the nodes. This is very similar to the two-way transfer technique as shown in the U.S. Naval Observatory reference Using the same numbers as in the previous illustrative example, FIG. 39 shows on a timing diagram a graphical illustration of the two-way time transfer technique, in which switch 1 has a maximum leading error of +1 microseconds from the master clock reference, while switch 2 has a maximum trailing error of –1 microseconds from the master clock reference, resulting in a total one-way propagation time of 2+some variable x microseconds.

FIG. 40 describes and explains how the two-way time transfer process works, specifically as it relates to FIG. 39 wherein each node timestamps a packet and immediately sends it to the other node, who then timestamps it immediately upon receipt. When both nodes do this, even if their clocks are not accurately aligned, they can send each other their results, such that with the timestamps on both packets, it is easy to compute very precisely both the difference error between the 2 nodes' clocks and the propagation time between their nodes. The differences in clock times and the knowledge of propagation delay enable each node to calculate time offsets for each input and output line, and then to either adjust their clocks and relative timing or compensate for the known difference in timing. Illustrative examples of these offsets are shown on the Event Schedule in FIG. 37.

In addition to the previous time synchronization techniques, FIG. 41 illustrates an additional process that could be used by the layer one network to self-synchronize. In this way, the entire layer one network could operate by having a non-Global Positioning System master clock. This approach would serve to start up and maintain the layer one network in self-synchrony or could be used if the GPS system failed.

FIG. 42 shows the parameters used to set up a layer one Call Setup Request Message. The value of these parameters would generally be sent from the Source 1 to the first layer one node. However, they may be negotiated between the source and the layer one node, or negotiated between the nodes. This could occur as part of the various reject modes (see FIG. 36). This layer one Call Setup Request could be implemented as a modified Call or Session Setup Request that exists today in various protocols such as TCP/IP, ATM, X.25, etc. All other packets could be borrowed from standard protocol sets of the systems that the layer one devices are operating on, such as TCP/IP, ATM, X.25, etc.

Figure 43:
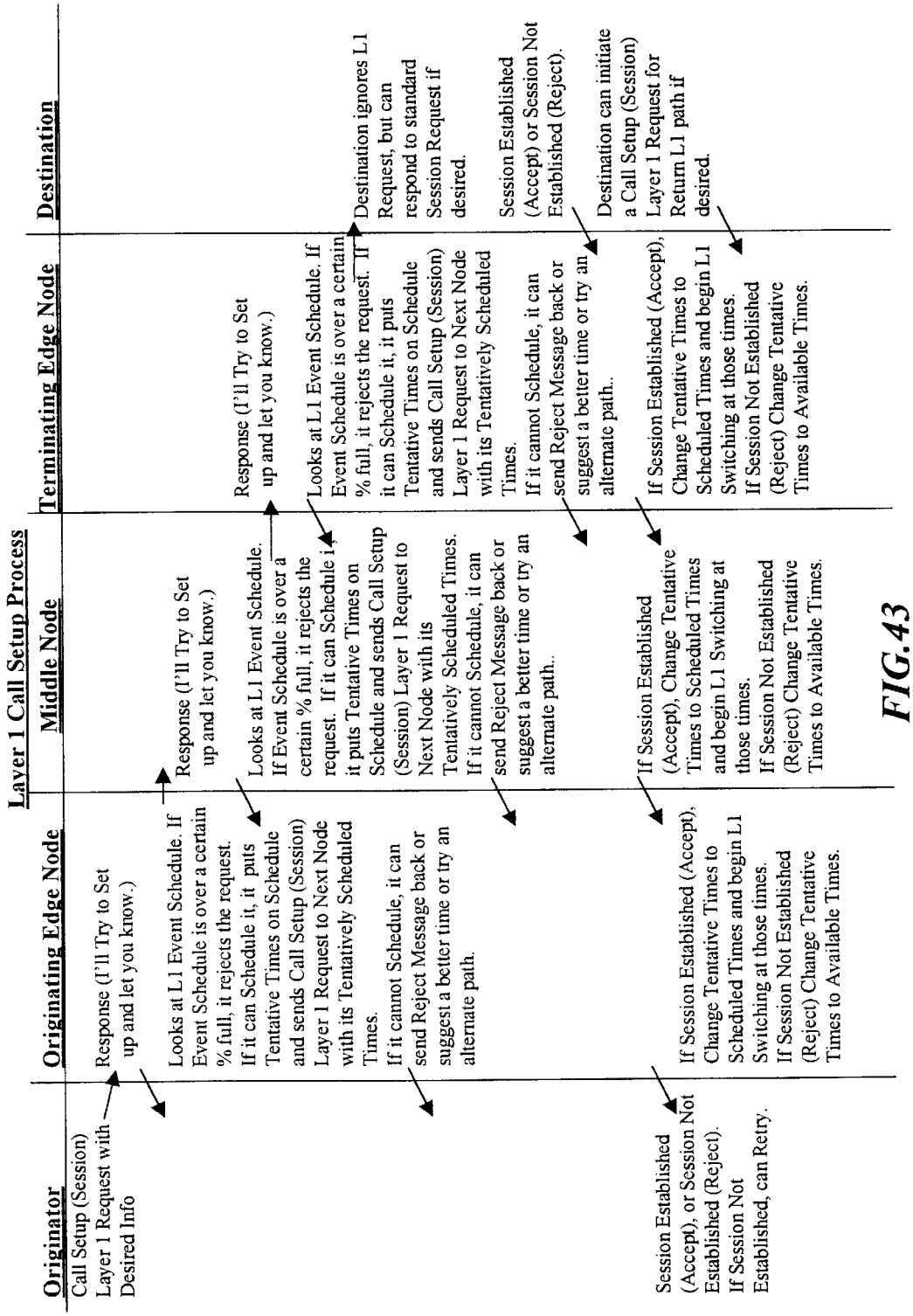
FIG. 43 shows an exemplary layer one network message flow diagram for the call setup process according to the present invention.
Figure 44:
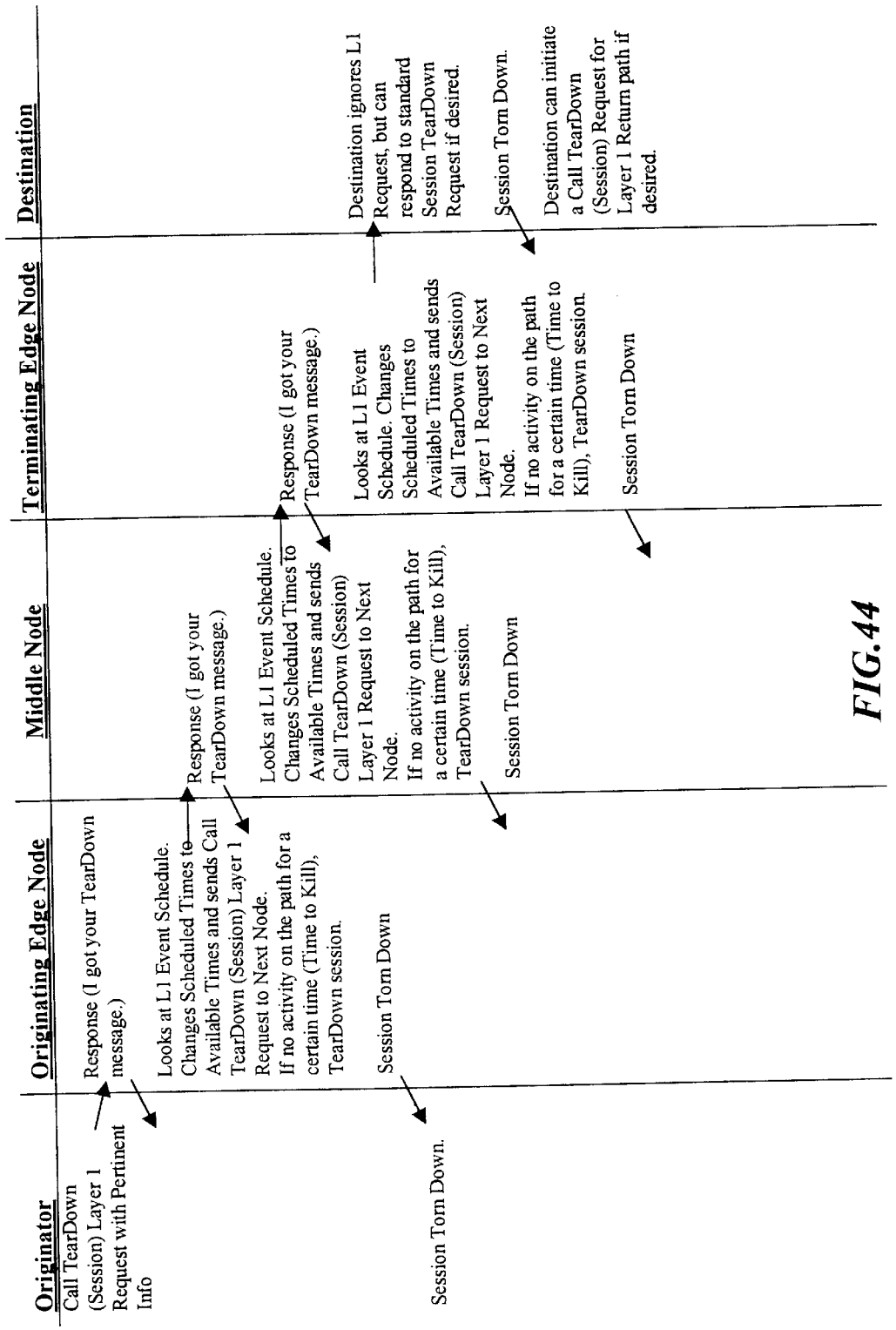
FIG. 44 shows an exemplary layer one network message flow diagram for the call teardown process according to the present invention.
Figure 45:
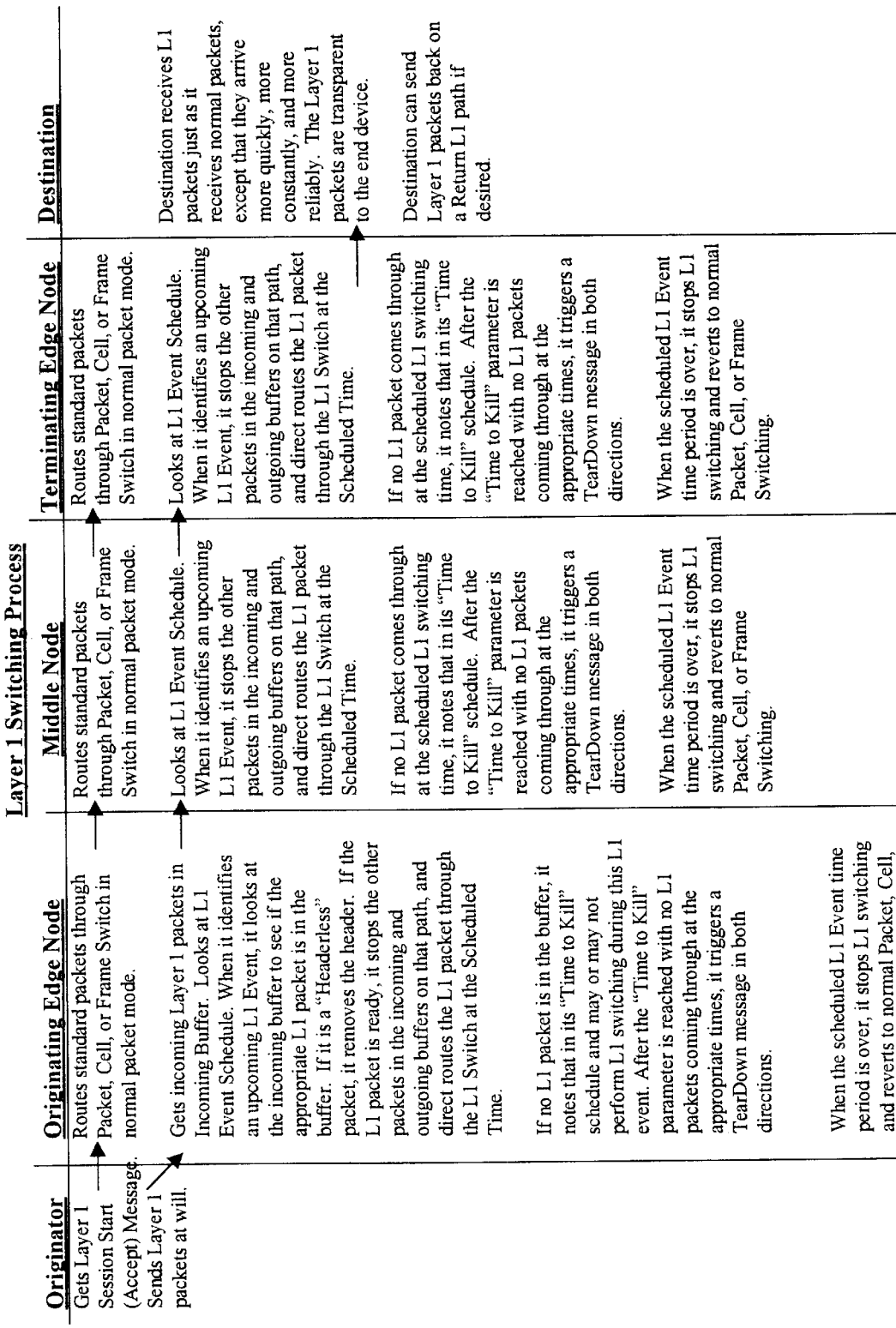
FIG. 45 shows an exemplary layer one network message flow diagram for the layer one switching process according to the present invention.
Figure 46:
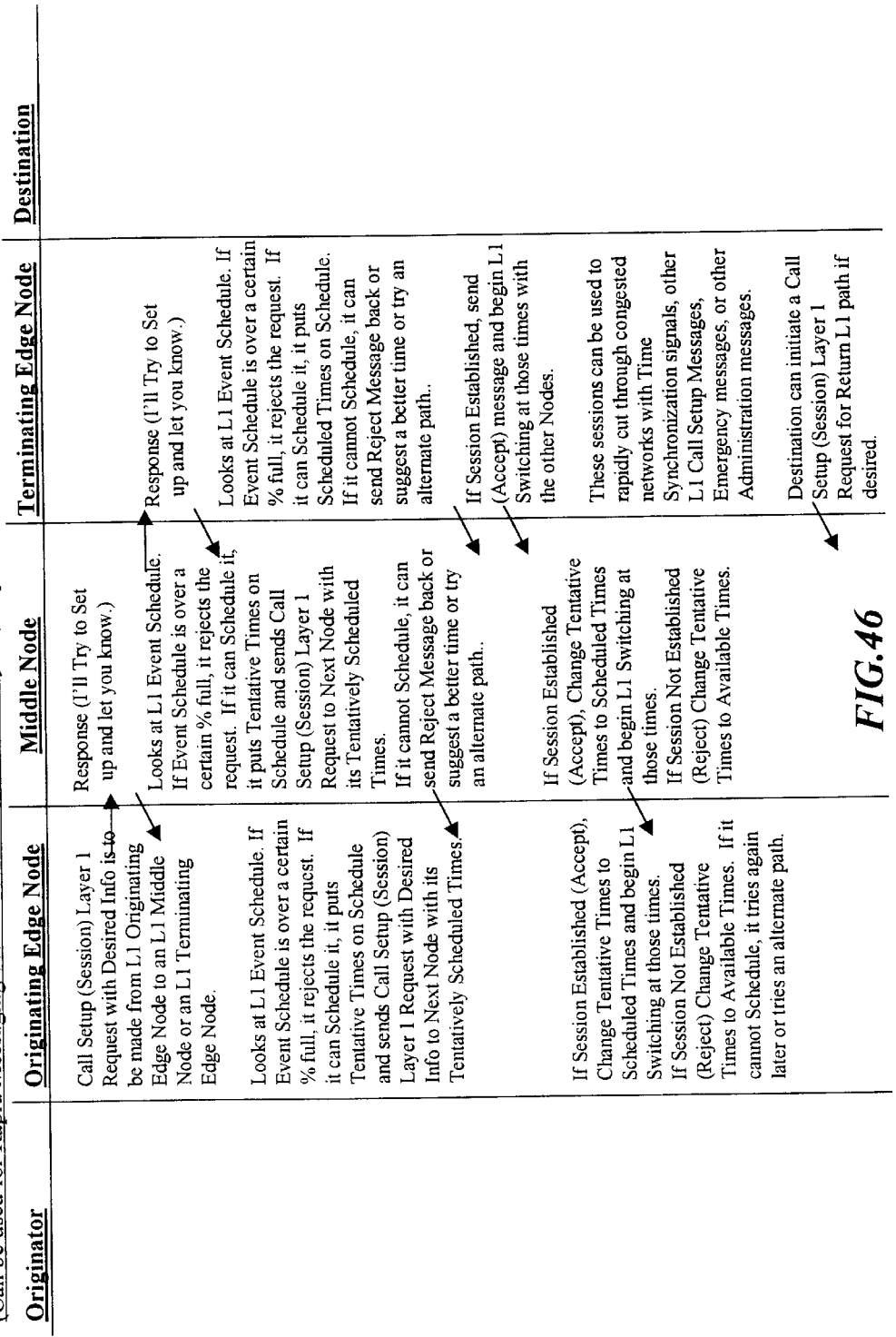
FIG. 46 shows an exemplary layer one network message flow diagram for the layer one inter-node call setup process according to the present invention.

FIG. 43, FIG. 44, FIG. 45, and FIG. 46 illustrate the signaling and message processes between the elements of the layer one network. FIG. 43 shows the details of the layer one Call Setup Process throughout the layer one network. FIG. 44 shows the layer one Call TearDown Process throughout the layer one network. FIG. 45 shows the layer one Switching Process throughout the layer one network. FIG. 46 shows the layer one Inter-Node Call Setup Process throughout the layer one network, for purposes such as emergency messages, timing synchronization, and administration.

FIG. 47 shows the added efficiency of the "headerless" packet. In this embodiment, the layer one network originating node strips off the layer two and layer three source and destination addresses. It may also strip off any information that the terminating edge knows due to the Call Setup Process, which it could then reinsert as the packet exits the network. In this manner, the layer one packets through the network eliminate the inefficiencies of retransmitting this repetitive information. FIG. 47 shows the traditional information packet with its various elements. The "headerless" packet is then shown with the layer two source and destination addresses removed by the originating edge node, such that it is a smaller packet as it is layer one switched through the network. The packet is then shown with the layer two source and destination addresses reinserted by the terminating edge node as the layer one packet exits the system. Not shown, but part of the present invention is the ability to remove any part of the packet in any of the layers, including all of the headers, any repetitive information, or any information which the terminating edge knows which it could reinsert to replicate the packet as it exits the node.

Figure 48:
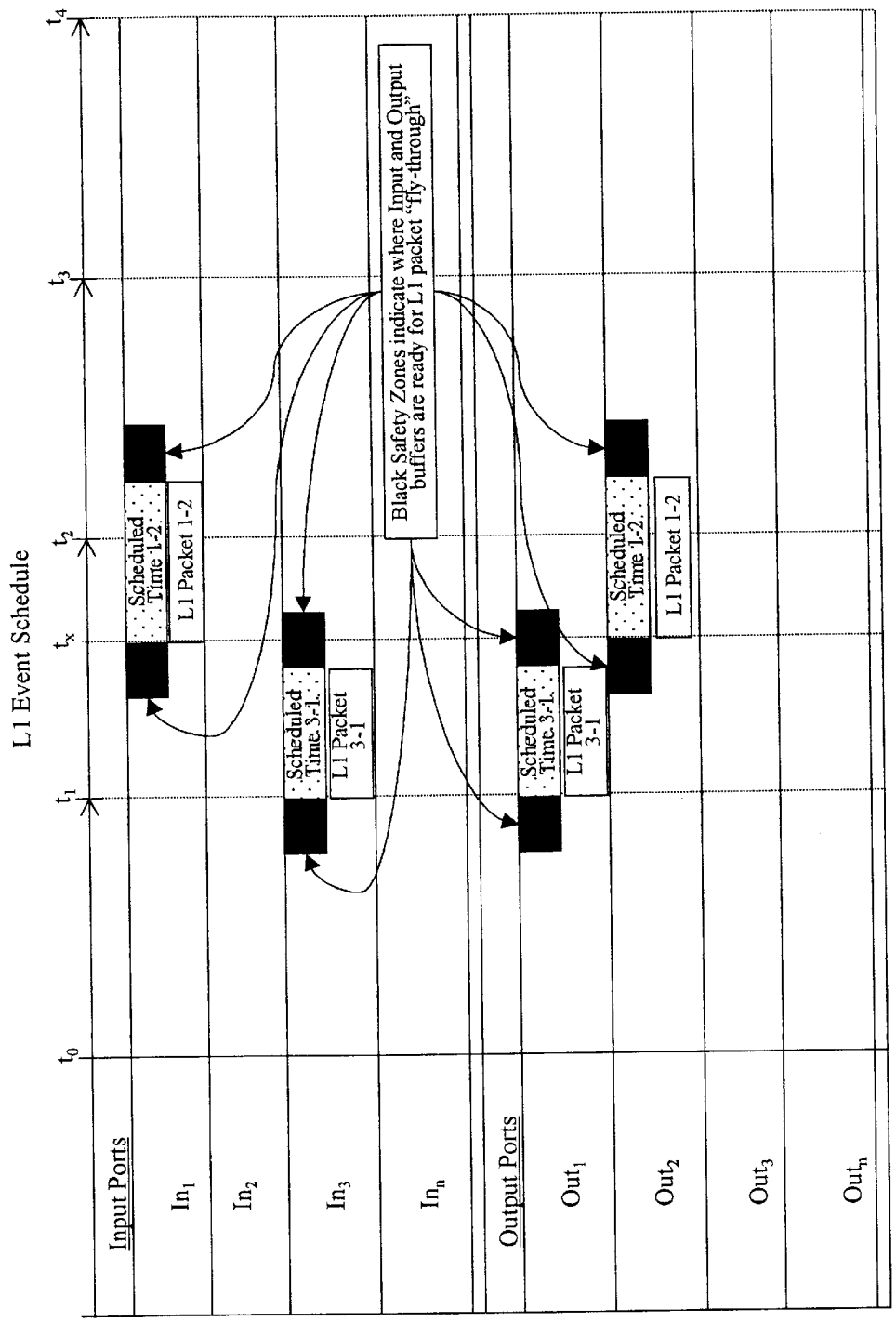
FIG. 48 is a timing diagram showing scheduled layer one packet timing, safety zones, and synchronization of I/O buffers according to the present invention.

FIG. 48 uses a timing diagram to illustrate how scheduled layer one events might work in practice. In this example, layer one packet 3-1 has been scheduled to be sent through this layer one node at time $t_1$, while layer one packet 1-2 has been scheduled to be sent through this layer one node at time $t_x$. Prior to time $t_1$, the layer one event scheduler, using the black "Safety Zone" stops standard packets on input 3 and output 1, and switches input 3 and output 1 to be directly connected to each other. At time $t_1 \pm$ some marginal error less than the safety zone, layer one packet 3-1 enters input 3 and gets "hardwire" routed directly through to output 1 with no more delay than the propagation delay. At the end of the safety zone time, the node converts input 3 and output 1 back into standard packet mode configuration. At time $t_x$., the node does the same thing for layer one packet 1-2, but this time it routes it from input 1 to output 2.

Figure 49:
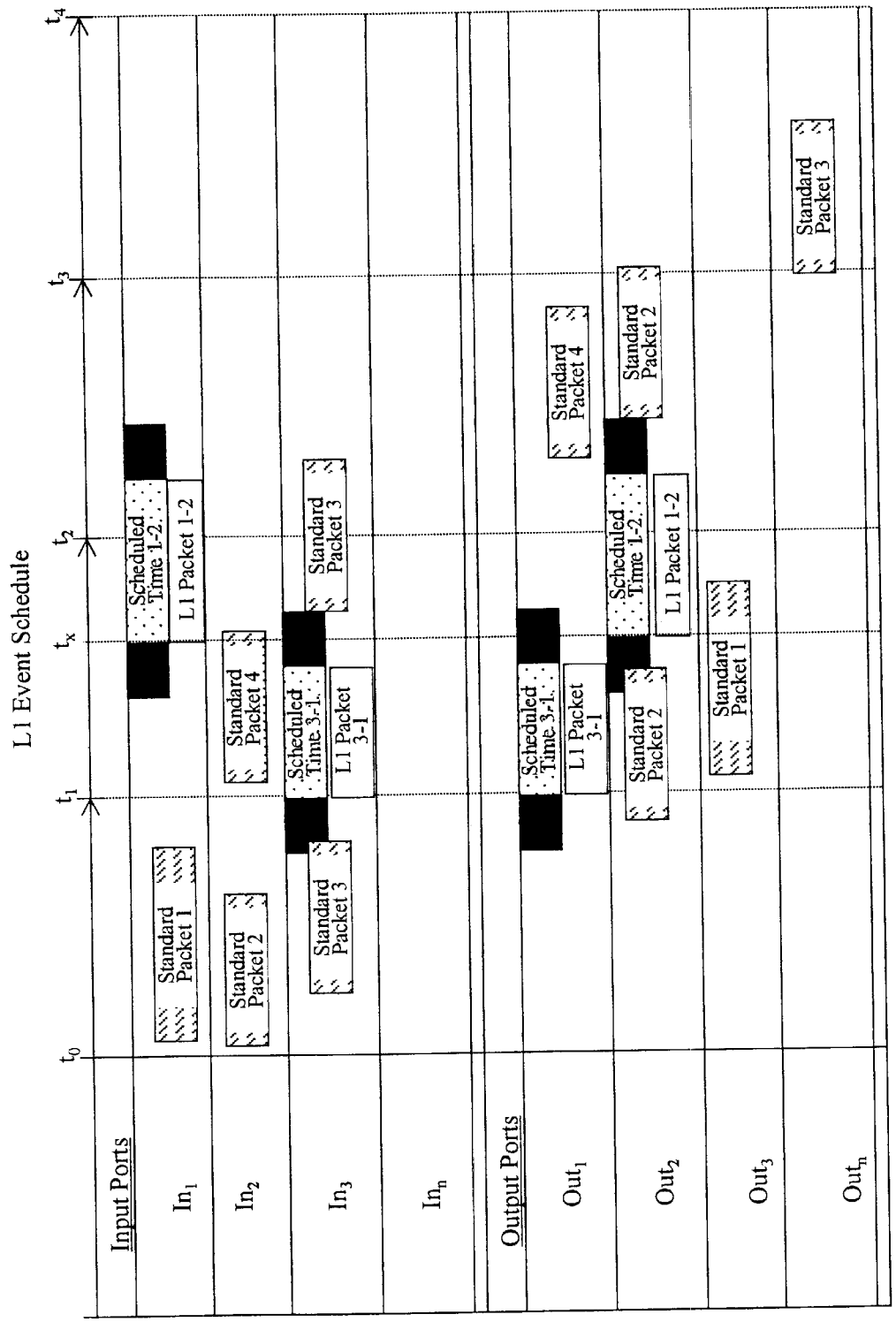
FIG. 49 is a timing diagram showing scheduled layer one packet timing, safety zones, and synchronization of I/O buffers, along with standard store-and-forward packets illustrating the interaction effects of collisions according to the present invention.

FIG. 49 shows the same scenario, except that this time it shows how standard packets interact with the layer one packets. Shortly after time $t_0$, standard packet 1 gets shipped into Input 1. Since there is no contention, packet 1 gets store in input buffer 1, gets routed onto the standard packet, cell, or frame switch and then to output buffer 3 where it appears from output 3 a short time later. The same thing happens to standard packet 2 on input 2, except that the layer one controller detects a potential layer one collision with layer one packet 1-2 scheduled to be coming out of output 2 at that time. Because standard packet 2 would have overlapped the black safety zone, the controller holds packet 2 in the output buffer 2 until after layer one packet 1-2 has been transmitted. Standard packet 2 then is shipped out immediately following the black final safety zone for layer one packet 1-2. Standard packet 3 on input 3 has the same problem, but on an input buffer. Standard packet 3 arrives in time to be stored in the input buffer 3, but cannot be switched to the packet switch due to layer one packet 3-1's schedule arrival. As soon as layer one packet 3-1's scheduled time is complete, including safety zones, standard packet 3 gets sent to the standard packet switch and emerges from output 4 sometime later. Standard packet 4 comes into input 2 and encounters no contention with layer one scheduled packets, so it is routed to the standard packet switch and emerges from output 1 a short while later.

Figure 50:
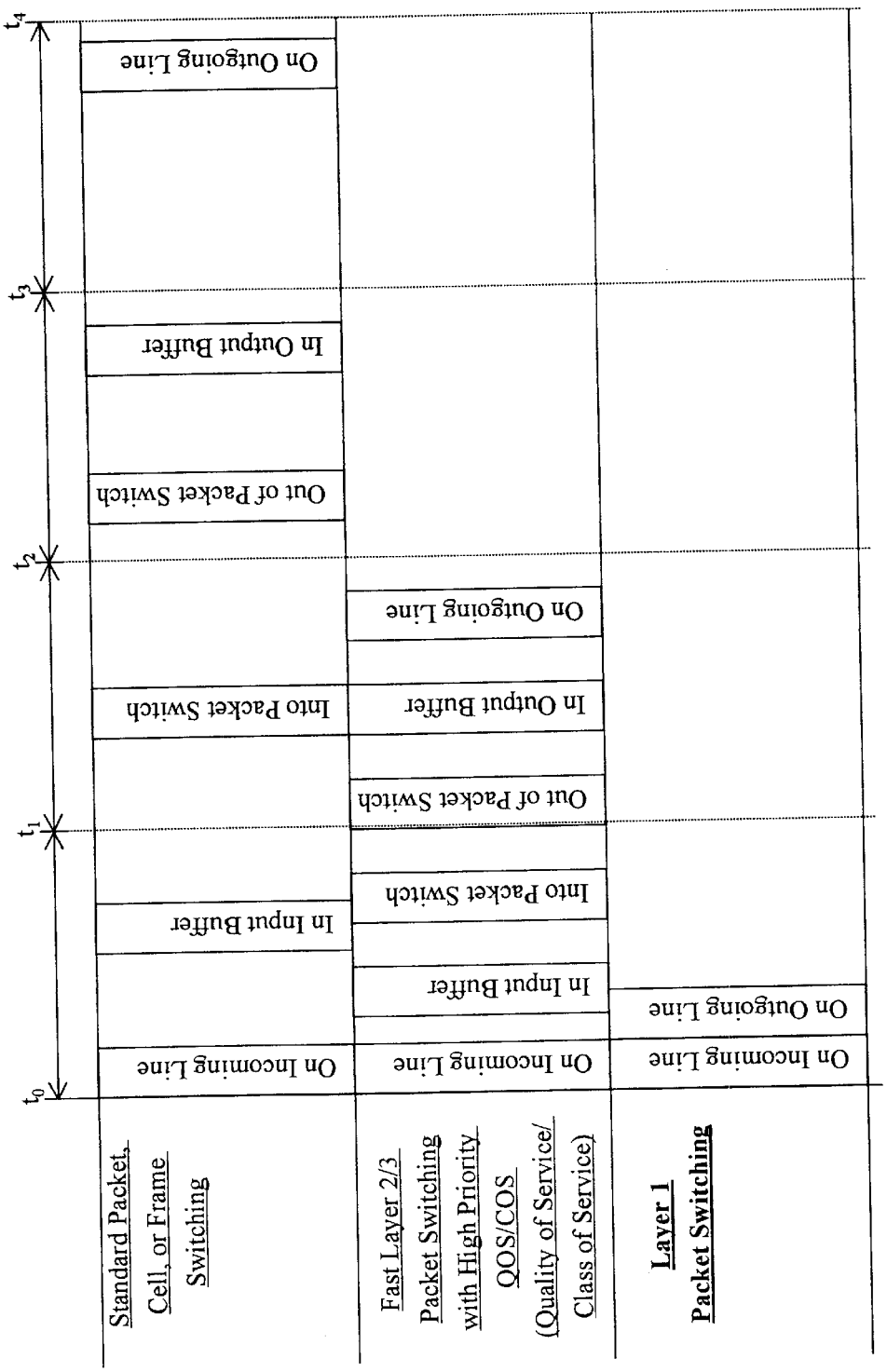
FIG. 50 is a timing diagram showing comparisons between different types of packet, cell, or frame switches versus layer 1 packet switching in a single node according to the present invention.

FIG. 50 shows some timing comparisons between different types of packet, cell, or frame switch technologies and layer one switching in one node or switch. As can be clearly seen, layer one switching is significantly faster than standard packet, cell, or frame switching, and is noticeably faster than layer two or layer three fast packet switching with high priority QOS/COS (quality of service, class of service). This is because in layer one there is no storing, no switching, and no possibilities of collision at any point in the node.

Figure 51:
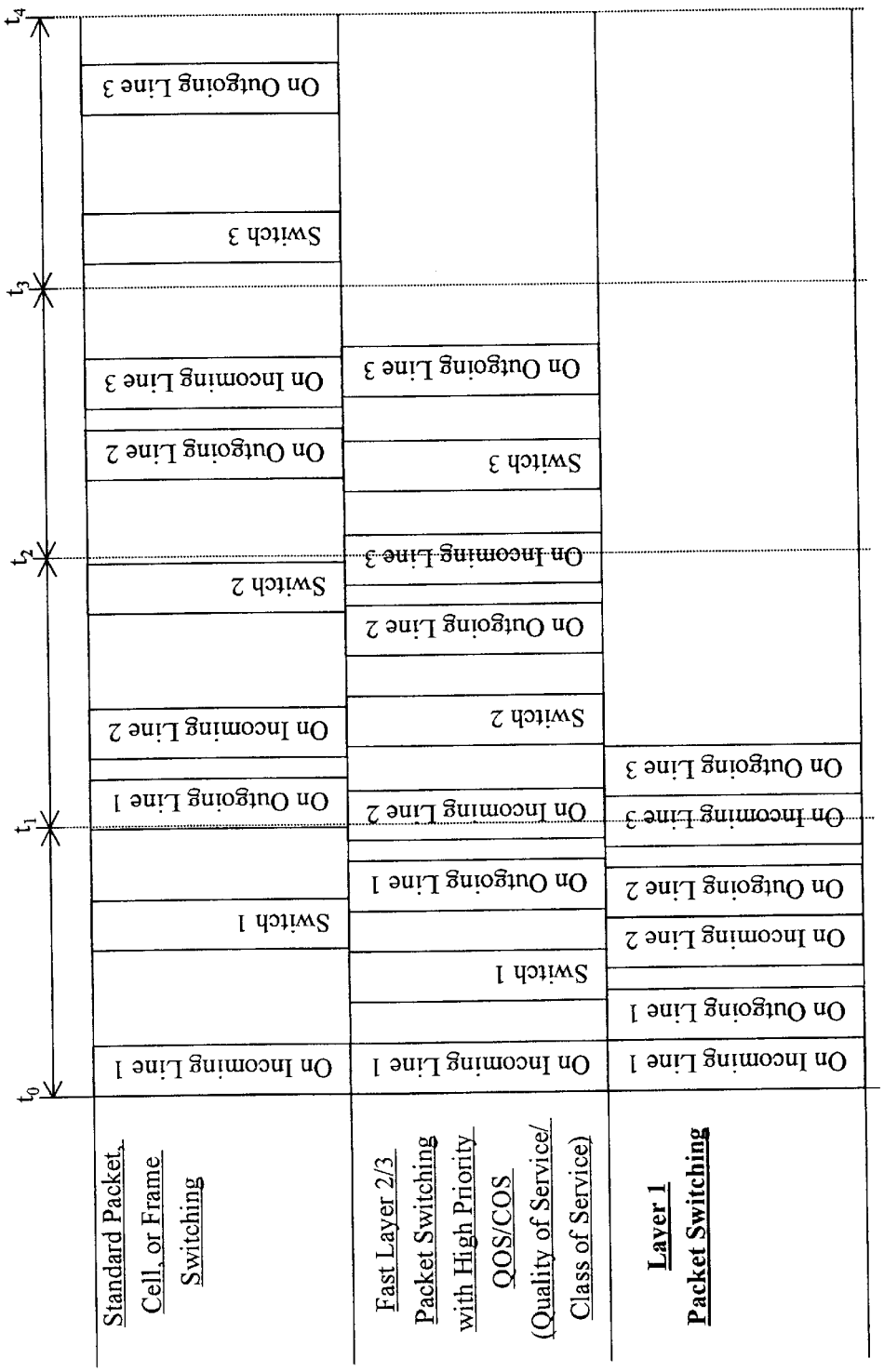
FIG. 51 is a timing diagram showing comparisons between different types of packet, cell, or frame switches versus layer 1 packet switching in a three node network according to the present invention.

FIG. 51 shows some timing comparisons between different types of packet, cell, or frame switch technologies and layer one switching over a full network of three nodes. Again, as can be clearly seen, layer one switching is significantly faster than standard packet, cell, or frame switching, and is noticeably faster than layer two or layer three fast packet switching with high priority QOS/COS (quality of service, class of service). Although there is some small propagation delay in the transmission and in the switch, the "hardwire" scheduled approach results in no storing, no switching, and no possibilities of collision at any point in the network. The result is fast, reliable, guaranteed, on-time, non-blocking, and non-delaying packet, cell, or frame switching.

What is claimed is:

1. A method for switching information through one or more of network elements, comprising the steps of:

associating a synchronization component with each of said one or more of network elements;

synchronizing said synchronization component in each of said one or more of network elements;

establishing a reservation schedule in each of said one or more of network elements;

opening in each of said one or more of network elements a layer one connection at a predicted time in accordance with said reservation schedule;

transmitting information from a source network element to a destination network element through said layer one connection in each of said one or more of network elements in accordance with said reservation schedule; and closing said layer one connection in each of said one or more of network elements.

2. The method of claim 1 wherein said information comprises data selected from the group consisting of real-time data, high-priority data, and time sensitive data.

3. The method of claim 1 wherein said information comprises data selected from the group consisting of cell-oriented, frame-oriented, and packet-oriented data.

4. The method of claim 1 wherein said synchronization component associated with each of said network elements is a clock.

5. The method of claim 4 wherein said clock associated with each of said network elements is synchronized in accordance with a master clock.

6. The method of claim 5 wherein said master clock is the Global Positioning System.

7. The method of claim 1 wherein each of said one or more of network elements is a store-and-forward network element.

8. The method of claim 1 further comprising the step of resetting said reservation schedule in at least two of said network elements.

9. The method of claim 8 wherein the step of resetting said reservation schedule is initiated by a mid-destination network element.

10. The method of claim 8 wherein the step of resetting said reservation schedule is initiated by a final destination network element.

11. A network element for routing of data comprising:

a store-and-forward switching component for transmission of store-and-forward data;

bypass switching circuitry for transmission of data;

a clock;

a scheduler for scheduling transmissions of data at previously known times in conjunction with said bypass switching circuitry; and a controller for monitoring said clock and said scheduler, said controller adapted to activate said bypass switching circuitry in accordance with said scheduler and said clock.

12. The network element of claim 11 wherein said store-and-forward switching component is integrated in said network element.

13. The network element of claim 11 wherein said store-and-forward switching component is independent of said network element.

14. The network element of claim 11 wherein said bypass switching circuitry is overlaid around said store-and-forward switching component.

15. The network element of claim 11 wherein said bypass switching circuitry comprises layer one switching circuitry.

16. The network element of claim 11 further comprising buffers for holding said data in conjunction with said bypass switching circuitry.

17. The network element of claim 11 wherein said data comprises headerless data.

18. The network element of claim 11 wherein said data is selected from the group consisting of cell-oriented data, frame-oriented data, packet-oriented data, time sensitive data, and time insensitive data.

19. The network element of claim 11 wherein said store-and-forward data comprises data selected from the group consisting of cell-oriented data, frame-oriented data, packet-oriented data, time sensitive data, and time insensitive data.

20. A device for switching comprising:

layer one switching circuitry;

a clock;

a scheduler for scheduling previously derived times for layer one switching circuitry; and a controller for monitoring said clock and said scheduler, said controller adapted to activate said layer one switching circuitry in accordance with said scheduler and said clock.

21. The device of claim 20 wherein said layer one switching circuitry is adapted for transmission of real-time data.

22. The device of claim 20 further comprising store-and-forward switching circuitry.

23. The device of claim 22 wherein said store-and-forward switching circuitry is integrated in said network element.

24. The device of claim 22 wherein said layer one switching circuitry is overlaid around said store-and-forward switching circuitry.

25. The device of claim 20 wherein said layer one switching circuitry, said clock, said scheduler, and said controller are associated with a network element.

26. The device of claim 20 wherein said layer one switching circuitry, said clock, said scheduler, and said controller are associated with a LAN-attached device.

27. The device of claim 20 wherein said layer one switching circuitry, said clock, said scheduler, and said controller are associated with an end-user device.

28. The device of claim 20 further comprising buffers for holding information in conjunction with said layer one switching circuitry.

29. A method for switching information through a one or more of network elements, comprising the steps of:

associating a synchronization component with each of said one or more of network elements;

synchronizing said synchronization component in each of said one or more of network elements;

establishing a reservation schedule in each of said one or more of network elements, wherein said step of establishing a reservation schedule further comprises the steps of:

transmitting a request for a time-oriented reservation from a first network element to a second network element;

receiving said request for a time-oriented reservation in said second network element from said first network element; and not scheduling requested time-oriented reservation in said second network element in accordance with said reservation schedule due to unavailable requested times.

30. A method for switching information through a one or more of network elements, comprising the steps of:

associating a synchronization component with each of said one or more of network elements;

synchronizing said synchronization component in each of said one or more of network elements;

establishing a reservation schedule in each of said one or more of network elements;

opening in each of said one or more of network elements a layer one connection at a time in accordance with said reservation schedule;

transmitting information from a source network element to a destination network element through said layer one connection in each of said one or more of network elements in accordance with said reservation schedule;

closing said layer one connection in each of said one or more of network elements;

transmitting a request from a first network element to terminate a time-oriented reservation;

receiving said request in a second network element to terminate said time-oriented reservation; and de-scheduling said time-oriented reservation in said reservation schedule in said second network element in accordance with said request to terminate said time-oriented reservation, such that said time-oriented reservation times in said second network element become available for future time-oriented reservations.

31. A device for switching comprising:

layer one switching circuitry;

a clock;

a scheduler for scheduling layer one switching circuitry wherein said scheduler comprises a layer one event schedule wherein said layer one event schedule is a schedule comprising:

one or more layer one event times for each scheduled layer one event;

the identity of at least one input associated with said scheduled layer one event;

the identity of at least one output associated with said scheduled layer one event; and an availability status for each scheduled layer one event, such that a layer one event may be scheduled at said one or more layer one event times, from said at least one input to said at least one output, with said availability status, and;

a controller for monitoring said clock and said scheduler, said controller adapted to activate said layer one switching circuitry in accordance with said scheduler and said clock.

* * * * *

UNITED STATES PATENT AND TRADEMARK OFFICE
CERTIFICATE OF CORRECTION

PATENT NO. : 6,611,519 B1
DATED : August 26, 2003
INVENTOR(S) : Wayne R. Howe

It is certified that error appears in the above-identified patent and that said Letters Patent is hereby corrected as shown below:

Column 40,
Line 44, after "bypass switching circuitry for transmission of data" should be added -- through a layer one connection --.
Line 51, "said controller adapted to activate" should be replaced with -- wherein said controller activates --.

Column 41,
Line 17, "said controller adapted to activate" should be replaced with -- wherein said controller activates --.
Line 43, after "through", delete the word "a".

Column 42,
Line 4, should be added the additional elements:
-- opening in each of said one or more of network elements a layer one connection at a predicted time in accordance with said reservation schedule;
   transmitting information from a source network element to a destination network element through said layer one connection in each of said one or more network elements in accordance with said reservation schedule; and
   closing said layer one connection in each of said one or more of network elements. --
Line 5, after "through", delete the word "a".
Line 15, after "layer one connection at a", should be added the term -- predicted --.
Line 39, after "for scheduling", should be added the terms -- previously derived times for --.
Line 55, "said controller adapted to activate" should be replaced with the terms -- wherein said controller activates --.

Signed and Sealed this

Twenty-sixth Day of October, 2004

JON W. DUDAS
*Director of the United States Patent and Trademark Office*